United States Patent
Jung et al.

(10) Patent No.: US 12,120,765 B2
(45) Date of Patent: Oct. 15, 2024

(54) METHOD AND DEVICE FOR SUPPORTING VEHICLE COMMUNICATION IN WIRELESS COMMUNICATION SYSTEM

(71) Applicant: Samsung Electronics Co., Ltd., Suwon-si (KR)

(72) Inventors: Sangyeob Jung, Suwon-si (KR); Anil Agiwal, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 17/598,844

(22) PCT Filed: Mar. 27, 2020

(86) PCT No.: PCT/KR2020/095050
§ 371 (c)(1),
(2) Date: Sep. 27, 2021

(87) PCT Pub. No.: WO2020/197368
PCT Pub. Date: Oct. 1, 2020

(65) Prior Publication Data
US 2022/0201790 A1 Jun. 23, 2022

(30) Foreign Application Priority Data

Mar. 27, 2019 (KR) .................. 10-2019-0035180
Mar. 28, 2019 (KR) .................. 10-2019-0036210

(51) Int. Cl.
H04W 76/19 (2018.01)
H04W 4/40 (2018.01)
(Continued)

(52) U.S. Cl.
CPC ........... *H04W 76/19* (2018.02); *H04W 36/08* (2013.01); *H04W 60/04* (2013.01); *H04W 76/14* (2018.02); *H04W 76/20* (2018.02); *H04W 92/18* (2013.01)

(58) Field of Classification Search
CPC ..... H04W 76/19; H04W 76/20; H04W 76/14; H04W 36/08; H04W 60/04; H04W 92/18
(Continued)

(56) References Cited

U.S. PATENT DOCUMENTS

2019/0037635 A1* 1/2019 Guo ...................... H04W 76/27
2019/0045490 A1* 2/2019 Davydov .............. H04L 5/0044
(Continued)

FOREIGN PATENT DOCUMENTS

WO 2017176099 A1 10/2017
WO WO-2018084520 A1 * 5/2018 ............ H04W 24/04
WO 2018128372 A1 7/2018

OTHER PUBLICATIONS

International Search Report and Written Opinion of the International Searching Authority in connection with International Application No. PCT/KR2020/095050 issued Jul. 2, 2020, 19 pages.
(Continued)

Primary Examiner — Xuan Lu

(57) ABSTRACT

Provided are a method and apparatus for supporting vehicle communication in a wireless communication system. The method includes: configuring vehicle-to-everything (V2X) sidelink communication to be performed at a predetermined frequency, in a radio resource control (RRC) inactive mode; receiving system information from a base station; identifying whether the system information includes a V2X sidelink transmission resource pool associated with the predetermined frequency; identifying whether a triggering condition of a radio access network (RAN)-based notification area (RNA) update (RNAU) is satisfied; determining whether to
(Continued)

perform the RNAU, based on results of identifying whether the system information includes the V2X sidelink transmission resource pool and whether the triggering condition of the RNAU is satisfied; and resuming RRC connection with the base station, based on a result of the determining.

7 Claims, 22 Drawing Sheets

(51) Int. Cl.
| | |
|---|---|
| *H04W 36/08* | (2009.01) |
| *H04W 48/08* | (2009.01) |
| *H04W 60/04* | (2009.01) |
| *H04W 72/02* | (2009.01) |
| *H04W 72/04* | (2023.01) |
| *H04W 72/20* | (2023.01) |
| *H04W 76/14* | (2018.01) |
| *H04W 76/20* | (2018.01) |
| *H04W 76/27* | (2018.01) |
| *H04W 92/18* | (2009.01) |

(58) Field of Classification Search
USPC .......................................................... 370/329
See application file for complete search history.

(56) References Cited

U.S. PATENT DOCUMENTS

| | | | |
|---|---|---|---|
| 2019/0313374 A1 | 10/2019 | Lee et al. | |
| 2019/0357025 A1 | 11/2019 | Hwang et al. | |
| 2020/0146010 A1* | 5/2020 | Abdoli | .................. H04L 5/0044 |
| 2020/0146048 A1* | 5/2020 | Lee | ...................... H04W 72/535 |
| 2022/0015070 A1* | 1/2022 | Chen | ...................... H04W 72/23 |
| 2022/0150730 A1* | 5/2022 | Freda | ...................... H04L 1/188 |

OTHER PUBLICATIONS

3GPP TS 36.331 V15.4.0, Technical Specification, 3rd Generation Partnership Project; Technical Specification Group Radio Access Network; Evolved Universal Terrestrial Radio Access (E-UTRA); Radio Resource Control (RRC); Protocol specification (Release 15), 935 pages.

3GPP TS 38.331 V15.4.0, Technical Specification, 3rd Generation Partnership Project; Technical Specification Group Radio Access Network; NR; Radio Resource Control (RRC) protocol specification (Release 15), 474 pages.

Huawei et al, "Considerations on RRM and RLM for NR V2X unicast", 3GPP TSG-RAN WG2 Meeting#105, R2-1902038, Athens, Greece, Feb. 25-Mar. 1, 2019, 3 pages.

* cited by examiner

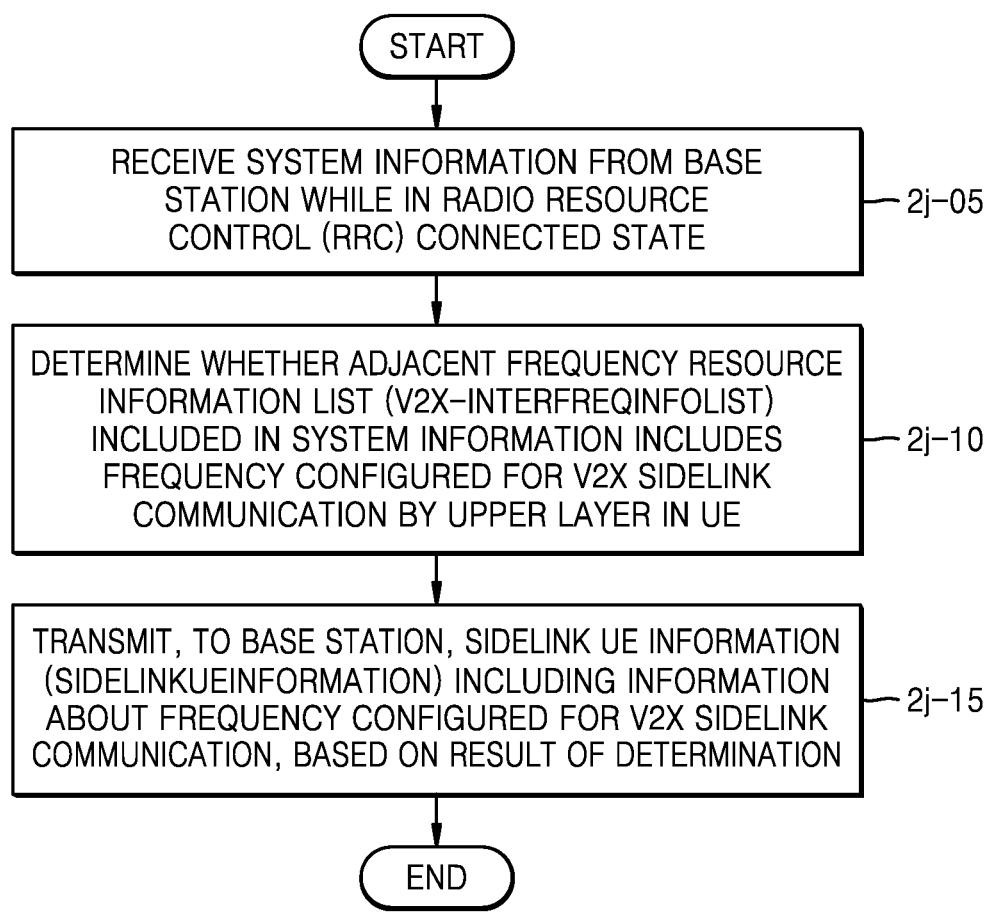

METHOD AND DEVICE FOR SUPPORTING VEHICLE COMMUNICATION IN WIRELESS COMMUNICATION SYSTEM

CROSS-REFERENCE TO RELATED APPLICATIONS

This application is a 371 of International Application No. PCT/KR2020/095050 filed on Mar. 27, 2020, which claims priority to Korean Patent Application No. 10-2019-0035180 filed on Mar. 27, 2019, and Korean Patent Application No. 10-2019-0036210 filed on Mar. 28, 2019, the disclosures of which are herein incorporated by reference in their entireties.

BACKGROUND

1. Field

The disclosure relates to a method and apparatus for supporting vehicle communication in a wireless communication system.

2. Description of Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why 5G communication systems or pre-5G communication systems are called beyond 4G network communication systems or post long-term evolution (LTE) systems. In order to achieve a high data rate, 5G communication systems are being developed to be implemented in a super-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G technology and IoT technology.

As described above, various services may be provided due to the development of wireless communication systems, and thus there is need for methods of smoothly providing, in particular, a service related to vehicle communication.

Provided are an apparatus and method for effectively supporting a service in a mobile communication system.

BRIEF DESCRIPTION OF THE DRAWINGS

FIG. 2J is a flowchart for describing operations of a UE, according to an embodiment of the disclosure.

DETAILED DESCRIPTION

Figure 1A:
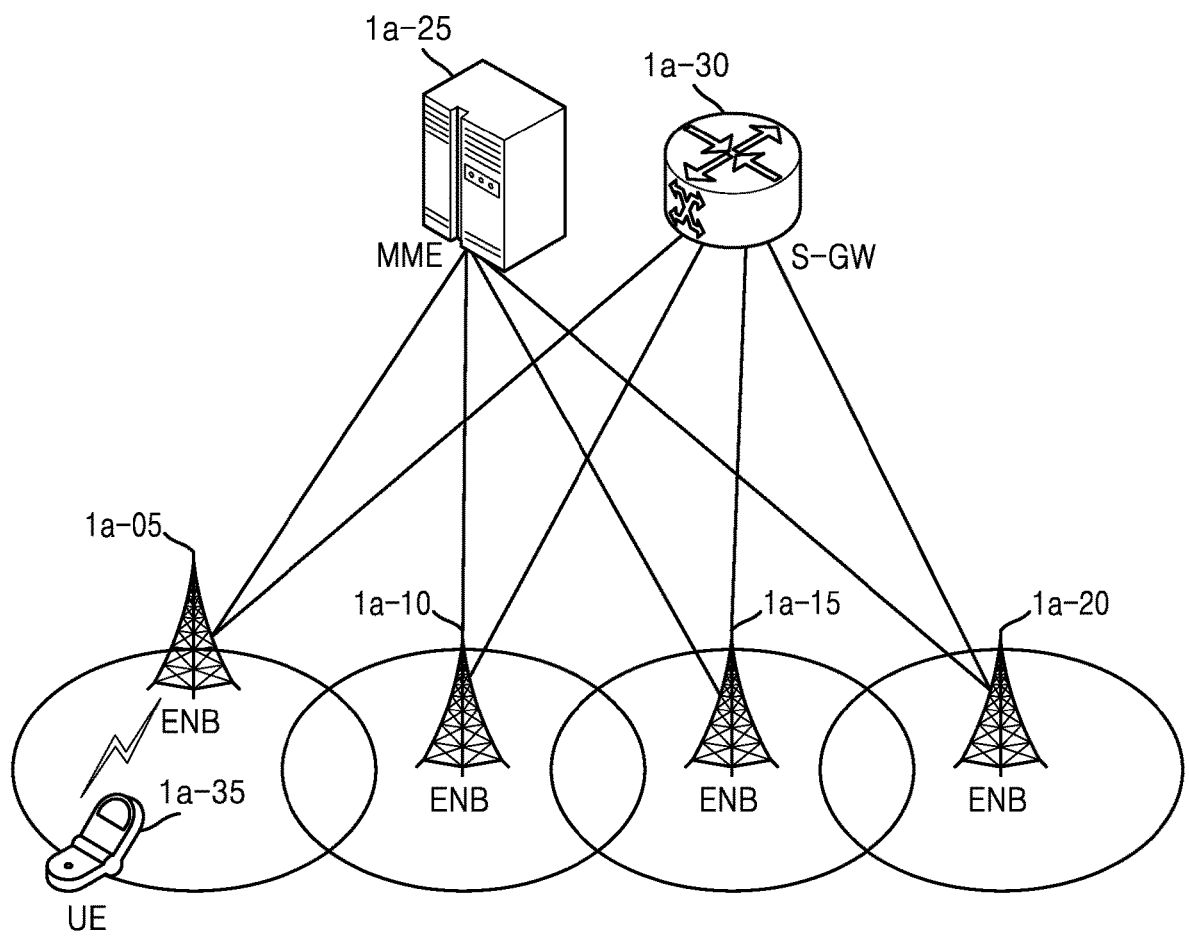
FIG. 1A is a diagram of a structure of a long-term evolution (LTE) system, according to an embodiment of the disclosure.

According to an embodiment of the disclosure, a method, performed by a terminal, of performing a radio resource control (RRC) connection resume procedure, includes: configuring vehicle-to-everything (V2X) sidelink communication to be performed at a predetermined frequency, in an RRC inactive mode state; receiving system information from a cell or a base station; determining whether the system information includes a V2X sidelink transmission resource pool associated with the predetermined frequency; determining whether to perform radio access network (RAN)-based notification area (RNA) update (RNAU), based on a result of the determining whether the system information includes the V2X sidelink transmission resource pool; and performing the RRC connection resume procedure with the base station, based on a result of the determining whether to perform the RNAU.

According to an embodiment of the disclosure, a method, performed by a terminal, of supporting vehicle communication in a wireless communication system, includes: configuring vehicle-to-everything (V2X) sidelink communication to be performed at a predetermined frequency, in a radio resource control (RRC) inactive mode; receiving system information from a base station; identifying whether the system information includes a V2X sidelink transmission resource pool associated with the predetermined frequency; identifying whether a triggering condition of a radio access network (RAN)-based notification area (RNA) update (RNAU) is satisfied; determining whether to perform the RNAU, based on results of identifying whether the system information includes the V2X sidelink transmission resource pool and whether the triggering condition of the RNAU is satisfied; and resuming RRC connection with the base station, based on a result of the determining.

The determining of whether to perform the RNAU may include, when the system information does not include the V2X sidelink transmission resource pool, determining not to perform the RNAU.

The method may further include: when it is determined not to perform the RNAU, determining a resume cause as "Mo-Signaling", wherein the resuming of the RRC connection with the base station may include: transmitting, to the base station, an RRC connection resume request message including the resume cause; receiving, from the base station, an RRC connection resume message; and resuming an RRC connection with the base station, based on the RRC connection resume message.

The identifying of whether the system information includes the V2X sidelink transmission resource pool associated with the predetermined frequency may include identifying whether the system information includes information about the predetermined frequency and the system information does not include the V2X sidelink transmission resource pool associated with the predetermined frequency.

The triggering condition of the RNAU may include a T380 timer operating to periodically perform an RNAU procedure being expired or the terminal deviating from an RNA configured for the terminal.

According to an embodiment of the disclosure, a terminal for supporting vehicle communication in a wireless communication system, includes: a transceiver; and at least one processor operably connected to the transceiver, wherein the at least one processor is configured to: configure a vehicle-to-everything (V2X) sidelink communication to be performed at a predetermined frequency, in a radio resource control (RRC) inactive (RRC_Inactive) mode; control the transceiver to receive system information from a base station; identify whether the system information includes a V2X sidelink transmission resource pool associated with the predetermined frequency; identify whether a triggering condition of radio access network (RAN)-based notification area (RNA) update (RNAU) is satisfied; determine whether to perform the RNAU, based on results of identifying whether the system information includes the V2X sidelink transmission resource pool and whether the triggering condition of the RNAU is satisfied; and resume an RRC connection with the base station, based on a result of the determination.

According to an embodiment of the disclosure, a method, performed by a terminal, of transmitting sidelink terminal information (SidelinkUEInformation) in a wireless communication system, includes: receiving system information from a base station, in a radio resource control (RRC) connected state; determining whether an adjacent frequency resource information list (v2x-InterFreqInfoList) included in the system information includes a frequency configured for vehicle-to-everything (V2X) sidelink communication by an upper layer of the terminal; and transmitting, to the base station, the sidelink terminal information including information about the frequency configured for the V2X sidelink communication, based on a result of the determining.

According to an embodiment of the disclosure, a method, performed by a terminal, of supporting vehicle communication in a wireless communication system, includes: receiving system information from a base station, in a radio resource control (RRC) connected state; determining whether an adjacent frequency resource information list (v2x-InterFreqInfoList) included in the system information includes a frequency configured for vehicle-to-everything (V2X) sidelink communication by an upper layer in the terminal; and transmitting, to the base station, sidelink terminal information (SidelinkUEInformation) including information about the frequency configured for the V2X sidelink communication, based on a result of the determining.

The method may further include identifying whether a sidelink radio link failure (RLF) has occurred for a destination configured for the V2X sidelink communication, wherein the transmitting of the sidelink terminal information to the base station may include transmitting, to the base station, the sidelink terminal information, based on a result of identifying whether the RLF has occurred.

When it is identified that the RLF has occurred, the sidelink terminal information may not include at least one piece of information from among cast type information regarding the destination, radio link control (RLC) mode information regarding the destination, or quality of service (QoS) profile information regarding the destination.

The sidelink terminal information may include an indicator indicating which radio access technology (RAT) the frequency configured for the V2X sidelink communication is for.

The transmitting of the sidelink terminal information to the base station may include: when the adjacent frequency resource information list includes the frequency configured for the V2X sidelink communication by the higher layer in the terminal, and another sidelink terminal information transmitted last to the base station before the sidelink terminal information is transmitted does not include the frequency configured for the V2X sidelink communication, transmitting, to the base station, the sidelink terminal information by including the information about the frequency configured for the V2X sidelink communication to the sidelink terminal information; and when the adjacent frequency resource information list includes the frequency configured for the V2X sidelink communication by the higher layer in the terminal, and the other sidelink terminal information transmitted last does not include information about a V2X common resource, transmitting, to the base station, the sidelink terminal information by not including information about another frequency other than the frequency configured for the V2X sidelink communication to the sidelink terminal information.

According to an embodiment of the disclosure, a terminal for supporting vehicle communication in a wireless communication system, includes: a transceiver; and at least one processor operably connected to the transceiver, wherein the at least one processor is configured to: receive system information from a base station, in a radio resource control (RRC) connected state; determine whether adjacent frequency resource information list (v2x-InterFreqInfoList) included in the system information includes a frequency configured for vehicle-to-everything (V2X) sidelink communication by an upper layer in the terminal; and transmit, to the base station, sidelink terminal information (SidelinkUEInformation) including information about the frequency configured for the V2X sidelink communication, based on a result of the determination.

Hereinafter, operation principles of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

For the same reasons, components may be exaggerated, omitted, or schematically illustrated in drawings for clarity. Also, the size of each component does not completely reflect the actual size. In the drawings, like reference numerals denote like elements.

Advantages and features of the disclosure and methods of accomplishing the same may be understood more readily by reference to the following detailed description of the embodiments and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments of the disclosure means a software component or hardware component such as a Field-Programmable Gate Array (FPGA) or an Application-Specific Integrated Circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, a base station is an entity that assigns resources of a terminal, and may be at least one of a gNode B (gNB), an eNode B (eNB), a Node B (NB), a base station (B S), a wireless access unit, a BS controller, or a node on a network. Examples of a terminal may include user equipment (UE), a mobile station (MS), a cellular phone, a smartphone, a computer, and a multimedia system capable of performing a communication function. Also, the term 'terminal' may indicate not only mobile phones, narrow band-Internet of things (NB-IoT) devices, and sensors, but also other wireless communication devices. Obviously, the base station and the terminal are not limited to the above examples.

Hereinafter, for convenience of description, the disclosure uses terms and names defined by the 3rd Generation Partnership Project Long Term Evolution (3GPP LTE) standard and/or the 3GPP new radio (NR) standard. However, the disclosure is not limited by such terms and names, and may be equally applied to systems conforming to other standards. In the disclosure, an evolved node B (eNB) will be used interchangeably with a next generation node B (gNB) for convenience of description. In other words, a base station described as an eNB may also indicate a gNB.

In particular, the disclosure may be applied to 3GPP NR ($5^{th}$ generation (5G) mobile communication standard). Also, the disclosure may be applied to intelligent services (e.g., smart homes, smart buildings, smart cities, smart cars or connected cars, health care, digital education, retail business, and security and safety related services) based on 5G communication technology and IoT related technology. In the disclosure, an evolved node B (eNB) will be used interchangeably with a next generation node B (gNB) for convenience of description. In other words, a base station described as an eNB may also indicate a gNB. Also, the term 'terminal' may indicate not only mobile phones, narrow band-Internet of things (NB-IoT) devices, and sensors, but also other wireless communication devices.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra-mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a UE or an MS) transmits data or a control signal to a base station (e.g., eNB), and the DL refers to a radio link through which a base station transmits data or a control signal to a terminal. The multiple access scheme as described above normally allocates and operates time-frequency resources including data or control information to be transmitted to each other to prevent the time-frequency resources from overlapping with each other, that is, establish orthogonality, thereby dividing the data or the control information of each user.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra-reliability low latency communication (hereinafter, URLLC), etc.

According to an embodiment, the eMBB aims to provide a higher data rate than a data rate supported by the LTE, LTE-A, or LTE-Pro system. For example, in the 5G communication system, the eMBB should be able to provide a peak data rate of 20 Gbps in a downlink and a peak data rate of 10 Gbps in an uplink from the viewpoint of one base station. In addition, the 5G communication system should provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded in the 5G communication system. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, the mMTC is being considered to support application services such as IoT in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km') in a cell because it is attached to various sensors and various devices to provide communication functions. In addition, the terminals supporting the mMTC are more likely to be positioned in shaded areas not covered by a cell, such as the underground of a building due to nature of services, and thus, the terminal requires a wider coverage than other services provided by the 5G communication system. The terminals that support the mMTC should be configured as inexpensive terminals and require very long battery lifetime, such as 10 to 15 years, because it is difficult to frequently replace batteries of the terminals.

Finally, the URLLC that is a cellular-based wireless communication service used for mission-critical purposes may be used, for example, in remote control for robots or machinery, industrial automation, unmanaged aerial vehicles, remote health care, or emergency alert. Accordingly, communication provided by the URLLC should provide very low latency (ultra-low latency) and very high reliability (ultra-high reliability). For example, a service supporting the URLLC should satisfy air interface latency smaller than 0.5 milliseconds and at the same time, may have a packet error rate of $10^{-5}$ or less. Accordingly, for URLLC-supportive services, the 5G system may be required to provide a transmit time interval (TTI) shorter than those for other services while securing reliable communication links by allocating a broad resource in a frequency band.

The three services, that is, eMBB, URLLC, and mMTC, considered in the above 5G communication system may be multiplexed in one system and may be transmitted. In this case, the services may use different transmission and reception methods and transmission and reception parameters in order to meet their different requirements. However, the mMTC, URLLC, and eMBB are examples of different service types, and service types to which the disclosure is applied are not limited thereto.

Also, although embodiments of the disclosure are described by using the LTE, LTE-A, LTE Pro, or 5G (or NR) system, the embodiments of the disclosure may be applied to other communication systems having a similar technical background or channel type. Also, it will be understood by one of ordinary skill in the art that embodiments of the disclosure may be applied to other communication systems through some modifications without departing from the scope of the disclosure.

Hereinafter, embodiments of the disclosure will be described with reference to accompanying drawings.

FIG. 1A is a diagram of a structure of a long-term evolution (LTE) system, according to an embodiment of the disclosure.

Referring to FIG. 1A, a radio access network of the LTE system includes evolved node Bs (eNBs) 1a-05, 1a-10, 1a-15, and 1a-20 (node Bs (NBs) or base stations), a mobility management entity (MME) 1a-25, and a serving-gateway (S-GW) 1a-30. A user equipment (UE) or a terminal 1a-35 may access an external network via the eNB 1a-05, 1a-10, 1a-15, or 1a-20 and the S-GW 1a-30.

In FIG. 1A, the eNBs 1a-05 through 1a-20 correspond to existing NBs of a universal mobile telecommunication system (UMTS). The eNB is connected to the UE 1a-35 through a radio channel and performs complex functions compared to the existing NB. Because all user traffic data including real-time services such as voice over Internet protocol (VoIP) is serviced through shared channels in the LTE system, an entity for collating buffer status information of UEs, available transmission power status information, channel status information, etc. and performing scheduling is required, and each of the eNBs 1a-05, 1a-10, 1a-15, and 1a-20 may serve as such an entity. A single eNB generally controls a plurality of cells. For example, the LTE system may use radio access technology such as orthogonal frequency division multiplexing (OFDM) at a bandwidth of 20 MHz to achieve a data rate of 100 Mbps. Obviously, the radio access technology usable by the LTE system is not limited to the above example. Also, the eNBs 1a-05 through 1a-20 may use adaptive modulation & coding (AMC) to determine a modulation scheme and a channel coding rate in accordance with a channel status of the terminal. The S-GW 1a-30 is an entity for providing a data bearer and may generate or remove a data bearer under control by the MME 1a-25. The MME is an entity for performing a mobility management function and various control functions for the terminal and may be connected to a plurality of base stations.

Figure 1B:
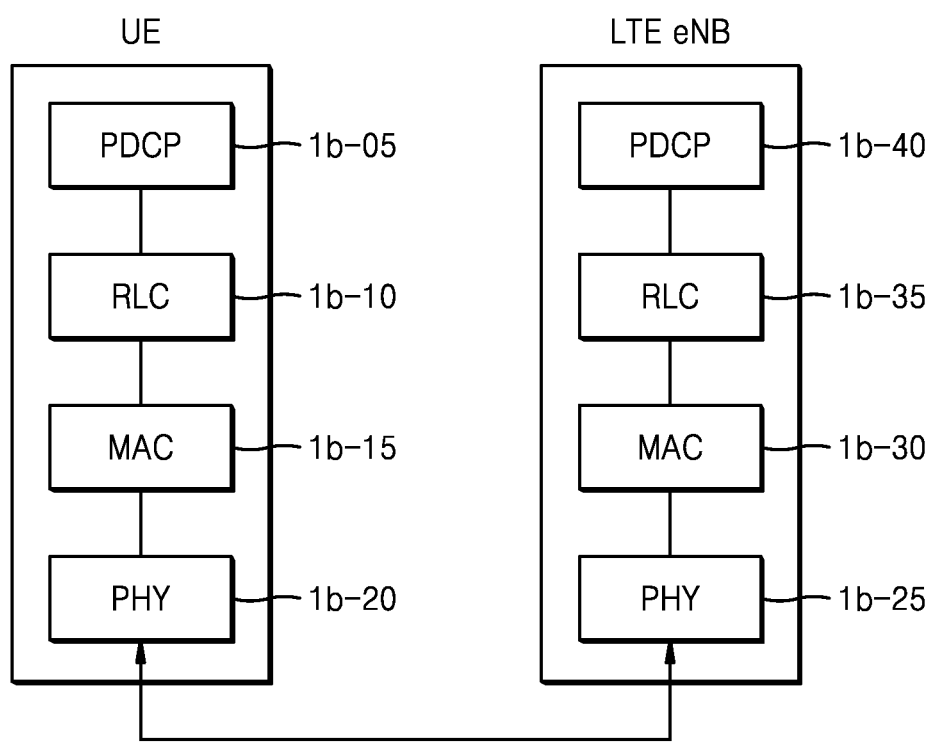
FIG. 1B is a diagram of a radio protocol architecture in an LTE system, according to an embodiment of the disclosure.

FIG. 1B is a diagram of a radio protocol architecture in an LTE system, according to an embodiment of the disclosure.

Referring to FIG. 1B, a radio protocol of the LTE system may include packet data convergence protocol (PDCP) layers 1b-05 and 1b-40, radio link control (RLC) layers 1b-10 and 1b-35, and (medium access control (MAC) layers 1b-15 and 1b-30 respectively for a UE and an eNB. The PDCP layers 1b-05 and 1b-40 may perform operations of Internet protocol (IP) header compression/reconstruction. Main functions of the PDCP layer are summarized below. Obviously, the functions of the PDCP layer are not limited thereto.

Header compression and decompression: Robust header compression (ROHC) only

Transfer of user data

In-sequence delivery of upper layer packet data units (PDUs) at PDCP re-establishment procedure for RLC acknowledged mode (AM)

For split bearers in dual connectivity (DC) (only support for RLC AM): PDCP PDU routing for transmission and PDCP PDU reordering for reception)

Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer 1b-10 or 1b-35 may perform, for example, an automatic repeat request (ARQ) operation by reconfiguring PDCP PDUs to appropriate sizes. Main functions of the RLC layer are summarized below. Obviously, the functions of the RLC layer are not limited thereto.

Transfer of upper layer PDUs

Error Correction through ARQ (only for AM data transfer)

Concatenation, segmentation, and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 is connected to multiple RLC layers configured for a single UE and may multiplex RLC PDUs into a MAC PDU and demultiplex the RLC PDUs from the MAC PDU. Main functions of the MAC layer are summarized below. Obviously, the functions of the MAC layer are not limited thereto.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through HARQ Priority handling between logical channels of one UE Priority handling between UEs by means of dynamic scheduling Multimedia broadcast multicast service (MBMS) identification Transport format selection Padding Physical (PHY) layer 1b-20 or 1b-25 channel-codes and modulates upper layer data into OFDM symbols and transmits the OFDM symbols through a radio channel. Also, the PHY layer 1b-20 or 1b-25 demodulates OFDM symbols received through a radio channel and channel-decodes and delivers the OFDM symbols to an upper layer. Obviously, the functions of the PHY layer are not limited thereto.

Figure 1C:
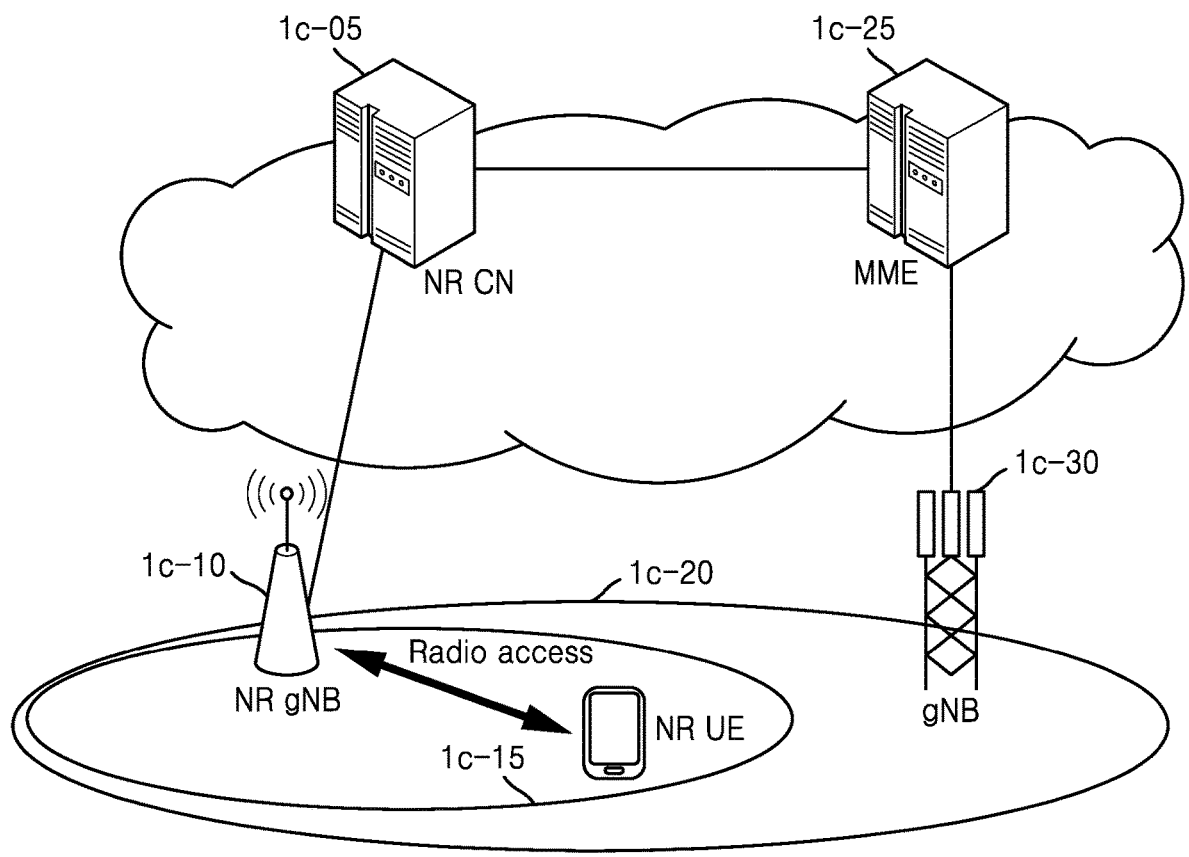
FIG. 1C is a diagram of a structure of a next-generation mobile communication system, according to an embodiment of the disclosure.

FIG. 1C is a diagram of a structure of a next-generation mobile communication system, according to an embodiment of the disclosure.

Referring to FIG. 1C, a radio access network of the next-generation mobile communication system (e.g., a new radio (NR) or 5G system) may include an NR node B (NR NB) (hereinafter, referred to as an NR gNB or NR base station) 1c-10 and an NR core network (CN) 1c-05. A new radio user equipment (NR UE) or terminal 1c-15 may access an external network via the NR gNB 1c-10 and the NR CN 1c-05.

In FIG. 1C, the NR gNB 1c-10 corresponds to an eNB of an existing LTE system. The NR gNB is connected to the NR UE 1c-15 through a radio channel and may provide a superior service compared to an existing NB. Because all user traffic data is serviced through shared channels in the next-generation mobile communication system, an entity for collating buffer status information of UEs, available transmission power status information, channel status information, etc. and performing scheduling may be required and such operations may be performed by the NR gNB 1c-10. A single NR gNB generally controls a plurality of cells. According to an embodiment of the disclosure, the next-generation mobile communication system may have a bandwidth equal to or greater than an existing maximum bandwidth of current LTE to achieve an ultrahigh data rate, and beamforming technology may be additionally used by using OFDM as radio access technology.

Also, according to an embodiment of the disclosure, the NR gNB 1c-10 may use an AMC scheme to determine a modulation scheme and a channel coding rate in accordance with a channel status of the terminal. The NR CN 1c-05 may perform functions such as mobility support, bearer setup, and quality of service (QoS) setup. The NR CN 1c-05 is an entity for performing a mobility management function and various control functions for the terminal and may be connected to a plurality of the base stations. The next-generation mobile communication system may cooperate with the existing LTE system, and the NR CN 1c-05 is connected to an MME 1c-25 through a network interface. The MME may be connected to an eNB 1c-30 that is an existing base station.

Figure 1D:
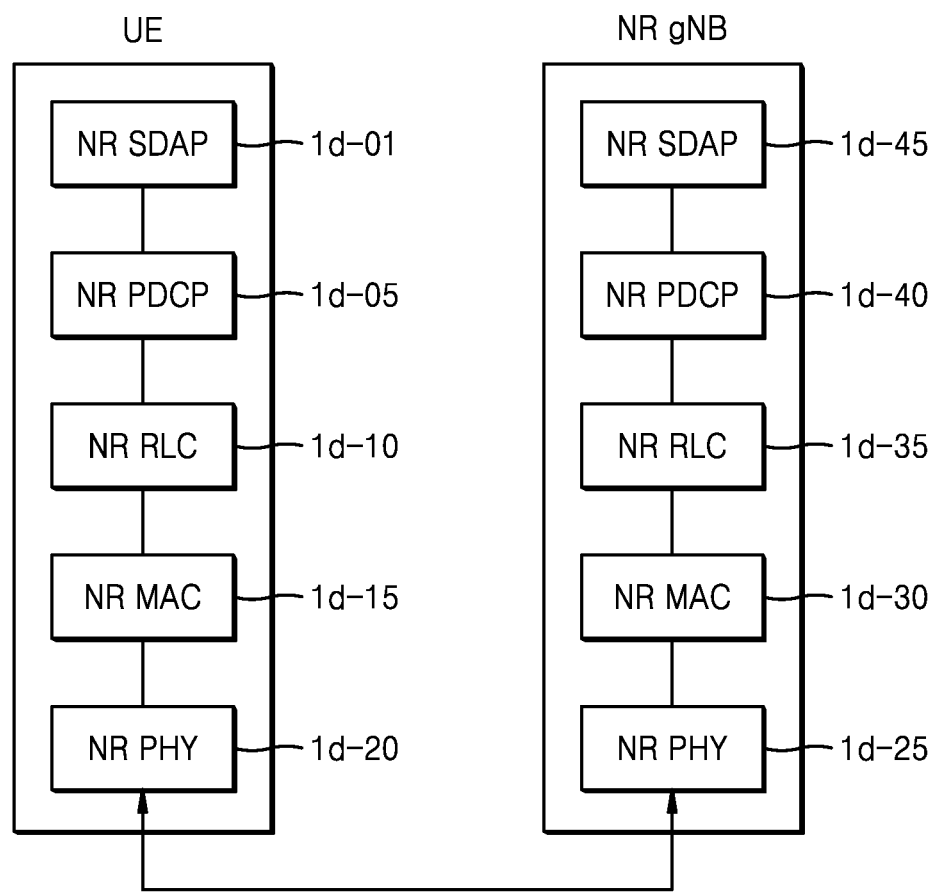
FIG. 1D is a diagram of a radio protocol architecture of a next-generation mobile communication system, according to an embodiment of the disclosure.

FIG. 1D is a diagram of a radio protocol architecture of a next-generation mobile communication system, according to an embodiment of the disclosure.

Referring to FIG. 1D, a radio protocol of the next-generation mobile communication system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB.

According to an embodiment of the disclosure, main functions of the NR SDAP layers 1d-01 and 1d-45 may include some of the following functions. Obviously, the functions of the NR SDAP layer are not limited thereto.

Transfer of user plane data

Mapping between QoS flow and a data radio bearer (DRB) for both downlink (DL) and uplink (UL)

Marking QoS flow ID in both DL and UL packets

Reflective QoS flow to DRB mapping for the UL SDAP PDUs

With respect to the NR SDAP layer, the UE may receive, via an RRC message, configurations on whether to use a header of the NR SDAP layer or use a function of the NR SDAP layer for each NR PDCP layer, each bearer, or each logical channel. When an SDAP header is configured, the UE may instruct, via an NAS reflective QoS configuration 1-bit indicator and access stratum (AS) reflective QoS configuration 1-bit indicator, updating or reconfiguration of mapping information of a data bearer and a QoS flow of UL and DL. The SDAP header may include QoS flow ID indicating QoS. Also, according to an embodiment of the disclosure, QoS information may be used as data processing priority information, scheduling information, etc. for supporting a smooth service.

According to an embodiment of the disclosure, main functions of the NR PDCP layer 1d-05 or 1d-40 may include some of the following functions. Obviously, the functions of the NR PDCP layer are not limited thereto.

Header compression and decompression: Robust header compression (ROHC) only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

According to an embodiment of the disclosure, a reordering function of the NR PDCP layer may include a function of reordering PDCP PDUs received from a lower layer, based on a PDCP sequence number (SN). The reordering function of the NR PDCP layer may include at least one of a function of delivering data to an upper layer in a reordered order, a function of immediately delivering the data without considering an order, a function of recording missing PDCP PDUs by reordering the PDCP PDUs, a function of reporting status information of the missing PDCP PDUs to a transmitter, or a function of requesting to retransmit the missing PDCP PDUs.

According to an embodiment of the disclosure, main functions of the NR RLC layers 1d-10 and 1d-35 may include some of following functions. However, the functions of the NR RLC layer are not limited thereto.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment According to an embodiment of the disclosure, the in-sequence delivery function of the NR RLC layer may denote a function of delivering RLC SDUs received from a lower layer, to an upper layer in order. The in-sequence delivery function of the NR RLC layer may include at least one of a function of reassembling RLC SDUs segmented from an RLC SDU and delivering the RLC SDUs when the segmented RLC SDUs are received, a function of reordering received RLC PDUs on an RLC SN or PDCP SN basis, a function of recording missing RLC PDUs by reordering the RLC PDUs, a function of reporting status information of the missing RLC PDUs to a transmitter, a function of requesting to retransmit the missing RLC PDUs, a function of delivering only RLC SDUs previous to a missing RLC SDU, to an upper layer in order, when the missing RLC SDU exists, a function of delivering all RLC SDUs received before a timer is started, to an upper layer in order, even if a missing RLC SDU exists, when a certain timer is expired, or a function of delivering all RLC SDUs received up to a current time, to the upper layer in order, even if a missing RLC SDU exists, when a certain timer is expired.

Also, according to an embodiment of the disclosure, the NR RLC layer may process the RLC PDUs in a received order (arriving order regardless of an order of serial numbers or SNs) and deliver the RLC PDUs to a PDCP layer in an out-of-sequence delivery manner, or in case of segments, may receive segments stored in a buffer or to be received later to reconfigure one complete RLC PDU, process the RLC PDU, and transmit the RLC PDU to the PDCP layer.

According to an embodiment of the disclosure, the NR RLC layer may not have a concatenation function, and the concatenation function may be performed by the NR MAC layer or be replaced with a multiplexing function of the NR MAC layer.

According to an embodiment of the disclosure, the out-of-sequence delivery of the NR RLC layer denotes a function of delivering RLC SDUs received from a lower layer immediately to an upper layer regardless of order, and may include at least one of a function of reassembling and delivering segmented and received RLC SDUs when one RLC SDU is segmented into several RLC SDUs, or a function of recording missing RLC PDUs by storing RLC SN or PDCP SN and reordering received RLC PDUs.

According to an embodiment of the disclosure, the NR MAC layer 1d-15 or 1d-30 may be connected to multiple NR RLC layers configured for a single UE, and main functions of the NR MAC layer may include some of the following functions. Obviously, the functions of the NR MAC layer are not limited thereto.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS identification
Transport format selection
Padding According to an embodiment of the disclosure, NR PHY layer 1d-20 or 1d-25 may channel-code and modulate upper layer data into OFDM symbols and transmit the OFDM symbols through a radio channel. Also, the NR PHY layer 1d-20 or 1d-25 may demodulate OFDM symbols received through a radio channel and channel-decode and deliver the OFDM symbols to an upper layer. Obviously, the functions of the NR PHY layer are not limited thereto.

Figure 1E:
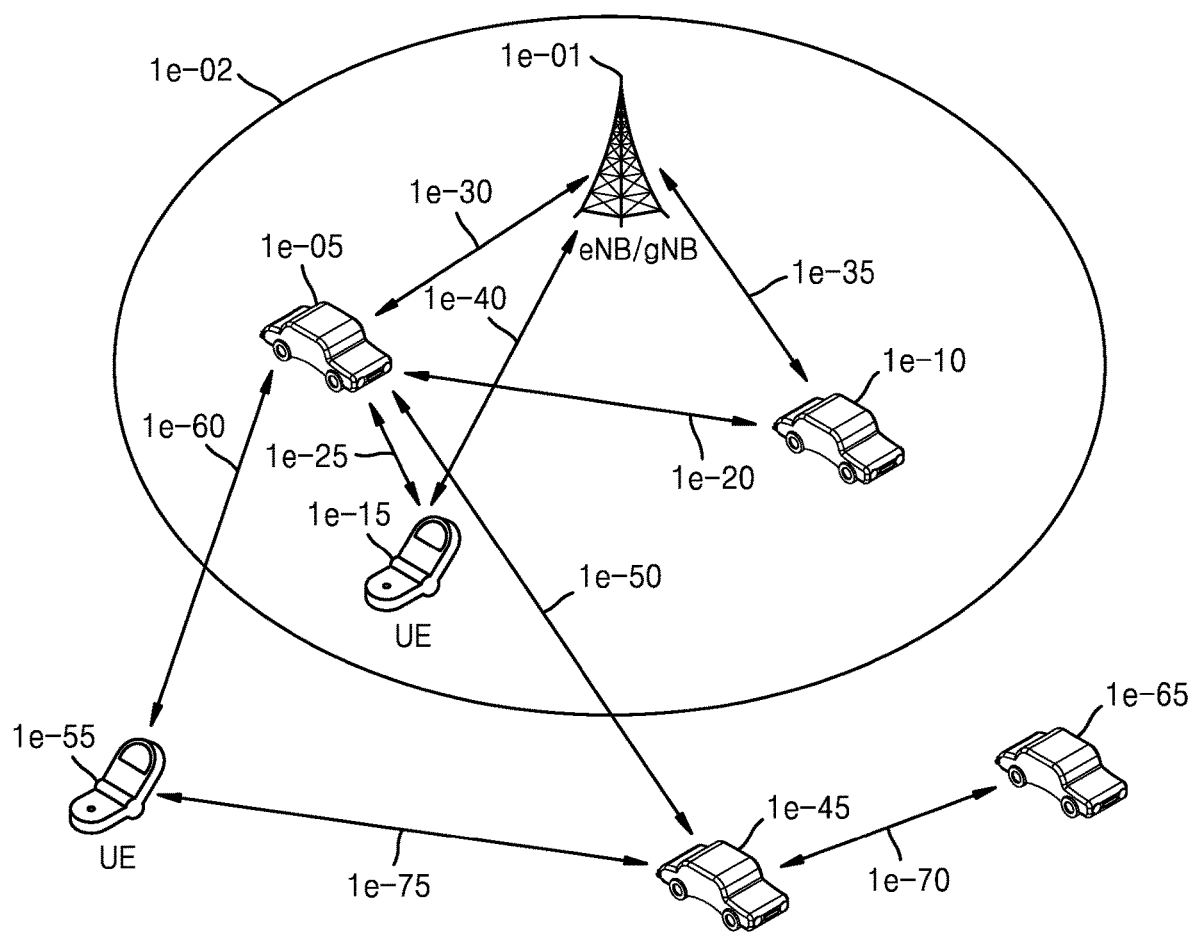
FIG. 1E is a diagram for describing vehicle-to-everything (V2X) communication of a next-generation mobile communication system, according to an embodiment of the disclosure.

FIG. 1E is a diagram for describing vehicle-to-everything (V2X) communication of a next-generation mobile communication system, according to an embodiment of the disclosure.

V2X according to an embodiment of the disclosure commonly refers to communication technology via a vehicle and all interfaces and includes vehicle-to-vehicle (V2V), vehicle-to-infrastructure (V2I), vehicle-to-pedestrian (V2P), or vehicle-to-network (V2N), depending on a shape thereof and components providing communication.

Referring to FIG. 1E, a base station 1e-01 may include at least one vehicle terminal 1e-05 or 1e-10 and a pedestrian mobile terminal 1e-15, which are located within a cell 1e-02 supporting V2X. The V2X is supportable via a Uu interface and/or a PC5 interface. When the V2X is supported via the Uu interface, for example, the vehicle terminal 1e-05 or 1e-10 may perform V2X cellular communication with the base station 1e-01 by using vehicle terminal-base station UL/DL 1e-30 or 1e-35, or the pedestrian mobile terminal 1e-15 may perform V2X cellular communication by using pedestrian terminal-base station UL/DL 1e-40.

When the V2X is supported via the PC5 interface, V2X sidelink (SL) communication may be performed by using terminal-terminal SL 1e-20 or 1e-25. For example, the vehicle terminal 1e-05 in coverage of a base station (E-TURA/NR) may transmit or receive a V2X packet to or from another vehicle terminal 1e-10 or 1e-45 and/or a pedestrian mobile terminal 1e-15 or 1e-55, via SL 1e-20, 1e-50, 1e-25, or 1e-60, i.e., a transmission channel. The V2X packet may be transmitted or received in a broadcast transmission type and/or a unicast and/or groupcast transmission type.

A terminal supporting V2X SL communication may transmit or receive the V2X packet via a resource assignment mode (scheduled resource allocation or UE autonomous resource selection). The scheduled resource allocation (mode 1 and/or mode 3) is a mode in which a base station allocates a resource used for SL transmission to an RRC connected mode terminal, via a dedicated scheduling method. The scheduled resource allocation mode may be effective in interference management and/or management of a resource pool (dynamic allocation or semi-persistence transmission) because the base station is able to manage resources of SL. When there is data to be transmitted to other terminal(s), the RRC connected mode terminal may notify the base station that there is the data to be transmitted to the other terminal(s) by using an RRC message or an MAC control element (CE). For example, the RRC message may use SidelinkUEInformation, an UEAssistanceInformation message, or the like, and the MAC CE may use a buffer status report MAC CE in a new format (including at least an indicator indicating a buffer status report for V2X communication and information about a data size buffered for SL communication), or the like.

The UE autonomous resource selection (mode 2 and/or mode 4) is a mode in which a base station provides system information and/or SL resource information/pool via an RRC message, to a terminal supporting V2X SL communication, and the terminal selects a resource according to a determined rule. When the base station provides information to the terminal by using the system information, for example, the base station may provide the SL resource information to the terminal by signaling SIB21, SIB26, or SIM or the like to be newly defined for an NR V2X terminal. When the base station provides information to the terminal by using the RRC message, for example, the base station may provide the SL resource information to the terminal by signaling, to the terminal, an RRC connection reconfiguration (RRCReconfiguration) message and/or a connection resume (RRCResume) message. Also, in the UE autonomous resource selection mode, the terminal may help other terminal(s) to select a resource used for SL, via a PC5-RRC message and/or MAC CE, or allocate a resource used for SL transmission via scheduling or directly/indirectly. In other words, the UE autonomous resource selection mode may include one or more modes among following resource allocation modes.

UE autonomously selects sidelink resource for transmission

UE assists sidelink resource selection for other UEs

UE is configured with NR configured grant for sidelink transmission

UE schedules sidelink transmission of other UEs

A resource selecting method of the terminal may include zone mapping, sensing-based resource selection, random selection, configured grant-based resource selection, or the like.

The terminal supporting the V2X SL communication may transmit or receive the V2X packet, based on a pre-configured resource pool (preconfiguration resource), by being included in SL-V2X-Preconfiguration that is an information element (IE). For example, when the terminal is unable to perform the V2X SL communication based on the scheduled resource allocation and/or UE autonomous resource selection mode due to certain reasons, despite that the terminal is in coverage of the base station, the terminal may perform the V2X SL communication via an SL transmission/reception resource pool preconfigured in the SL-V2X-Preconfiguration that is the IE. Also, the vehicle terminal 1e-45 out-of-coverage of the base station (E-UTRA/NR) may perform the V2X SL communication with the other vehicle terminal 1e-65 or the pedestrian mobile terminal 1e-55, based on the SL preconfiguration resource via SL 1e-70 or 1e-75.

LTE V2X SL communication is designed mainly for a basic safety service. In other words, the terminal supporting the LTE V2X SL communication is designed to provide the basic safety service to all adjacent terminals supporting the LTE V2X SL communication, via a broadcast transmission type. Accordingly, the terminal is not required to perform a process of separately establishing a session with another specific terminal or perform an SL connection establishment procedure.

However, the V2X SL communication may be designed to provide not only the basic safety service, but also various improved services (for example, an autonomous driving service, a platnooning service, a remote driving service, and in-vehicle infotainment) in a next-generation mobile communication (NR). Accordingly, NR V2X SL communication may be designed to support not only a broadcast transmission type, but also a unicast and/or groupcast transmission type.

Figure 1F:
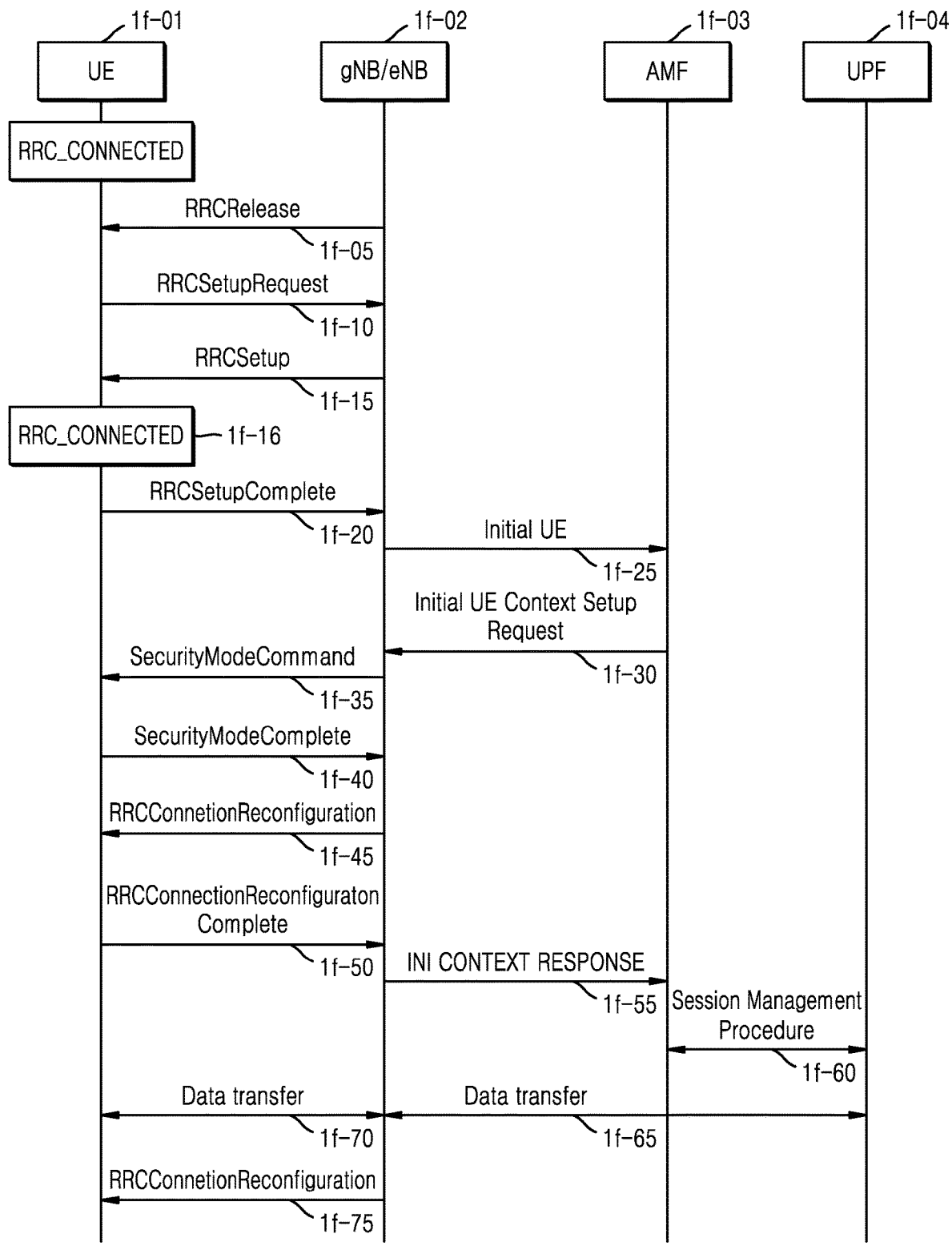
FIG. 1F is a diagram for describing a procedure in which a base station releases a connection of a user equipment (UE) such that the UE switches from a radio resource control (RRC) connected mode to an RRC idle mode, and a procedure in which the UE establishes a connection with the base station to switch from the RRC idle mode to the RRC connected mode, according to an embodiment of the disclosure.

FIG. 1F is a diagram for describing procedures in which a base station releases a connection with a terminal and the terminal switches from an RRC connected mode (RRC_CONNECTED) to an RRC idle mode (RRC_IDLE) and procedures in which the terminal establishes a connection with the base station and switches from the RRC idle mode (RRC_IDLE) to the RRC connected mode (RRC_CONNECTED), according to an embodiment of the disclosure.

Referring to FIG. 1F, a UE 1f-01 may establish an RRC connection with a gNB/eNB 1f-02 and thus be in an RRC connected mode (RRC_CONNECTED). When the UE 1f-01 that transmits or receives data in the RRC connected mode does not transmit or receive data for a certain period of time or due to a certain reason, the gNB/eNB 1f-02 may transmit, to the UE 1f-01, an RRC connection release (RRCRelease) message not including suspended configuration information (suspendConfig or rrc-InactiveConfig) (operation 1f-05) to control the UE 1f-01 to transit to an RRC idle mode (RRC_IDLE).

When data to be transmitted later is generated, the UE 1f-01 in the RRC idle mode may perform an RRC connection establishment procedure with the gNB/eNB 1f-02. The UE 1f-01 may establish inverse direction transmission synchronization with the gNB/eNB 1f-02 via a random access process, and transmit an RRC connection request (RRC-SetupRequest) message to the gNB/eNB 1f-02 (operation 1f-10). The RRC connection request message may include an identifier (ue-Identity) of the UE 1f-01 and a reason (establishmentCause) for establishing a connection.

The gNB/eNB 1f-02 may transmit, to the UE 1f-01, an RRC connection establishment (RRC Setup) message such that the UE 1f-01 establishes an RRC connection (operation 1f-15). The RRC connection establishment message may include RRC connection configuration information or the like. For example, the RRC connection configuration information may include radio bearer configuration information (radioBearerConfig), master cell group configuration information (masterCellGroup), or the like. The radio bearer configuration information and master cell group configuration information may include at least one of pieces of information among information involving a signaling radio bearer (SRB)1 connection, RLC bearer configuration information for SRB1, MAC cell group configuration information (mac-CellGroupConfig), and physical cell group configuration information (physicalCellGroupConfig). In other words, the RRC connection establishment may involve an SRB1 connection and may not involve another radio bearer connection excluding SRB1 (for example, the RRC connection establishment may not involve SRB2 for the UE 1f-01 and gNB/eNB 1f-02 to transmit or receive an NAS message or a data radio bearer (DRB) connection for transmitting or receiving data).

The UE 1f-01 that established the RRC connection (or received the RRC connection establishment message) may transit to the RRC connected mode (RRC_CONNECTED) (operation 1f-16), and transmit an RRC connection establishment complete (RRCSetupComplete) message to the gNB/eNB 1f-02 (operation 1f-20). The RRC connection establishment complete message may include a service request message requesting, by the UE **1*f*-01, an access and mobility management function (AMF) 1*f*-03 for bearer configuration for a certain service. The gNB/eNB 1*f*-02 may transmit, to the AMF 1*f*-03, an initial UE message including the service request message included in the RRC connection establishment complete message (operation 1*f*-25), and the AMF 1*f*-03 may determine whether to provide a service requested by the UE 1*f*-01. When the service requested by the UE 1*f*-01 is providable as a result of the determination, the AMF 1*f*-03 may transmit, to the gNB/eNB 1*f*-02, an initial UE context setup request message (operation 1*f*-30**). The initial UE context setup request message may include at least one piece of information from among QoS information to be applied during DRB configuration, security-related information to be applied to DRB (for example, a security key or a security algorithm), and the like.

After the RRC connection establishment procedure is successfully performed, the gNB/eNB **1*f*-02 may transmit, to the UE 1*f*-01, a security mode command (SecurityModeCommand) message so as to activate AS security with the UE 1*f*-01 in the RRC connected mode (operation 1*f*-35). Upon receiving the security mode command message, the UE 1*f*-01 may transmit a security mode complete (SecurityModeComplete) message to the gNB/eNB 1*f*-02 (operation 1*f*-40**).

When transmitting a security command message, the gNB/eNB **1*f*-02 may perform an RRC connection reconfiguration (RRC reconfiguration) procedure with the UE 1*f*-01 after the security mode command message is transmitted or after the security mode complete message is received. First, the gNB/eNB 1*f*-02 may transmit an RRC connection reconfiguration (RRCReconfiguration) message to the UE 1*f*-01 (operation 1*f*-45). The RRC connection reconfiguration message may include configuration information of DRB for processing user data or configuration information of SRB2 for transmitting an NAS message. When the RRC connection reconfiguration message is received, the UE 1*f*-01 may apply the configuration information included in the RRC connection reconfiguration message and transmit an RRC connection reconfiguration complete (RRCReconfigurationComplete) message to the gNB/eNB 1*f*-02 (operation 1*f*-50). The gNB/eNB 1*f*-02 that completed the DRB configuration with the UE 1*f*-01 may transmit, to the AMF 1*f*-03, an initial UE context setup response message (operation 1*f*-55), and the AMF 1*f*-03 that received the initial UE context setup response message may establish a PDU session by performing a session management procedure with a user plane function (UPF) 1*f*-04 (operation 1*f*-60). When the above-described processes are completed, the UE 1*f*-01 may transmit or receive data to or from the gNB/eNB 1*f*-02 via the UPF 1*f*-04 (operations 1*f*-65 and 1*f*-70**).

As described above, general data transmission processes may largely include three steps of RRC connection establishment, security setting, and DRB configuration. Also, the gNB/eNB **1*f*-02 may transmit the RRC connection reconfiguration message (RRCConnectionReconfiguration) to the UE 1*f*-01** to newly configure, add a configuration, or change the configuration, due to a certain reason.

As described above, many signaling procedures are required for the UE **1*f*-01 to establish the RRC connection and switch from the RRC idle mode to the RRC connected mode. Accordingly, in a next-generation mobile communication system, an RRC inactive mode (RRC_INACTIVE) may be newly defined. In a new mode, such as the RRC inactive mode, the UE 1*f*-01 and the gNB/eNB 1*f*-02 store context of the UE 1*f*-01 and may maintain an Si bearer when necessary, and thus when the UE 1*f*-01** in the RRC inactive mode is to access a network again, the network may be accessed faster and data may be transmitted or received via fewer signaling procedures, through an RRC connection resume procedure proposed below.

Figure 1G:
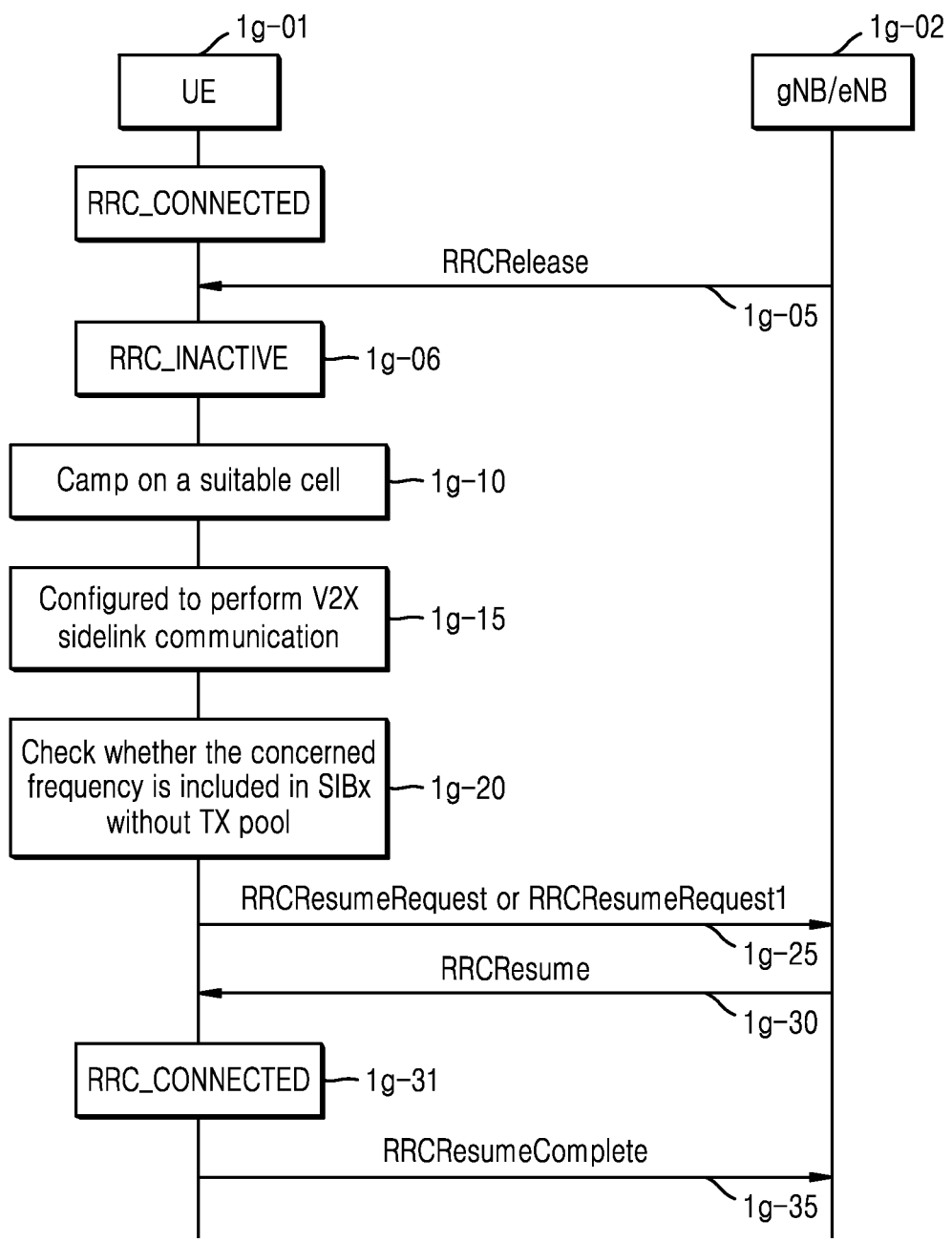
FIG. 1G is a diagram for describing a procedure in which a base station disconnects a UE such that the UE switches from an RRC connected mode to an RRC inactive mode, and a procedure in which the UE resumes connection with the base station to switch from the RRC inactive mode to the RRC connected mode, according to an embodiment of the disclosure.

FIG. 1G is a diagram for describing procedures in which a base station releases a connection with a UE and the UE switches from an RRC connected mode (RRC_CONNECTED) to an RRC inactive mode (RRC_INACTIVE) and procedures in which the UE resumes a connection with the base station and switches from the RRC inactive mode (RRC_INACTIVE) to the RRC connected mode (RRC_CONNECTED), according to an embodiment of the disclosure.

Referring to FIG. 1G, a UE **1*g*-01 may establish an RRC connection with a gNB/eNB 1*g*-02 and thus be in an RRC connected mode (RRC_CONNECTED). When the UE 1*g*-01 that transmits or receives data in the RRC connected mode does not transmit or receive data for a certain period of time or due to a certain reason, the gNB/eNB 1*g*-02 may transmit, to the UE 1*g*-01, an RRC connection release (RRCRelease) message including suspended configuration information (suspendConfig or rrc-InactiveConfig) (operation 1*g*-05) to control the UE 1*g*-01** to transit to an RRC inactive mode (RRC_INACTIVE).

A series of operations of the UE **1*g*-01 proposed when the UE 1*g*-01 receives the RRC connection release message including the suspended configuration information from the gNB/eNB 1*g*-02** are as follows.

The UE **1*g*-01** may apply the received suspended configuration information (apply the received suspendConfig). The suspended configuration information may include at least one of following parameters.

Full UE connection resume identifier (full-radio network temporary identifier (RNTI): When useFullResumeID is signaled to an SIB1 broadcasted by a cell of which a connection is to be resumed later, via a cell selection/reselection process, the UE **1*g*-01 may transmit an RRCResumeRequest1 message to the cell. In other words, the UE 1*g*-01** may transmit the RRCResumeRequest1 message to the cell by configuring resumeIdentity to be an I-RNTI value.

Short UE connection resume identifier (ShortI-RNTI): When the useFullResumeID is not signaled to the SIM broadcasted by the cell of which the connection is to be resumed later, via the cell selection/reselection process, the UE **1*g*-01 may transmit an RRCResumeRequest message to the cell. In other words, the UE 1*g*-01** may transmit the RRCResumeRequest message to the cell by configuring resumeIdentity to be an ShortI-RNTI value.

Radio access network (RAN) paging cycle (ran-PagingCycle): The UE **1*g*-01 in the RRC inactive mode may monitor RAN-initiated paging by applying PagingCycle included in a ran-PagingCycle field. When RAN-initiated paging is received, the UE 1*g*-01 may perform an RRC connection resume procedure with the gNB/eNB 1*g*-02**.

RAN-based notification area information (ran-NotificationAreaInfo): The UE **1*g*-01 in the RRC inactive mode may perform an RAN-based notification area (RNA) update (RNAU) procedure with the cell or gNB/eNB 1*g*-02** when deviating from an RNA after receiving the SIB1.

T380: PeridocRNAU-TimerValue for the UE **1*g*-01 in the RRC inactive mode to periodically perform the RNAU procedure may be included. When the above value is included, the UE 1g-01 may operate a T380 timer by setting the T380 timer to the above value. Also, when the timer expires, the UE 1g-01 may perform the RNAU procedure with the gNB/eNB 1g-02**.

nextHopChaingCount: The UE 1g-01 in the RRC inactive mode may update a security key ($K_{gNB}$ key) and parameters related thereto, by using NextHopChainingCount.

The UE 1g-01 may reset a media access control (MAC) layer. This is to, when a connection is resumed again, prevent data stored in a hybrid automatic request (HARD) buffer from being unnecessarily retransmitted.

The UE 1g-01 may re-establish radio link control (RLC) layers for the SRB1. This is to, when a connection is resumed again, prevent data stored in an RLC buffer from being unnecessarily retransmitted and initiate variables to be used later.

The UE 1g-01 may store UE inactive AS context. The UE inactive AS context may include at least one of configured suspended configuration information, a current security key ($K_{gNB}$ key and/or $K_{RRCint}$ key), an ROHC state, a UE cell identifier (C-RNTI) that was used in a source cell (source PCell), a cell identity (cellIdentity) and physical cell identity) of the source cell, or all other parameters configured except ReconfigurationWithSync.

The UE 1g-01 may suspend all SRBs and data radio bearers (DRBs) excluding an SRB0.

The UE 1g-01 may indicate PDCP suspension to lower layers for all DRBs.

When t380 is included in the received suspended configuration information, the UE 1g-01 may operate the T380 timer by setting a timer value to t380.

When waitTime is included in the RRC connection release message, the UE 1g-01 may operate a T320 timer by setting a timer value to waitTime. Also, the UE 1g-01 may notify an upper layer that access barring is applicable to all access categories, excluding access categories of '0' and '2'.

The UE 1g-01 may transit to an RRC inactive mode (RRC_INACTIVE) (operation 1g-06) and perform a cell selection procedure.

The UE 1g-01 transited to the RRC inactive mode performs the cell selection procedure or cell reselection procedure, and may camp-on to find a suitable cell (operation 1g-10). To perform the cell selection procedure or cell reselection procedure, the UE 1g-01 may receive system information (for example, MIB and/or SIB1 and/or SIB1 and/or SIB3 and/or SIB4 and/or SIB5) broadcasted by the cell.

Alternatively, in operation 1g-10, when the UE 1g-01 in the RRC inactive mode is able to perform vehicle-to-everything (V2X) sidelink communication, the UE 1g-01 may receive system information including V2X sidelink communication configuration information from a serving cell that is currently camped-on. For example, when the serving cell is a long-term evolution (LTE) cell, the system information may include at least one of SIB21 and/or SIB26 and/or one or a plurality of SIBa to be newly defined (here, a may denote one or more different numbers). For example, when the serving cell is a new radio (NR) cell, the system information may include at least one of one or more SIBb to be newly defined (here, b may denote one or more different numbers).

The V2X sidelink communication configuration information may include at least one piece of information from among a V2X sidelink communication reception resource pool (for example, v2x-CommRxPool), a V2X sidelink communication transmission resource pool (for example, v2x-CommTxPoolNormalCommon), a V2X sidelink communication transmission resource pool that may be used in an exceptional situation (for example, v2x-CommTxPoolExceptional), or an adjacent frequency resource information list for performing V2X sidelink communication (v2x-InterfreqInfoList). Also, the system information including the V2X sidelink communication configuration information may be broadcasted for each radio access technology (RAT). For example, system information including LTE V2X sidelink configuration information and system information including NR V2X sidelink configuration information may be separately broadcasted. Alternatively, system information including V2X sidelink communication configuration information regarding a plurality of RATs may be broadcasted. For example, system information including both the LTE V2X sidelink configuration information and the NR V2X sidelink configuration information may be broadcasted.

An ASN.1 structure for the SIB21 or SIB26 may refer to "36.331: Radio Resource Control (RRC)" that is the 3GPP standard document. An SIBx according to an embodiment of the disclosure may denote at least one of SIB21 and/or SIB26 and/or SIBa and/or SIBb. The ASN.1 structure of the system information (SIBx) to be newly defined may be as follows.

SystemInformationBlockTypex

The IE SystemInformationBlockTypex contains NR V2X and/or LTE V2X sidelink communication configuration.

SystemInformationBlockTypex Information Element

```
-- ASN1START
SystemInformationBlockTypex ::= SEQUENCE {
    sl-V2X-ConfigCommon              SL-V2X-ConfigCommon
        OPTIONAL,
    lateNonCriticalExtension         OCTET STRING
                            OPTIONAL,
    ...
}
SL-V2X-ConfigCommon ::=      SEQUENCE {
    v2x-CommRxPool                   SL-CommRxPoolListV2X
        OPTIONAL,
    v2x-CommTxPoolNormalCommon       SL-CommTxPoolListV2X
        OPTIONAL,
    p2x-CommTxPoolNormalCommon       SL-CommTxPoolListV2X
        OPTIONAL,
    v2x-CommTxPoolExceptional        SL-CommResourcePoolV2X
        OPTIONAL,
```

```
v2x-SyncConfig                     SL-SyncConfigListV2X
   OPTIONAL,
v2x-InterFreqInfoList              SL-InterFreqInfoListV2X
   OPTIONAL,
v2x-ResourceSelectionConfig        SL-CommTxPoolSensingConfig
   OPTIONAL,
zoneConfig                         SL-ZoneConfig
   OPTIONAL,
typeTxSync                         SL-TypeTxSync
   OPTIONAL,
thresSL-TxPrioritization    SL-Priority
   OPTIONAL,
anchorCarrierFreqList              SL-AnchorCarrierFreqList-V2X OPTIONAL,
offsetDFN                                       INTEGER (0..1000)
                        OPTIONAL,
cbr-CommonTxConfigList             SL-CBR-CommonTxConfigList
   OPTIONAL
cbr-pssch-TxConfigList             SL-CBR-PPPP-TxConfigList
   OPTIONAL,
v2x-PacketDuplicationConfig        SL-V2X-PacketDuplicationConfig
   OPTIONAL,          SyncFreqList            SL-V2X-
SyncFreqList           OPTIONAL,
   slss-TxMultiFreq                ENUMERATED{true}
      OPTIONAL,
v2x-FreqSelectionConfigList        SL-V2X-FreqSelectionConfigList
   OPTIONAL,
threshS-RSSI-CBR                                INTEGER (0..45)
                        OPTIONAL,
}
-- ASN1STOP
```

In operation 1g-15, when the UE 1g-01 is able to perform the V2X sidelink communication, the UE 1g-01 in the RRC inactive mode may be configured to perform the V2X sidelink communication by upper layers (for example, a V2X layer) in the UE. The UE 1g-01 may be configured to perform the V2X sidelink communication in at least one of following three cases.

First case: When configured by the upper layers to perform the LTE V2X sidelink communication at a specific frequency.

Second case: When configured by the upper layers to perform the NR V2X sidelink communication at a specific frequency.

Third case: When configured by the upper layers to simultaneously perform the LTE V2X sidelink communication and the NR V2X sidelink communication at a specific frequency or a plurality of frequencies.

Alternatively, in operation 1g-15, the UE 1g-01 in the RRC inactive mode being configured to perform the V2X sidelink communication may include at least one of being configured to transmit non-pedestrian-to-everything (P2X) related V2X sidelink communication and related data or being configured to transmit P2X related V2X sidelink communication and related data.

In operation 1g-20, the UE 1g-01 in the RRC inactive mode may perform following operations when configured to transmit the non-P2X related V2X sidelink communication and related data at the specific frequency in operation 1g-15. When the system information received in operation 1g-10 includes the specific frequency but does not include a V2X sidelink communication transmission resource pool associated with the specific frequency (a concerned frequency is included in SIBx without TX pool), the UE 1g-01 may perform an RRC connection resume procedure with the gNB/eNB 1g-02. For example, the UE 1g-01 may determine that the V2X sidelink communication transmission resource pool is not included in the system information in a following case.

When a frequency configured for performing the V2X sidelink communication in operation 1g-15 is a frequency (camped frequency) camped-on by the UE 1g-01, the UE 1g-01 broadcasts the SIBx by a cell camped-on by the UE 1g-01, and the SIBx of a valid version includes sl-V2X-ConfigCommon but the sl-V2X-ConfigCommon does not include the TX pool (for example, v2x-CommTxPoolNormalCommon) (if the frequency on which the UE is configured to transmit non-P2X related V2X sidelink communication concerns the camped frequency; and if SystemInformationBlockTypex is broadcast by the cell on which the UE camps; and if the valid version of SystemInformationBlockTypex includes sl-V2X-ConfigCommon; and sl-V2X-ConfigCommon does not include v2x-CommTxPoolNormalCommon)

Alternatively, when the frequency configured for performing the V2X sidelink communication in operation 1g-15 is included in the v2x-InterFreqInfoList signaled from the SIBx broadcasted by the cell camped-on by the UE 1g-01, and the SIBx of the valid version does not include the TX pool (for example, v2x-CommTxPoolNormal) (if the frequency on which the UE is configured to transmit non-P2X related V2X sidelink communication is included in v2x-InterFreqInfoList within SystemInformationBlockTypex broadcast by the cell on which the UE camps; and if the valid version of SystemInformationBlockTypex does not include v2x-CommTxPoolNormal for the concerned frequency)

Alternatively, in operation 1g-20, the UE 1g-01 in the RRC inactive mode may perform following operations when configured to transmit the P2X related V2X sidelink communication and related data in operation 1g-15. When the system information received in operation 1g-10 includes the specific frequency but does not include the V2X sidelink communication transmission resource pool associated with the specific frequency (the concerned frequency is included in SIBx without TX pool), the UE 1g-01 may perform the RRC connection resume procedure with the gNB/eNB 1g-02. For example, the UE 1g-01 may determine that the V2X sidelink communication transmission resource pool is not included in the system information in a following case.

When a frequency configured by the upper layers for performing the V2X sidelink communication in operation 1g-15 is a frequency (camped frequency) camped-on by the UE 1g-01, the UE 1g-01 broadcasts the SIBx by a cell camped-on by the UE 1g-01, and the SIBx of a valid version includes sl-V2X-ConfigCommon but the sl-V2X-ConfigCommon does not include the TX pool (for example, p2x-CommTxPoolNormalCommon) (if the frequency on which the UE is configured to transmit P2X related V2X sidelink communication concerns the camped frequency; and if SystemInformationBlockTypex is broadcast by the cell on which the UE camps; and if the valid version of SystemInformationBlockTypex includes sl-V2X-ConfigCommon; and sl-V2X-ConfigCommon does not include p2x-CommTxPoolNormalCommon)

Alternatively, when the frequency configured by the upper layers for performing the V2X sidelink communication in operation 1g-15 is included in the v2x-InterFreqInfoList signaled from the SIBx broadcasted by the cell camped-on by the UE 1g-01, and the SIBx of the valid version does not include the TX pool (for example, p2x-CommTxPoolNormal) (if the frequency on which the UE is configured to transmit non-P2X related V2X sidelink communication is included in v2x-InterFreqInfoList within SystemInformationBlockTypex broadcast by the cell on which the UE camps; and if the valid version of SystemInformationBlockTypex does not include p2x-CommTxPoolNormal for the concerned frequency)

In operation 1g-25, when it is determined that the system information does not include the V2X sidelink communication transmission resource pool in operation 1g-20, the UE 1g-01 in the RRC inactive mode may perform the RRC connection resume procedure with the gNB/eNB 1g-02 that is to resume the RRC connection. Here, the UE 1g-01 may detect that the operated T380 timer is expired or determine or detect that the configured RNA is deviated, based on the received SIB1. Alternatively, in operation 1g-20, the UE 1g-01 may simultaneously perform an operation of determining that the system information does not include the V2X sidelink communication transmission resource pool, and an operation of detecting that the operated T380 timer is expired or determining/detecting that the configured RNA is deviated, based on the received SIB1.

As described above in the disclosure, the operated T380 timer being expired or the determining or detecting of the configured RNA being deviated based on the received RSIB1 may be a triggering condition regarding performing of the RNAU procedure of the UE. Meanwhile, when the system information does not include the V2X sidelink communication transmission resource pool, it may be vague whether the UE 1g-01 is to perform the RNAU procedure or to perform the RRC connection resume procedure for transiting to the RRC connected mode so as to be configured with the V2X sidelink communication transmission resource pool by the gNB/eNB 1g-02. When the system information does not include the V2X sidelink communication transmission resource pool, an embodiment of the disclosure proposes performing of the RRC connection resume procedure for the UE 1g-01 to transit to the RRC connected mode. Regarding operations of the UE 1g-01 performing a random access procedure with the gNB/eNB 1g-02 and transmitting/receiving an RRC message to/from the gNB/eNB 1g-02, proposed operations of the UE 1g-01 are as follows (operation 1g-25).

1. When the useFullResumeID field is signaled from the system information (SIB1), the UE 1g-01 may select a message to be transmitted to the gNB/eNB 1g-02 to be RRCResumeRequest1. The UE 1g-01 may prepare transmission by adding resumeIdentity to the RRCResumeRequest1 message, as the full-RNTI value. When the useFullResumeID field is not signaled from the system information (SIB1), the UE 1g-01 may select the message to be transmitted to the gNB/eNB 1g-02 to be RRCResumeRequest. The UE 1g-01 may prepare the transmission by adding shortResumeIdentity to the RRCResumeRequest message, as the shortI-RNTI value.

2. The UE 1g-01 may select one of values of {emergency, highPriorityAccess, mt-Access, mo-Signalling, mo-Data, mo-VoiceCall, mo-VideoCall, mo-SMS, ma-Update, mps-PriorityAccess, mcs-PriorityAccess, spare1, spare2, spare3, spare4, spare5}, as a cause (resumeCause) for resuming a connection. When the resumeCause is configured to 'ma-Update', the UE 1g-01 may maintain the RRC inactive mode by receiving the RRC connection release message including the suspended configuration information from the gNB/eNB 1g-02. When the resumeCause is configured to 'ma-Update', the UE needs to initiate the RRC connection resume procedure again to request the gNB/eNB for Tx pool, after the RNAU procedure is ended. This may increase signaling overhead between the UE and the gNB/eNB and cause latency, and thus it may be difficult to smoothly perform the V2X sidelink communication that require low latency communication. Thus, it is proposed that the UE 1g-01 configures the resumeCause to a value other than 'ma-Update'. When the resumeCause is configured to 'ma-Update', the UE 1g-01 is unable to transit to an RRC connected mode, and thus unable to request the gNB/eNB 1g-02 for the Tx pool or receive the Tx pool from the gNB/eNB 1g-02. In other words, the UE 1g-01 may configure the resumeCause to be configured with the V2X sidelink communication transmission resource pool from the gNB/eNB 1g-02. For example, the UE 1g-01 may configure the resumeCause to 'mo-Signalling'. When the system information does not include the V2X sidelink communication transmission resource pool and thus the Tx pool needs to be received from the gNB/eNB 1g-02 (for example, via an RRC connection with the gNB/eNB 1g-02), the UE 1g-01 may transit to the RRC connected mode instead of maintaining the RRC inactive mode, by configuring mo-Signalling in an RRC resume request message as resumeCause, even when the RNAU procedure is triggered.

ResumeCause

The IE ResumeCause is used to indicate the resume cause in RRCResumeRequest and RRCResumeRequest1.

ResumeCause Information Element

```
-- ASN1START
-- TAG-RESUME-CAUSE-START
ResumeCause ::=          ENUMERATED {emergency, highPriorityAccess, mt-Access,
mo-Signalling,
                    mo-Data, mo-VoiceCall, mo-VideoCall, mo-
SMS, rna-Update, mps-PriorityAccess, mcs-PriorityAccess,
spare1, spare2, spare3, spare4, spare5 }
-- TAG-RESUME-CAUSE-STOP
-- ASN1STOP
```

3. The UE 1g-01 may reconstruct RRC configuration information and security context information from UE inactive AS context that was stored excluding cell group configuration information (cellGroupConfig).

4. The UE 1g-01 may calculate MAC-I and prepare for transmission by adding last 16 bits to a resumeMAC-I field of the RRCResumeRequest1 message or RRCResumeRequest message that is a selected message.

5. The UE 1g-01 may update a new KgNB security key based on a current kgNB security key, a NextHop (NH) value, and a stored NCC value.

6. Also, the UE 1g-01 derives, by using the newly updated KgNB security key, new security keys (K_RRCenc, K_RRC_int, K_UPint, K_UPenc) to be used for an integrity protection and verification procedure and an encoding and decoding procedure.

7. Also, the UE 1g-01 resumes the integrity protection and verification procedure by applying, on all bearers excluding SRB0, updated security keys and a pre-configured algorithm, and applies integrity verification and protection on pieces of data transmitted and received thereafter. This is to increase reliability and security of pieces of data transmitted and received from the SRB1 or DRBs thereafter.

8. Also, the UE 1g-01 resumes the encoding and decoding procedure by applying, on all bearers excluding SRB0, the updated security keys and the pre-configured algorithm, and applies encoding and decoding on the pieces of data transmitted and received thereafter. This is to increase the reliability and security of the pieces of data transmitted and received from the SRB1 or DRBs thereafter.

9. The UE 1g-01 may reconstruct a PDCP state and re-establish PDCP entities for the SRB1.

10. The UE 1g-01 resumes the SRB1. This is because the RRCResume message is to be received via the SRB1, as a response to the RRCResumeRequest message or RRCResumeRequest1 message to be transmitted.

11. The UE 1g-01 configures a message selected for transmission to the gNB/eNB 1g-02, i.e., the RRCResumeRequest message or RRCResumeRequest1 message, and transmits the same to lower layers.

12. The UE 1g-01 transmits the RRCResumeRequest message or RRCResumeRequest1 message to the gNB/eNB 1g-02 and operates a T319 timer.

Operations of the UE 1g-01 proposed when the UE 1g-01 in the RRC inactive mode receives the RRC connection resume message (RRCResume message) in operation 1g-30 are as follows.

1. The UE 1g-01 stops the T319 timer being operated when the RRCResumeRequest message or RRCResumeRequest1 message is transmitted to the gNB/eNB 1g-02.

2. When the RRCResume message includes a full configuration information (fullConfig), the UE 1g-01 performs a full configuration procedure. When the RRCResume message does not include the fullConfig, the UE 1g-01 reconstructs the PDCP state upon receiving the RRCResume message and resets a count value for the SRB2 and all DRBs. Also, the UE 1g-01 reconstructs cell group configuration information (cellGroupConfig) from stored UE context. Also, the UE 1g-01 instructs details related to the above-described operations to lower layers.

3. The UE 1g-01 releases a full UE connection resume identity (Full-RNTI), a divided UE connection resume identity (ShortI-RNTI), and the stored UE context. Here, RNA information (ran-NotificatioAreaInfo) is not released.

4. When the RRCResume message includes master cell group (masterCellGroup) configuration information, the UE 1g-01 may perform a cell group configuration procedure according to the master cell group configuration information.

5. When the RRCResume message includes bearer configuration information (radioBearerConfig), the UE 1g-01 may configure a bearer according to the bearer configuration information.

6. The UE 1g-01 resumes the SRB2 and all DRBs.

7. The UE 1g-01 discards stored cell reselection priority information when there is one. The cell reselection priority information may be information stored based on CellReselectionPriorities that may be included in an RRCRelease message, or cell reselection priority information received from another RAT.

8. The UE 1g-01 may stop a T320 timer when the T320 timer is being operated.

9. When the RRCResume message includes frequency measurement configuration information (measConfig), the UE 1g-01 may perform frequency measurement according to the frequency measurement configuration information.

10. When the RRC connection is suspended, the UE 1g-01 may resume the frequency measurement.

11. The UE 1g-01 transits to the RRC connected mode (operation 1g-31).

12. The UE 1g-01 indicates the upper layers that the suspended RRC connection is resumed.

13. The UE 1g-01 may stop the cell reselection procedure.

14. The UE 1g-01 considers a currently accessed cell to be a primary cell (PCell).

15. Also, the UE 1g-01 configures an RRC connection resume complete (RRCResumeComplete) message as below for transmission to lower layers, and transmits the same to the gNB/eNB 1g-02 (operation 1g-35).

A. When upper layers provided NAS PDU, the NAS PDU may be included in dedicatedNAS-Message.

B. When the upper layers or NAS layer provided a PLMN, a PLMN selected by the upper layers or NAS layer from plmn-IdentityList included in the SIB1 may be configured as selectedPLMN-Identity.

Figure 1H:
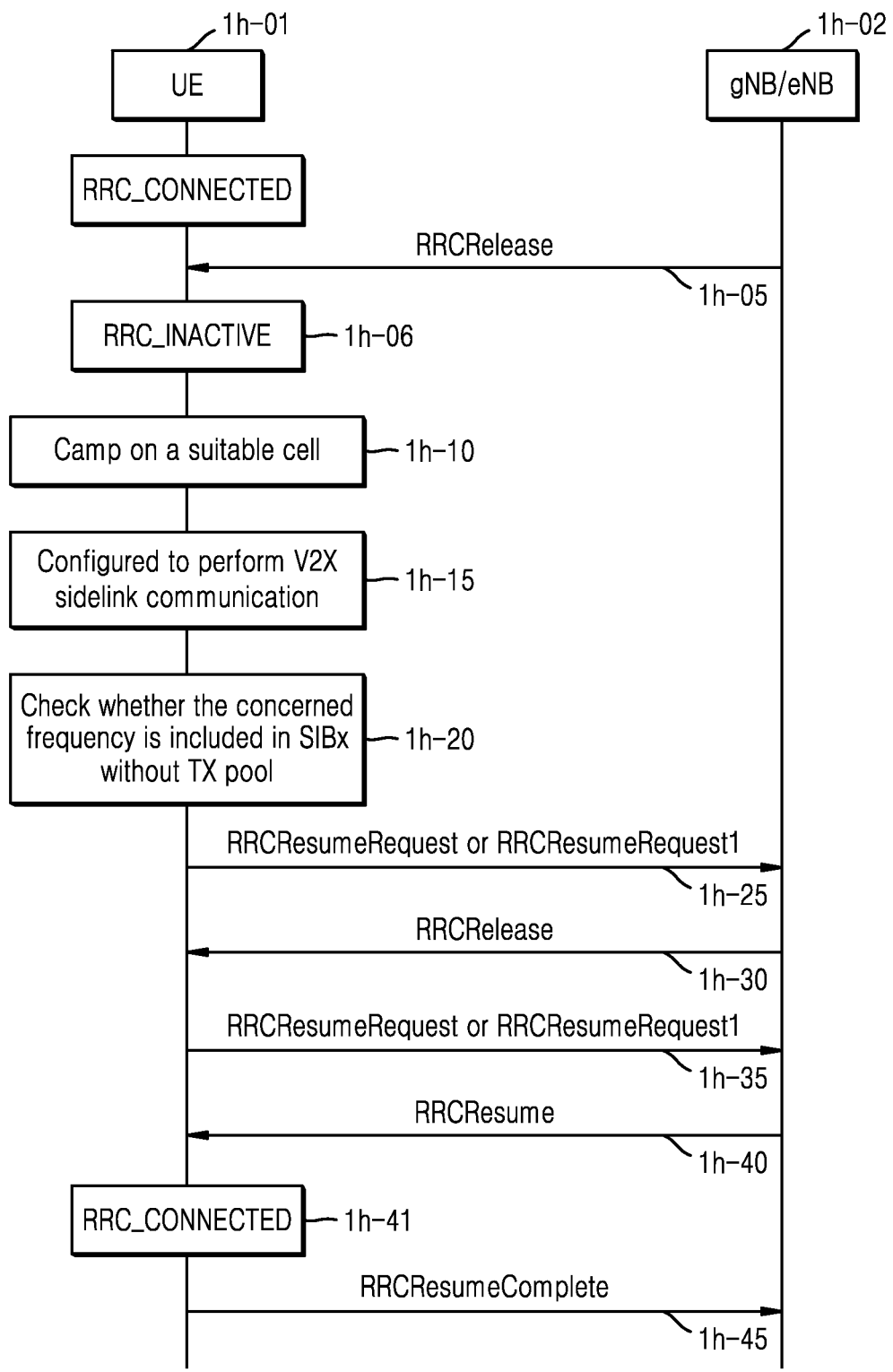
FIG. 1H is a diagram for describing a procedure in which a UE in an RRC inactive mode performs radio access network (RAN)-based notification area update with a base station, and a procedure in which the UE in the RRC inactive mode resumes communication with the base station to switch from the RRC inactive mode to an RRC connected mode, according to an embodiment of the disclosure.

FIG. 1H is a diagram for describing a procedure in which a UE in an RRC inactive mode (RRC_INACTIVE) performs RNAU with a base station, and a procedure in which the UE in the RRC inactive mode resumes communication with the base station to switch from the RRC inactive mode to an RRC connected mode (RRC_CONNECTED), according to an embodiment of the disclosure.

Referring to FIG. 1H, a UE 1h-01 may establish an RRC connection with a gNB/eNB 1h-02 and thus be in an RRC connected mode (RRC_CONNECTED). When the UE 1h-01 that transmits or receives data in the RRC connected mode does not transmit or receive data for a certain period of time or due to a certain reason, the gNB/eNB 1h-02 may transmit, to the UE 1h-01, an RRC connection release (RRCRelease) message including suspended configuration information (suspendConfig or rrc-InactiveConfig) (operation 1h-05) to control the UE 1h-01 to transit to an RRC inactive mode (RRC_INACTIVE).

A series of operations of the UE 1h-01 proposed when the UE 1h-01 receives the RRC connection release message including the suspended configuration information from the gNB/eNB 1h-02 are as follows.

- The UE 1h-01 may apply the received suspended configuration information (apply the received suspendConfig). The suspended configuration information may include at least one of following parameters.
- Full UE connection resume identifier (full-radio network temporary identifier (RNTI): When useFullResumeID is signaled to an SIB1 broadcasted by a cell of which a connection is to be resumed later, via a cell selection/reselection process, the UE 1h-01 may transmit an RRCResumeRequest1 message to the cell. In other words, the UE 1h-01 may transmit the RRCResumeRequest1 message to the cell by configuring resumeIdentity to be an I-RNTI value.
- Short UE connection resume identifier (ShortI-RNTI): When the useFullResumeID is not signaled to the SIB1 broadcasted by the cell of which the connection is to be resumed later, via the cell selection/reselection process, the UE 1h-01 may transmit an RRCResumeRequest message to the cell. In other words, the UE 1h-01 may transmit the RRCResumeRequest message to the cell by configuring resumeIdentity to be an ShortI-RNTI value.
- RAN paging cycle (ran-PagingCycle): The UE 1h-01 in the RRC inactive mode may monitor RAN-initiated paging by applying PagingCycle included in a ran-PagingCycle field. When RAN-initiated paging is received, the UE 1h-01 may perform an RRC connection resume procedure with the gNB/eNB 1h-02.
- RAN-based notification area information (ran-NotificationAreaInfo): The UE 1h-01 in the RRC inactive mode may perform an RNAU procedure with the cell or gNB/eNB 1h-02 when deviating from an RNA after receiving the SIB1.
- T380: PeridocRNAU-TimerValue for the UE 1h-01 in the RRC inactive mode to periodically perform the RNAU procedure may be included. When the above value is included, the UE 1h-01 may operate a T380 timer by setting the T380 timer to the above value. Also, when the timer expires, the UE 1h-01 may perform the RNAU procedure with the gNB/eNB 1h-02.
- nextHopChaingCount: The UE 1h-01 in the RRC inactive mode may update a security key ($K_{gNB}$ key) and parameters related thereto, by using NextHopChainingCount.
- The UE 1h-01 may reset an MAC layer. This is to, when a connection is resumed again, prevent data stored in an HARQ buffer from being unnecessarily retransmitted.
- The UE 1h-01 may re-establish RLC layers for the SRB1. This is to, when a connection is resumed again, prevent data stored in an RLC buffer from being unnecessarily retransmitted and initiate variables to be used later.
- The UE 1h-01 may store UE inactive AS context. The UE inactive AS context may include at least one of configured suspended configuration information, a current security key ($K_{gNB}$ key and/or $K_{RRCint}$ key), an ROHC state, a UE cell identifier (C-RNTI) that was used in a source cell (source PCell), a cell identity (cellIdentity) and physical cell identity) of the source cell, or all other parameters configured except ReconfigurationWithSync.
- The UE 1h-01 may suspend all SRBs and DRBs excluding an SRB0.
- The UE 1h-01 may indicate PDCP suspension to lower layers for all DRBs.
- When t380 is included in the received suspended configuration information, the UE 1h-01 may operate the T380 timer by setting a timer value to t380.
- When waitTime is included in the RRC connection release message, the UE 1h-01 may operate a T320 timer by setting a timer value to waitTime. Also, the UE 1h-01 may notify an upper layer that access barring is applicable to all access categories, excluding access categories of '0' and '2'.
- The UE 1h-01 may transit to an RRC inactive mode (RRC_INACTIVE) (operation 1h-06) and perform a cell selection procedure.

The UE 1h-01 transited to the RRC inactive mode performs the cell selection procedure or cell reselection procedure, and may camp-on to find a suitable cell (operation 1h-10). To perform the cell selection procedure or cell reselection procedure, the UE 1h-01 may receive system information (for example, MIB and/or SIB1 and/or SIB1 and/or SIB3 and/or SIB4 and/or SIB5) broadcasted by the cell.

Alternatively, in operation 1h-10, when the UE 1h-01 in the RRC inactive mode is able to perform V2X sidelink communication, the UE 1h-01 may receive system information including V2X sidelink communication configuration information from a serving cell that is currently camped-on. For example, when the serving cell is an LTE cell, the system information may include at least one of SIB21 and/or SIB26 and/or one or a plurality of SIBa to be newly defined (here, a may denote one or more different numbers). For example, when the serving cell is a NR cell, the system information may include at least one of one or more SIBb to be newly defined (here, b may denote one or more different numbers).

The V2X sidelink communication configuration information may include at least one piece of information from among a V2X sidelink communication reception resource pool (for example, v2x-CommRxPool), a V2X sidelink communication transmission resource pool (for example, v2x-CommTxPoolNormalCommon), a V2X sidelink communication transmission resource pool that may be used in an exceptional situation (for example, v2x-CommTxPoolExceptional), or an adjacent frequency resource information list for performing V2X sidelink communication (v2x-InterfreqInfoList). Also, the system information including the V2X sidelink communication configuration information may be broadcasted for each RAT. For example, system information including LTE V2X sidelink configuration information and system information including NR V2X sidelink configuration information may be separately broadcasted. Alternatively, system information including V2X sidelink communication configuration information regarding a plurality of RATs may be broadcasted. For example, system information including both the LTE V2X sidelink configuration information and the NR V2X sidelink configuration information may be broadcasted.

An ASN.1 structure for the SIB21 or SIB26 may refer to "36.331: Radio Resource Control (RRC)" that is the 3GPP standard document. An SIBx according to an embodiment of the disclosure may denote at least one of SIB21 and/or SIB26 and/or SIBa and/or SIBb. The ASN.1 structure of the system information (SIBx) to be newly defined may be as follows.

SystemInformationBlockTypex

The IE SystemInformationBlockTypex contains NR V2X and/or LTE V2X sidelink communication configuration.
SystemInformationBlockTypex Information Element Second case: When configured by the upper layers to perform the NR V2X sidelink communication at a specific frequency.

Third case: When configured by the upper layers to simultaneously perform the LTE V2X sidelink communication and the NR V2X sidelink communication at a specific frequency or a plurality of frequencies.

Alternatively, in operation 1h-15, the UE 1h-01 in the RRC inactive mode being configured to perform the V2X sidelink communication may include at least one of being configured to transmit non-pedestrian-to-everything (P2X) related V2X sidelink communication and related data or being configured to transmit P2X related V2X sidelink communication and related data.

```
-- ASN1START
SystemInformationBlockTypex ::= SEQUENCE {
    sl-V2X-ConfigCommon                    SL-V2X-ConfigCommon
        OPTIONAL,
    lateNonCriticalExtension               OCTET STRING
                        OPTIONAL,
    ...
}
SL-V2X-ConfigCommon ::=     SEQUENCE {
    v2x-CommRxPool                         SL-CommRxPoolListV2X
        OPTIONAL,
    v2x-CommTxPoolNormalCommon             SL-CommTxPoolListV2X
        OPTIONAL,
    p2x-CommTxPoolNormalCommon             SL-CommTxPoolListV2X
        OPTIONAL,
    v2x-CommTxPoolExceptional       SL-CommResourcePoolV2X
        OPTIONAL,
    v2x-SyncConfig                         SL-SyncConfigListV2X
        OPTIONAL,
    v2x-InterFreqInfoList           SL-InterFreqInfoListV2X
        OPTIONAL,
    v2x-ResourceSelectionConfig     SL-CommTxPoolSensingConfig
        OPTIONAL,
    zoneConfig                             SL-ZoneConfig
        OPTIONAL,
    typeTxSync                             SL-TypeTxSync
        OPTIONAL,
    thresSL-TxPrioritization        SL-Priority
        OPTIONAL,
    anchorCarrierFreqList           SL-AnchorCarrierFreqList-V2X OPTIONAL,
    offsetDFN                              INTEGER (0..1000)
                        OPTIONAL,
    cbr-CommonTxConfigList                 SL-CBR-CommonTxConfigList
        OPTIONAL
    cbr-pssch-TxConfigList          SL-CBR-PPPP-TxConfigList
        OPTIONAL,
    v2x-PacketDuplicationConfig     SL-V2X-PacketDuplicationConfig
        OPTIONAL,        SyncFreqList            SL-V2X-
SyncFreqList                OPTIONAL,
    slss-TxMultiFreq                       ENUMERATED {true}
        OPTIONAL,
    v2x-FreqSelectionConfigList     SL-V2X-FreqSelectionConfigList
        OPTIONAL,
    threshS-RSSI-CBR                       INTEGER (0..45)
                        OPTIONAL,
}
-- ASN1STOP
```

In operation 1h-15, when the UE 1h-01 is able to perform the V2X sidelink communication, the UE 1h-01 in the RRC inactive mode may be configured to perform the V2X sidelink communication by upper layers (for example, a V2X layer) in the UE. The UE 1h-01 may be configured to perform the V2X sidelink communication in at least one of following three cases.

First case: When configured by the upper layers to perform the LTE V2X sidelink communication at a specific frequency.

In operation 1g-20, the UE 1h-01 in the RRC inactive mode may perform following operations when configured to transmit the non-P2X related V2X sidelink communication and related data at the specific frequency in operation 1h-15. When the system information received in operation 1h-10 includes the specific frequency but does not include the V2X sidelink communication transmission resource pool associated with the specific frequency (the concerned frequency is included in SIBx without TX pool), the UE 1h-01 may perform the RRC connection resume procedure with the gNB/eNB 1h-02. For example, the UE 1h-01 may determine that the V2X sidelink communication transmission resource pool is not included in the system information in a following case.

When a frequency configured by the upper layers for performing the V2X sidelink communication in operation 1h-15 is a frequency (camped frequency) camped-on by the UE 1h-01, the UE 1h-01 broadcasts the SIBx by a cell camped-on by the UE 1h-01, and the SIBx of a valid version includes sl-V2X-ConfigCommon but the sl-V2X-ConfigCommon does not include the TX pool (for example, v2x-CommTxPoolNormalCommon) (if the frequency on which the UE is configured to transmit non-P2X related V2X sidelink communication concerns the camped frequency; and if SystemInformationBlockTypex is broadcast by the cell on which the UE camps; and if the valid version of SystemInformationBlockTypex includes sl-V2X-ConfigCommon; and sl-V2X-ConfigCommon does not include v2x-CommTxPoolNormalCommon)

Alternatively, when the frequency configured by the upper layers for performing the V2X sidelink communication in operation 1h-15 is included in the v2x-InterFreqInfoList signaled from the SIBx broadcasted by the cell camped-on by the UE 1h-01, and the SIBx of the valid version does not include the TX pool (for example, v2x-CommTxPoolNormal) (if the frequency on which the UE is configured to transmit non-P2X related V2X sidelink communication is included in v2x-InterFreqInfoList within SystemInformationBlockTypex broadcast by the cell on which the UE camps; and if the valid version of SystemInformationBlockTypex does not include v2x-CommTxPoolNormal for the concerned frequency)

Alternatively, in operation 1h-20, the UE 1h-01 in the RRC inactive mode may perform following operations when configured to transmit the P2X related V2X sidelink communication and related data in operation 1h-15. When the system information received in operation 1h-10 includes the specific frequency but does not include the V2X sidelink communication transmission resource pool associated with the specific frequency (the concerned frequency is included in SIBx without TX pool), the UE 1h-01 may perform the RRC connection resume procedure with the gNB/eNB 1h-02. For example, the UE 1h-01 may determine that the V2X sidelink communication transmission resource pool is not included in the system information in a following case.

When a frequency configured by the upper layers for performing the V2X sidelink communication in operation 1h-15 is a frequency (camped frequency) camped-on by the UE 1h-01, the UE 1h-01 broadcasts the SIBx by a cell camped-on by the UE 1h-01, and the SIBx of a valid version includes sl-V2X-ConfigCommon but the sl-V2X-ConfigCommon does not include the TX pool (for example, p2x-CommTxPoolNormalCommon) (if the frequency on which the UE is configured to transmit P2X related V2X sidelink communication concerns the camped frequency; and if SystemInformationBlockTypex is broadcast by the cell on which the UE camps; and if the valid version of SystemInformationBlockTypex includes sl-V2X-ConfigCommon; and sl-V2X-ConfigCommon does not include p2x-CommTxPoolNormalCommon)

Alternatively, when the frequency configured by the upper layers for performing the V2X sidelink communication in operation 1h-15 is included in the v2x-InterFreqInfoList signaled from the SIBx broadcasted by the cell camped-on by the UE 1h-01, and the SIBx of the valid version does not include the TX pool (for example, p2x-CommTxPoolNormal) (if the frequency on which the UE is configured to transmit non-P2X related V2X sidelink communication is included in v2x-InterFreqInfoList within SystemInformationBlockTypex broadcast by the cell on which the UE camps; and if the valid version of SystemInformationBlockTypex does not include p2x-CommTxPoolNormal for the concerned frequency)

In operation 1h-25, when it is determined that the system information does not include the V2X sidelink communication transmission resource pool in operation 1h-20, the UE 1h-01 in the RRC inactive mode may perform the RRC connection resume procedure with the gNB/eNB 1h-02 that is to resume the RRC connection. Here, the UE 1h-01 may detect that the operated T380 timer is expired or determine (or have determined) or detect that the configured RNA is deviated, based on the received SIB1. Alternatively, in operation 1h-20, the UE 1h-01 may simultaneously perform an operation of determining that the system information does not include the V2X sidelink communication transmission resource pool, and an operation of detecting that the operated T380 timer is expired or determining/detecting that the configured RNA is deviated, based on the received SIB1.

As described above in the disclosure, the operated T380 timer being expired or the determining or detecting of the configured RNA being deviated based on the received RSIB1 may be a triggering condition regarding performing of the RNAU procedure of the UE. Meanwhile, when the system information does not include the V2X sidelink communication transmission resource pool, it may be vague whether the UE 1h-01 is to perform the RNAU procedure or to perform the RRC connection resume procedure for transiting to the RRC connected mode so as to be configured with the V2X sidelink communication transmission resource pool by the gNB/eNB 1h-02. An embodiment of the disclosure proposes the UE 1h-01 performing the RRC connection resume procedure for transiting to the RRC connected mode after performing the RNAU procedure. Regarding operations of the UE 1h-01 performing a random access procedure with the gNB/eNB 1h-02 and transmitting/receiving an RRC message to/from the gNB/eNB 1h-02, proposed operations of the UE 1h-01 are as follows (operation 1h-25).

1. When the useFullResumeID field is signaled from the system information (SIB1), the UE 1h-01 may select a message to be transmitted to the gNB/eNB 1h-02 to be RRCResumeRequest1. The UE 1h-01 may prepare transmission by adding resumeIdentity to the RRCResumeRequest1 message, as the full-RNTI value. When the useFullResumeID field is not signaled from the system information (SIB1), the UE 1h-01 may select the message to be transmitted to the gNB/eNB 1h-02 to be RRCResumeRequest. The UE 1h-01 may prepare the transmission by adding shortResumeIdentity to the RRCResumeRequest message, as the shortI-RNTI value.

2. The disclosure proposes the UE 1h-01 to configure a cause (resumeCause) for resuming a connection to 'ma-Update'.
ResumeCause The IE ResumeCause is used to indicate the resume cause in RRCResumeRequest and RRCResumeRequest1.
ResumeCause Information Element

---

-- ASN1START
-- TAG-RESUME-CAUSE-START
ResumeCause ::=          ENUMERATED {emergency, highPriorityAccess, mt-Access, mo-Signalling,
                           mo-Data, mo-VoiceCall, mo-VideoCall, mo-SMS, rna-Update, mps-PriorityAccess, mcs-PriorityAccess,
spare1, spare2, spare3, spare4, spare5 }
-- TAG-RESUME-CAUSE-STOP
-- ASN1STOP

---

3. The UE 1h-01 may reconstruct RRC configuration information and security context information from UE inactive AS context that was stored excluding cell group configuration information (cellGroupConfig).

4. The UE 1h-01 may calculate MAC-I and prepare for transmission by adding last 16 bits to a resumeMAC-I field of the RRCResumeRequest1 message or RRCResumeRequest message that is a selected message.

5. The UE 1h-01 may update a new KgNB security key based on a current kgNB security key, an NH value, and a stored NCC value.

6. Also, the UE 1h-01 derives, by using the newly updated KgNB security key, new security keys (K_RRCenc, K_RRC_int, K_UPint, K_UPenc) to be used for an integrity protection and verification procedure and an encoding and decoding procedure.

7. Also, the UE 1h-01 resumes the integrity protection and verification procedure by applying, on all bearers excluding SRB0, updated security keys and a pre-configured algorithm, and applies integrity verification and protection on pieces of data transmitted and received thereafter. This is to increase the reliability and security of the pieces of data transmitted and received from the SRB1 or DRBs thereafter.

8. Also, the UE 1h-01 resumes the encoding and decoding procedure by applying, on all bearers excluding SRB0, the updated security keys and the pre-configured algorithm, and applies encoding and decoding on the pieces of data transmitted and received thereafter. This is to increase the reliability and security of the pieces of data transmitted and received from the SRB1 or DRBs thereafter.

9. The UE 1h-01 may reconstruct a PDCP state and re-establish PDCP entities for the SRB1.

10. The UE 1h-01 resumes the SRB1. This is because the RRCResume message is to be received via the SRB1, as a response to the RRCResumeRequest message or RRCResumeRequest1 message to be transmitted.

11. The UE 1h-01 configures a message selected for transmission to the gNB/eNB 1h-02, i.e., the RRCResumeRequest message or RRCResumeRequest1 message, and transmits the same to lower layers.

12. The UE 1h-01 transmits the RRCResumeRequest message or RRCResumeRequest1 message to the gNB/eNB 1h-02 and operates a T319 timer.

In operation 1h-30, the UE 1h-01 in the RRC inactive mode may receive, from the gNB/eNB 1h-02, the RRC connection release message including the suspended configuration information. The UE 1h-01 that has received the RRC connection release message including the suspended configuration information may maintain the RRC inactive mode.

In operation 1h-35, when the determining that the system information does not include the V2X sidelink communication transmission resource pool in operation 1h-20 is valid, the UE 1h-01 may perform the RRC connection resume procedure with the gNB/eNB 1h-02 that is to resume the RRC connection. Regarding operations of the UE 1h-01 performing a random access procedure with the gNB/eNB 1h-02 and transmitting/receiving an RRC message to/from the gNB/eNB 1h-02, proposed operations of the UE 1h-01 are as follows (operation 1h-35).

1. When the useFullResumeID field is signaled from the system information (SIB1), the UE 1h-01 may select a message to be transmitted to the gNB/eNB 1h-02 to be RRCResumeRequest1. The UE 1h-01 may prepare transmission by adding resumeIdentity to the RRCResumeRequest1 message, as the full-RNTI value. When the useFullResumeID field is not signaled from the system information (SIB1), the UE 1h-01 may select the message to be transmitted to the gNB/eNB 1h-02 to be RRCResumeRequest. The UE 1h-01 may prepare the transmission by adding shortResumeIdentity to the RRCResumeRequest message, as the shortI-RNTI value.

2. The UE 1h-01 may select one of values of {emergency, highPriorityAccess, mt-Access, mo-Signalling, mo-Data, mo-VoiceCall, mo-VideoCall, mo-SMS, ma-Update, mps-PriorityAccess, mcs-PriorityAccess, spare1, spare2, spare3, spare4, spare5}, as a cause (resumeCause) for resuming a connection. According to an embodiment of the disclosure, the disclosure proposes the UE 1h-01 to configure the cause (resumeCause) for resuming a connection to one of values other than 'ma-Update'. In other words, the UE 1h-01 may configure the resumeCause to be configured with the V2X sidelink communication transmission resource pool from the gNB/eNB 1h-02. For example, the UE 1h-01 may configure the resumeCause to 'mo-Signalling'.

ResumeCause

The IE ResumeCause is used to indicate the resume cause in RRCResumeRequest and RRCResumeRequest1.
ResumeCause Information Element

```
-- ASN1START
-- TAG-RESUME-CAUSE-START
ResumeCause ::=        ENUMERATED {emergency, highPriorityAccess, mt-Access,
mo-Signalling,
                        mo-Data, mo-VoiceCall, mo-VideoCall, mo-
SMS, ma-Update, mps-PriorityAccess, mcs-PriorityAccess,
spare1, spare2, spare3, spare4, spare5 }
-- TAG-RESUME-CAUSE-STOP
-- ASN1STOP
```

3. The UE 1h-01 may reconstruct RRC configuration information and security context information from UE inactive AS context that was stored excluding cell group configuration information (cellGroupConfig).

4. The UE 1h-01 may calculate MAC-I and prepare for transmission by adding last 16 bits to a resumeMAC-I field of the RRCResumeRequest1 message or RRCResumeRequest message that is a selected message.

5. The UE 1h-01 may update a new KgNB security key based on a current kgNB security key, an NH value, and a stored NCC value.

6. Also, the UE 1h-01 derives, by using the newly updated KgNB security key, new security keys (K_RRCenc, K_RRC_int, K_UPint, K_UPenc) to be used for an integrity protection and verification procedure and an encoding and decoding procedure.

7. Also, the UE 1h-01 resumes the integrity protection and verification procedure by applying, on all bearers excluding SRB0, updated security keys and a pre-configured algorithm, and applies integrity verification and protection on pieces of data transmitted and received thereafter. This is to increase the reliability and security of the pieces of data transmitted and received from the SRB1 or DRBs thereafter.

8. Also, the UE 1h-01 resumes the encoding and decoding procedure by applying, on all bearers excluding SRB0, the updated security keys and the pre-configured algorithm, and applies encoding and decoding on the pieces of data transmitted and received thereafter. This is to increase the reliability and security of the pieces of data transmitted and received from the SRB1 or DRBs thereafter.

9. The UE 1h-01 may reconstruct a PDCP state and re-establish PDCP entities for the SRB1.

10. The UE 1h-01 resumes the SRB1. This is because the RRCResume message is to be received via the SRB1, as a response to the RRCResumeRequest message or RRCResumeRequest1 message to be transmitted.

11. The UE 1h-01 configures a message selected for transmission to the gNB/eNB 1h-02, i.e., the RRCResumeRequest message or RRCResumeRequest1 message, and transmits the same to lower layers.

12. The UE 1h-01 transmits the RRCResumeRequest message or RRCResumeRequest1 message to the gNB/eNB 1h-02 and operates a T319 timer.

Operations of the UE 1h-01 proposed when the UE 1h-01 in the RRC inactive mode receives the RRC connection resume message (RRCResume message) in operation 1h-40 are as follows.

1. The UE 1h-01 stops the T319 timer being operated when the RRCResumeRequest message or RRCResumeRequest1 message is transmitted to the gNB/eNB 1h-02.

2. When the RRCResume message includes a full configuration information (fullConfig), the UE 1h-01 performs a full configuration procedure. When the RRCResume message does not include the fullConfig, the UE 1h-01 reconstructs the PDCP state upon receiving the RRCResume message and resets a count value for the SRB2 and all DRBs. Also, the UE 1h-01 reconstructs cell group configuration information (cellGroupConfig) from stored UE context. Also, the UE 1h-01 instructs details related to the above-described operations to lower layers.

3. The UE 1h-01 releases a full UE connection resume identity (Full-RNTI), a divided UE connection resume identity (ShortI-RNTI), and the stored UE context. Here, RNA information (ran-NotificatioAreaInfo) is not released.

4. When the RRCResume message includes master cell group (masterCellGroup) configuration information, the UE 1h-01 may perform a cell group configuration procedure according to the master cell group configuration information.

5. When the RRCResume message includes bearer configuration information (radioBearerConfig), the UE 1h-01 may configure a bearer according to the bearer configuration information.

6. The UE 1h-01 resumes the SRB2 and all DRBs.

7. The UE 1h-01 discards stored cell reselection priority information when there is one. The cell reselection priority information may be information stored based on CellReselectionPriorities that may be included in an RRCRelease message, or cell reselection priority information received from another RAT.

8. The UE 1h-01 may stop a T320 timer when the T320 timer is being operated.

9. When the RRCResume message includes frequency measurement configuration information (measConfig), the UE 1h-01 may perform frequency measurement according to the frequency measurement configuration information.

10. When the RRC connection is suspended, the UE 1h-01 may resume the frequency measurement.

11. The UE 1h-01 transits to the RRC connected mode (operation 1h-41).

12. The UE 1h-01 indicates the upper layers that the suspended RRC connection is resumed.

13. The UE 1h-01 may stop the cell reselection procedure.

14. The UE 1h-01 considers a currently accessed cell to be a primary cell (PCell).

15. Also, the UE 1h-01 configures an RRC connection resume complete (RRCResumeComplete) message as below for transmission to lower layers, and transmits the same to the gNB/eNB 1h-02 (operation 1h-45).

A. When upper layer provided NAS PDU, the NAS PDU may be included in dedicatedNAS-Message.

B. When the upper layers or NAS layer provided a PLMN, a PLMN selected by the upper layers or NAS layer from plmn-IdentityList included in the SIB1 may be configured as selectedPLMN-Identity.

Figure 1I:
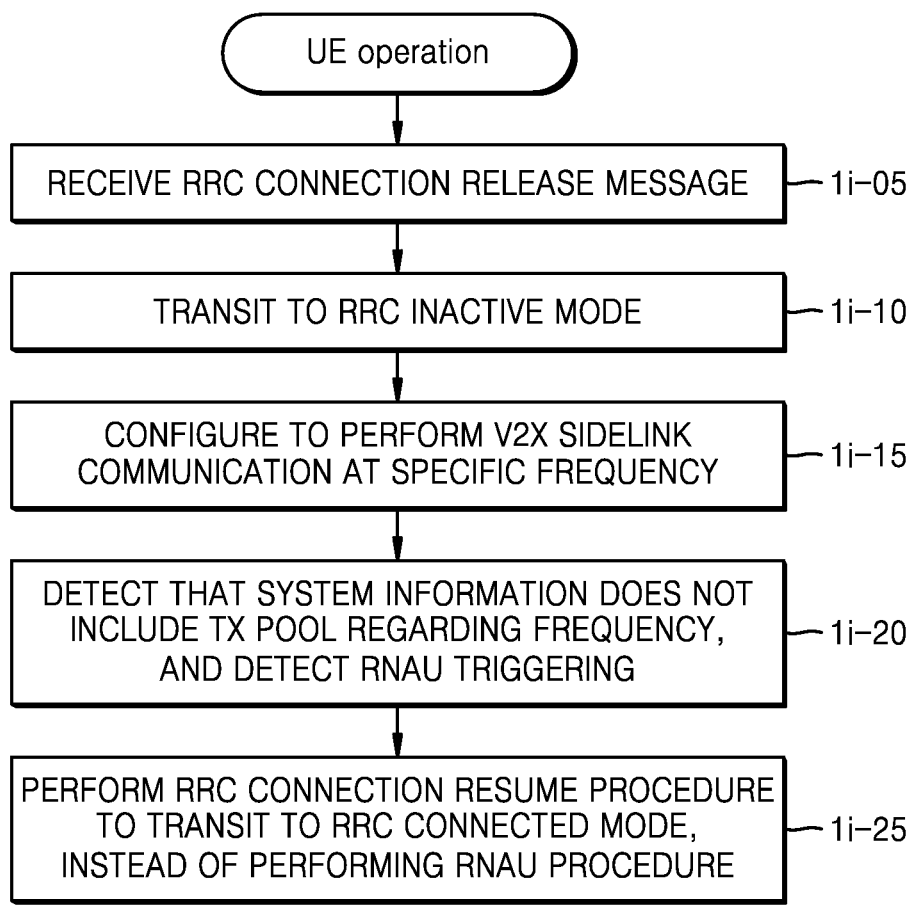
FIG. 1I is a diagram for describing operations of a UE in an RRC inactive mode, according to an embodiment of the disclosure.

FIG. 1I is a diagram for describing operations of a UE in an RRC inactive mode (RRC_INACTIVE), according to an embodiment of the disclosure.

In operation 1i-05, the UE in an RRC connected mode may receive an RRC connection release message including suspended configuration information, from a base station.

In operation 1i-10, the UE may transit to the RRC inactive mode.

In operation 1i-15, the UE may be configured to perform V2X sidelink communication at a specific frequency, by an upper layer (for example, a V2X layer).

In operation 1i-20, the UE may determine that system information broadcasted from a cell or the base station does not include a transmission resource pool (Tx pool) regarding the specific frequency. Also, the UE may determine that RNAU is triggered.

In operation 1i-25, the UE may transit to the RRC connected mode by performing an RRC connection resume procedure with the base station for resuming a connection, instead of performing an RNAU procedure. In other words, the UE may not configure resumeCause to "rna-Update".

Figure 1J:
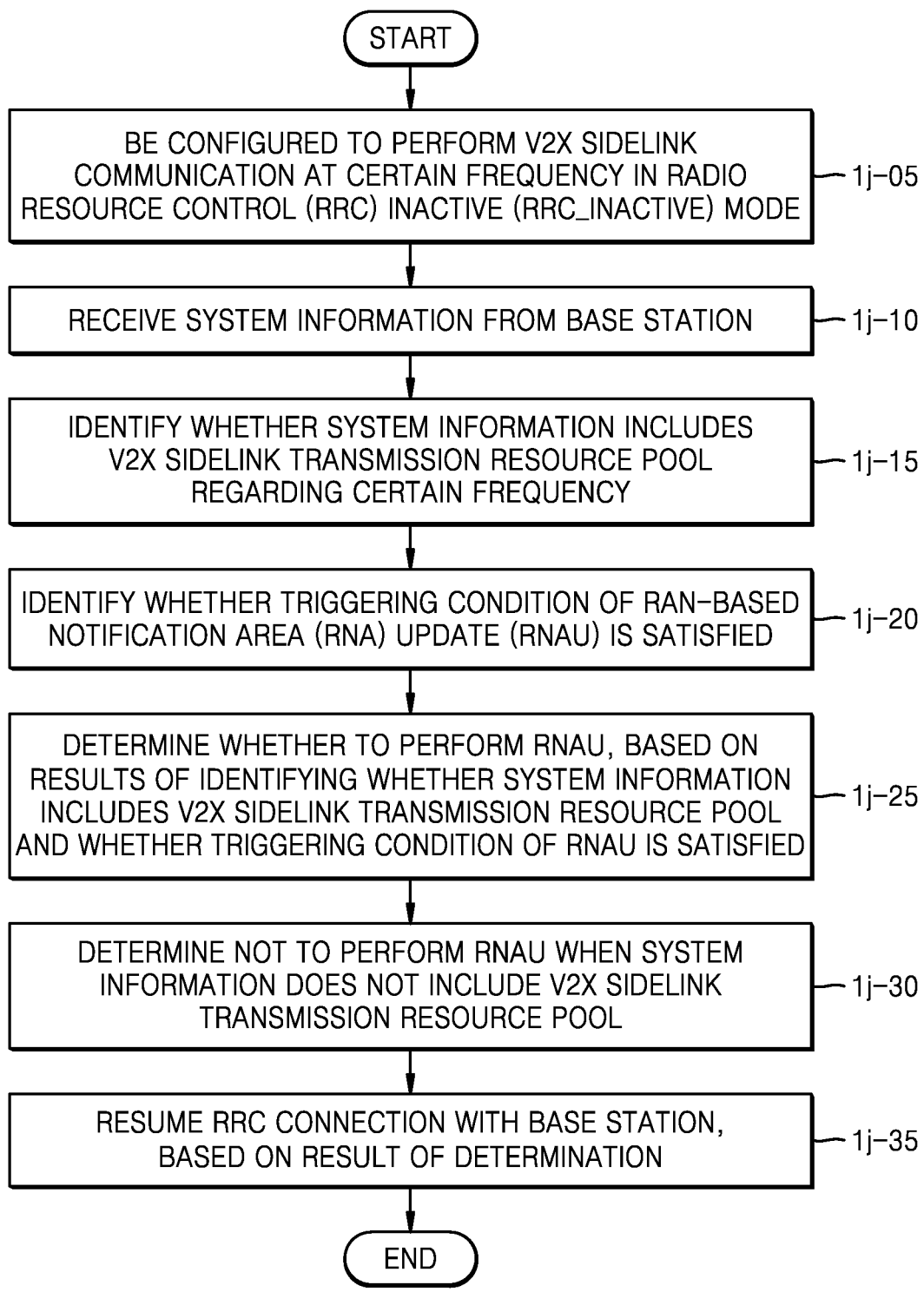
FIG. 1J is a flowchart for describing operations of a UE, according to an embodiment of the disclosure.

FIG. 1j is a flowchart for describing operations of a UE supporting vehicle communication, according to an embodiment of the disclosure.

In operation 1j-50, the UE may be configured to perform V2X sidelink communication at a predetermined frequency, in an RRC inactive mode (RRC_INACTIVE). For example, the UE may be configured to perform the V2X sidelink communication at the predetermined frequency, by an upper layer (for example, a V2X layer) in the UE.

In operation 1j-10, the UE may receive system information from a base station.

In operation 1j-20, the UE may identify whether the system information includes a V2X sidelink transmission resource pool associated with the predetermined frequency.

According to an embodiment of the disclosure, when the system information includes information about the predetermined frequency, but does not include the V2X sidelink transmission resource pool associated with the predetermined frequency, the UE may identify that the system information does not include the V2X sidelink transmission resource pool associated with the predetermined frequency.

In operation 1j-25, the UE may identify whether a triggering condition of an RNAU is satisfied.

According to an embodiment of the disclosure, the triggering condition of the RNAU may include a T380 timer operating to periodically perform an RNAU procedure being expired or the UE deviating from an RNA configured for the UE.

In operation 1j-30, the UE may determine whether to perform the RNAU, based on results of identifying whether the system information includes the V2X sidelink transmission resource pool and whether the triggering condition of the RNAU is satisfied.

According to an embodiment of the disclosure, the UE may determine not to perform the RNAU when the system information does not include the V2X sidelink transmission resource pool.

According to an embodiment of the disclosure, the UE may determine a resume cause to be "Mo-Signalling", when the RNAU is determined to be not performed.

In operation 1j-35, the UE may resume an RRC connection with the base station, based on a result of the determination.

For example, the UE may transmit an RRC connection resume request message including the resume cause to the base station, receive an RRC connection resume message from the base station, and resume the RRC connection with the base station based on the RRC connection resume message.

Figure 1K:
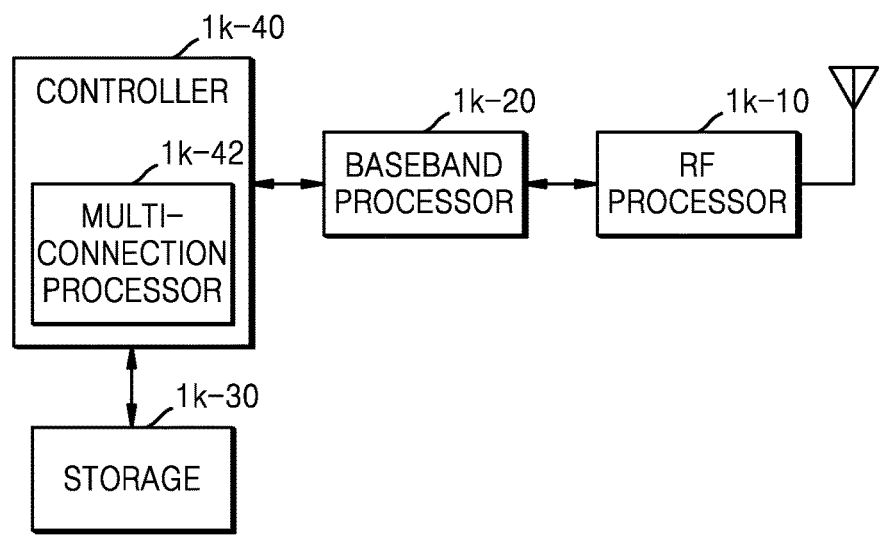
FIG. 1K is a block diagram showing an internal structure of a terminal, according to an embodiment of the disclosure.

FIG. 1K is a block diagram showing an internal structure of a terminal, according to an embodiment of the disclosure.

Referring to FIG. 1K, the terminal includes a radio frequency (RF) processor 1k-10, a baseband processor 1k-20, a storage 1k-30, and a controller 1k-40. However, the internal structure of the terminal is not limited thereto and may include more or fewer components than those shown in FIG. 1K.

According to an embodiment of the disclosure, the RF processor 1k-10 may perform functions for transmitting and receiving a signal via a radio channel, such as a band conversion, amplification, and the like of the signal. That is, the RF processor 1k-10 may up-convert a baseband signal provided from the baseband processor 1k-20, to an RF band signal and transmit the RF band signal through an antenna, and down-convert an RF band signal received through an antenna, to a baseband signal. For example, the RF processor 1k-10 may include a transmit filter, a receive filter, an amplifier, a mixer, an oscillator, a digital-to-analog converter (DAC), and an analog-to-digital converter (ADC). Although only a single antenna is illustrated in FIG. 1K, the terminal may include a plurality of antennas.

The RF processor 1k-10 may include a plurality of RF chains. In addition, the RF processor 1k-10 may perform beamforming. For beamforming, the RF processor 1k-10 may adjust phases and amplitudes of signals transmitted or received through the plurality of antennas or antenna elements. Also, the RF processor 1k-10 may perform multiple input multiple output (MIMO) and may receive several layers during the MIMO operation. The RF processor 1k-10 may perform received beam sweeping by appropriately configuring the plurality of antennas or antenna elements, or adjust a direction and beam width of a received beam to coordinate with a transmit beam, under control by the controller.

The baseband processor 1k-20 may perform a conversion function between a baseband signal and a bitstream, according to physical layer specifications of a system. For example, for data transmission, the baseband processor 1k-20 may generate complex symbols by encoding and modulating a transmit bitstream. Also, for data reception, the baseband processor 1k-20 may reconstruct a received bitstream by demodulating and decoding a baseband signal provided from the RF processor 1k-10. For example, according to an orthogonal frequency division multiplexing (OFDM) scheme, for data transmission, the baseband processor 1k-20 may generate complex symbols by encoding and modulating a transmit bitstream, map the complex symbols to subcarriers, and then configure OFDM symbols via inverse fast Fourier transform (IFFT) operation and cyclic prefix (CP) insertion. Also, for data reception, the baseband processor 1k-20 may split a baseband signal provided from the RF processor 1k-10, into OFDM symbol units, reconstruct signals mapped to subcarriers via fast Fourier transform (FFT), and then reconstruct a received bitstream via demodulation and decoding.

The baseband processor 1k-20 and the RF processor 1k-10 transmit and receive signals as described above. In this regard, each of the baseband processor 1k-20 and the RF processor 1k-10 may also be called a transmitter, a receiver, a transceiver, or a communicator. In addition, at least one of the baseband processor 1k-20 or the RF processor 1k-10 may include a plurality of communication modules to support a plurality of different RATs. Also, at least one of the baseband processor 1k-20 or the RF processor 1k-10 may include different communication modules to process signals of different frequency bands. For example, the different RATs may include wireless LAN (For example, IEEE 802.11), a cellular network (for example, LTE), and the like. The different frequency bands may include a super high frequency (SHF) (e.g., 2.N RHz or N RHz) band, and a millimeter wave (mmWave) (e.g., 60 GHz) band. The terminal may transmit or receive a signal to or from a base station by using the baseband processor 1k-20 and the RF processor 1k-10, and the signal may include control information and data.

The storage 1k-30 may store data for operations of the terminal, e.g., basic programs, application programs, and configuration information. Also, the storage 1k-30 may provide the stored data upon a request by the controller 1k-40. The storage 1k-30 may be configured in a storage medium, such as read-only memory (ROM), random-access memory (RAM), a hard disk, CD-ROM, or DVD, or a combination thereof. Also, the storage 1k-30 may be configured in a plurality of memories.

The controller 1k-40 may control overall operations of the terminal. For example, the controller 1k-40 may transmit and receive signals through the baseband processor 1k-20 and the RF processor 1k-10. The controller 1k-40 may record and read data on and from the storage 1k-30. In this regard, the controller 1k-40 may include at least one processor. For example, the controller 1k-40 may include a communication processor (CP) for controlling communications and an application processor (AP) for controlling an upper layer such as an application program. Also, the controller 1k-40 may control the terminal to perform a method of performing the RRC connection resume procedure described above. Also, at least one component in the terminal may be embodied in one chip.

Figure 1L:
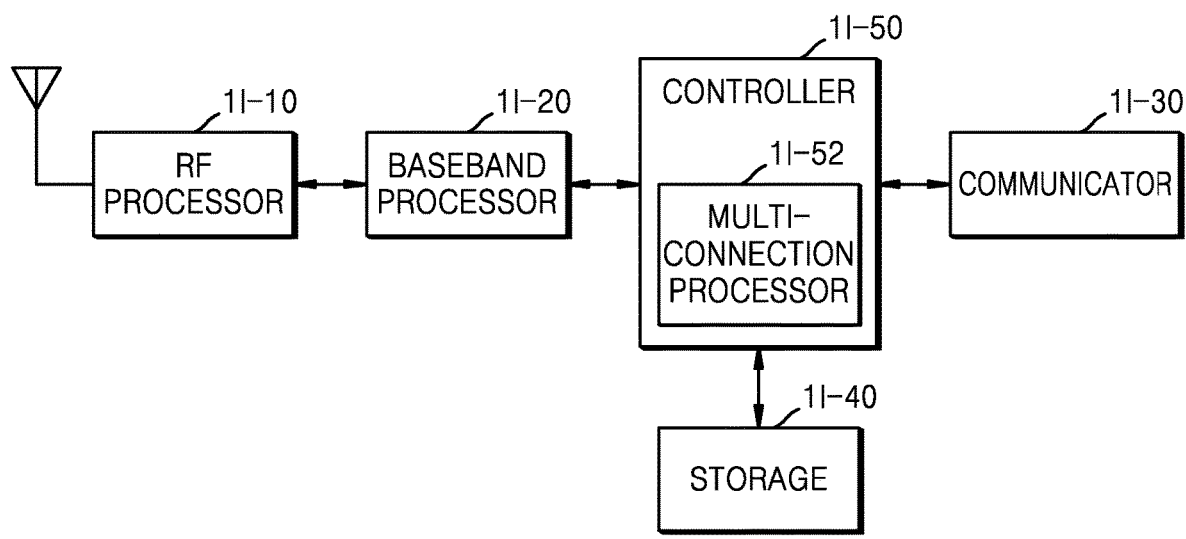
FIG. 1L is a block diagram of a configuration of a base station, according to an embodiment of the disclosure.

FIG. 1L is a block diagram of a configuration of a base station, according to an embodiment of the disclosure.

Referring to FIG. 1L, the base station may include an RF processor 1l-10, a baseband processor 1l-20, a communicator 1l-30, a storage 1l-40, and a controller 1l-50. However, the configuration of the base station is not limited thereto and may include more or fewer components than those shown in FIG. 1L.

The RF processor 1l-10 may perform functions for transmitting and receiving signals through radio channels, e.g., signal band conversion and amplification. That is, the RF processor 1l-10 may up-convert a baseband signal provided from the baseband processor 1l-20, to an RF band signal and transmit the RF band signal through an antenna, and down-convert an RF band signal received through an antenna, to a baseband signal. For example, the RF processor 1l-10 may include a transmit filter, a receive filter, an amplifier, a mixer, an oscillator, a DAC, and an ADC. Although only a single antenna is illustrated in FIG. 1L, the base station may include a plurality of antennas. The RF processor 1l-10 may include a plurality of RF chains. In addition, the RF processor 1l-10 may perform beamforming. For the beamforming, the RF processor 1l-10 may adjust phases and amplitudes of signals transmitted or received through the plurality of antennas or antenna elements. The RF processor 1l-10 may perform downlink MIMO by transmitting one or more layers.

The baseband processor 1l-20 may perform a conversion function between a baseband signal and a bitstream, according to physical layer specifications of an RAT. For example, for data transmission, the baseband processor 1l-20 may generate complex symbols by encoding and modulating a transmit bitstream. Also, for data reception, the baseband processor 1l-20 may reconstruct a received bitstream by demodulating and decoding a baseband signal provided from the RF processor 1l-10. For example, according to an OFDM scheme, for data transmission, the baseband processor 1l-20 may generate complex symbols by encoding and modulating a transmit bitstream, map the complex symbols to subcarriers, and then configure OFDM symbols via IFFT operation and CP insertion. Also, for data reception, the baseband processor 1l-20 may split a baseband signal provided from the RF processor 1l-10, into OFDM symbol units, reconstruct signals mapped to subcarriers via FFT operation, and then reconstruct a received bitstream via demodulation and decoding. The baseband processor 1l-20 and the RF processor 1l-10 may transmit and receive signals as described above. In this regard, each of the baseband processor 1l-20 and the RF processor 1l-10 may also be called a transmitter, a receiver, a transceiver, or a wireless communicator. The base station may transmit or receive a signal to or from a terminal by using the baseband processor 1l-20 and the RF processor 1l-10, and the signal may include control information and data.

The communicator 1l-30 may provide an interface for communicating with other nodes in a network. The communicator 1l-30 may be a backhaul communicator. The backhaul communicator may convert a bitstream transmitted from a main base station to another node, for example, an auxiliary base station or a core network, into a physical signal, and convert a physical signal received from the other node into a bitstream.

The storage 1l-40 may store data for operations of the base station, e.g., basic programs, application programs, and configuration information. In particular, the storage 1l-40 may store information about bearers allocated for a connected terminal, a measurement report transmitted from the connected terminal, etc. Also, the storage 1l-40 may store criteria information used to determine whether to provide or release multi-connection to or from the terminal. The storage 1l-40 may provide stored data upon a request by the controller 1l-50. The storage 1l-40 may be configured in a storage medium, such as ROM, RAM, a hard disk, CD-ROM, or DVD, or a combination thereof. Also, the storage 1l-40 may be configured in a plurality of memories.

The controller 1l-50 controls overall operations of the base station. For example, the controller 1l-50 may transmit and receive signals through the baseband processor 1l-20 and the RF processor 1l-10 or through the communicator 1l-30. The controller 1l-50 may record and read data on and from the storage 1l-40. In this regard, the controller 1l-50 may include at least one processor. Also, the controller 1l-50 may control the base station such that the terminal may perform a method of performing the RRC connection resume procedure described above. Also, at least one component in the base station may be embodied in one chip.

The methods according to the embodiments described in the claims or the detailed description of the disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to specific embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments may be combined with each other as required. For example, a portion of one embodiment of the disclosure and a portion of another embodiment of the disclosure may be combined with each other to enable a base station and a terminal to operate. Further, the embodiments of the disclosure are also applicable to another communication system, and other modifications based on technical ideas of the embodiments are also feasible.

Figure 2A:
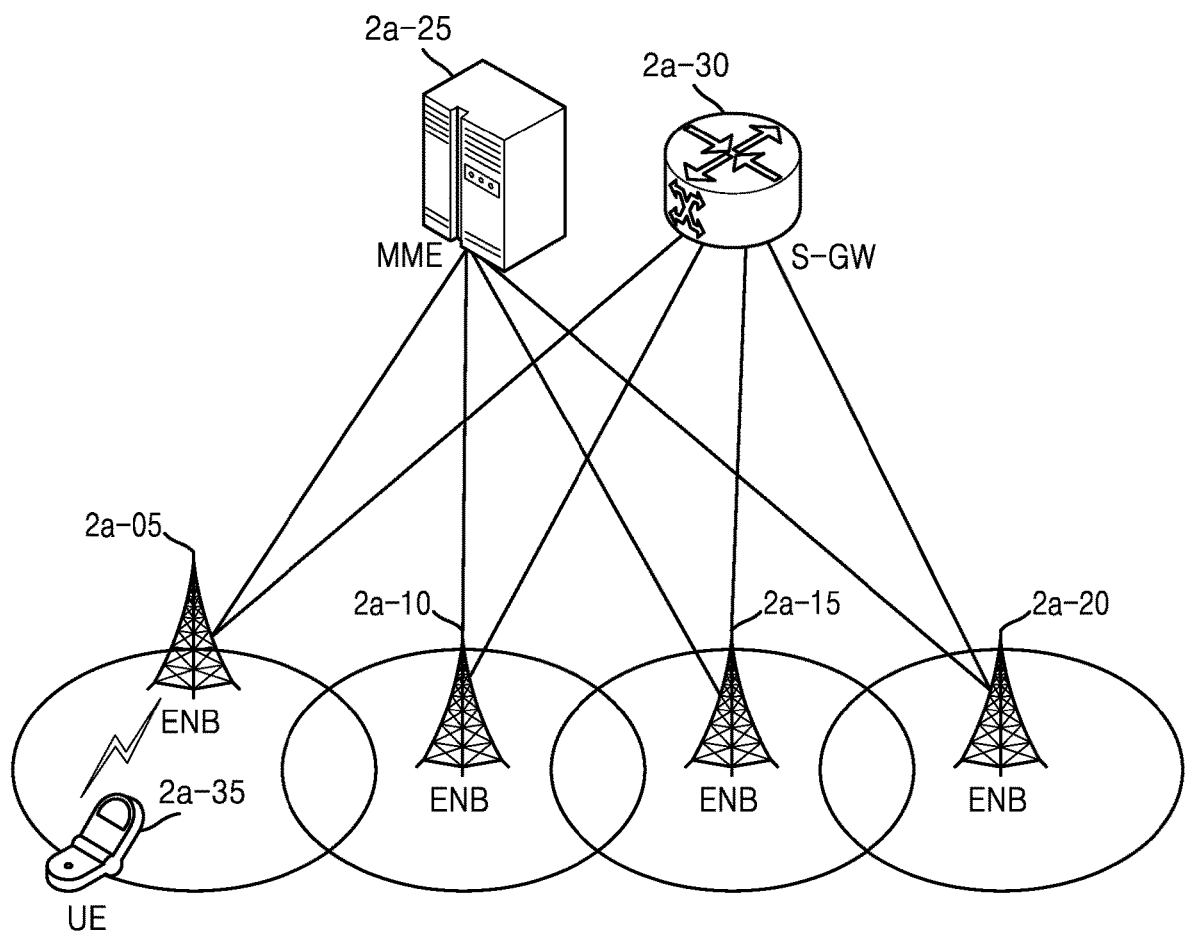
FIG. 2A is a diagram of a structure of an LTE system, according to an embodiment of the disclosure.

FIG. 2A is a diagram of a structure of an LTE system, according to an embodiment of the disclosure.

Referring to FIG. 2A, a radio access network of the LTE system includes eNBs 2a-05, 2a-10, 2a-15, and 2a-20 (NBs or base stations), an MME 2a-25, and an S-GW 2a-30. A UE or terminal 2a-35 may access an external network via the eNB 2a-05, 2a-10, 2a-15, or 2a-20 and the S-GW 2a-30.

In FIG. 2A, the eNBs 2a-05 through 2a-20 correspond to existing NBs of a UMTS. The eNB may be connected to the UE 2a-35 through a radio channel and may perform complex functions compared to the existing NB. Because all user traffic data including real-time services such as voice over Internet protocol (VoIP) is serviced through shared channels in the LTE system, an entity for collating buffer status information of UEs, available transmission power status information, channel status information, etc. and performing scheduling is required, and each of the eNBs 2a-05, 2a-10, 2a-15, and 2a-20 may serve as such an entity. One eNB may generally control a plurality of cells. For example, the LTE system may use RAT such as OFDM at a bandwidth of 20 MHz to achieve a data rate of 100 Mbps. However, the disclosure is not limited to the above examples. Also, the eNBs 2a-05 through 2a-20 may use AMC to determine a modulation scheme and a channel coding rate in accordance with a channel status of the terminal. The S-GW 2a-30 is an entity for providing a data bearer and may generate or remove a data bearer under control by the MME 2a-25. The MME is an entity for performing a mobility management function and various control functions for the terminal and may be connected to a plurality of the base stations.

Figure 2B:
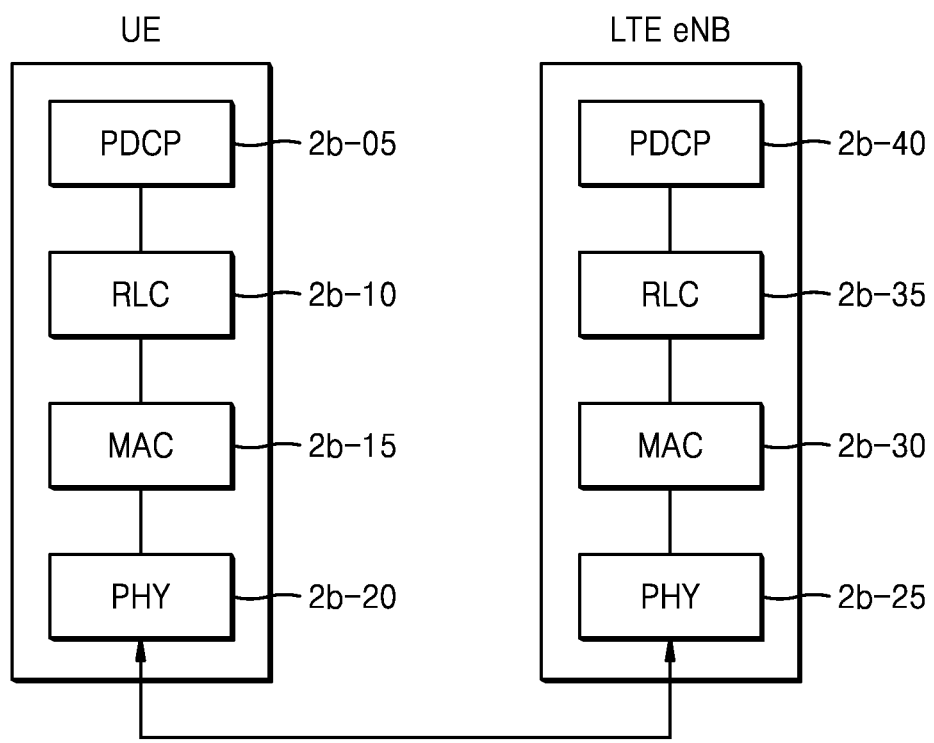
FIG. 2B is a diagram of a radio protocol architecture of an LTE system, according to an embodiment of the disclosure.

FIG. 2B is a diagram of a radio protocol architecture of an LTE system, according to an embodiment of the disclosure.

Referring to FIG. 2B, the radio protocol architecture of the LTE system may include PDCP layers 2b-05 and 2b-40, RLC layers 2b-10 and 2b-35, and MAC layers 2b-15 and 2b-30 respectively for a UE and an eNB. The PDCP layer 2b-05 or 2b-40 is in charge of IP header compression/decompression, etc. Main functions of the PDCP layer are summarized below. However, the main functions are not limited to following examples.

Header compression and decompression: Robust header compression (ROHC) only

Transfer of user data

In-sequence delivery of upper layer packet data units (PDUs) at PDCP re-establishment procedure for RLC acknowledged mode (AM)

For split bearers in dual connectivity (DC) (only support for RLC AM): PDCP PDU routing for transmission and PDCP PDU reordering for reception)

Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer 2b-10 or 2b-35 may perform an ARQ operation by reconfiguring PDCP PDUs to appropriate sizes. Main functions of the RLC layer are summarized below. However, the main functions are not limited to following examples.

Transfer of upper layer PDUs

Error Correction through ARQ (only for AM data transfer)

Concatenation, segmentation, and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 2b-15 or 2b-30 is connected to multiple RLC layers configured for a single UE and may multiplex RLC PDUs into a MAC PDU and demultiplex the RLC PDUs from the MAC PDU. Main functions of the MAC layer are summarized below. However, the main functions are not limited to following examples.

Mapping between logical channels and transport channels

Multiplexing/demultiplexing of MAC SDUs belonging to one or different logical channels into/from transport blocks (TBs) delivered to/from the physical layer on transport channel s Scheduling information reporting Error correction through HARQ Priority handling between logical channels of one UE Priority handling between UEs by means of dynamic scheduling MBMS identification Transport format selection Padding A PHY layer 2b-20 or 2b-25 may channel-code and modulate upper layer data into OFDM symbols and transmit the OFDM symbols through a radio channel, or demodulate OFDM symbols received through a radio channel and channel-decode and deliver the OFDM symbols to an upper layer. However, the disclosure is not limited to the above examples.

Figure 2C:
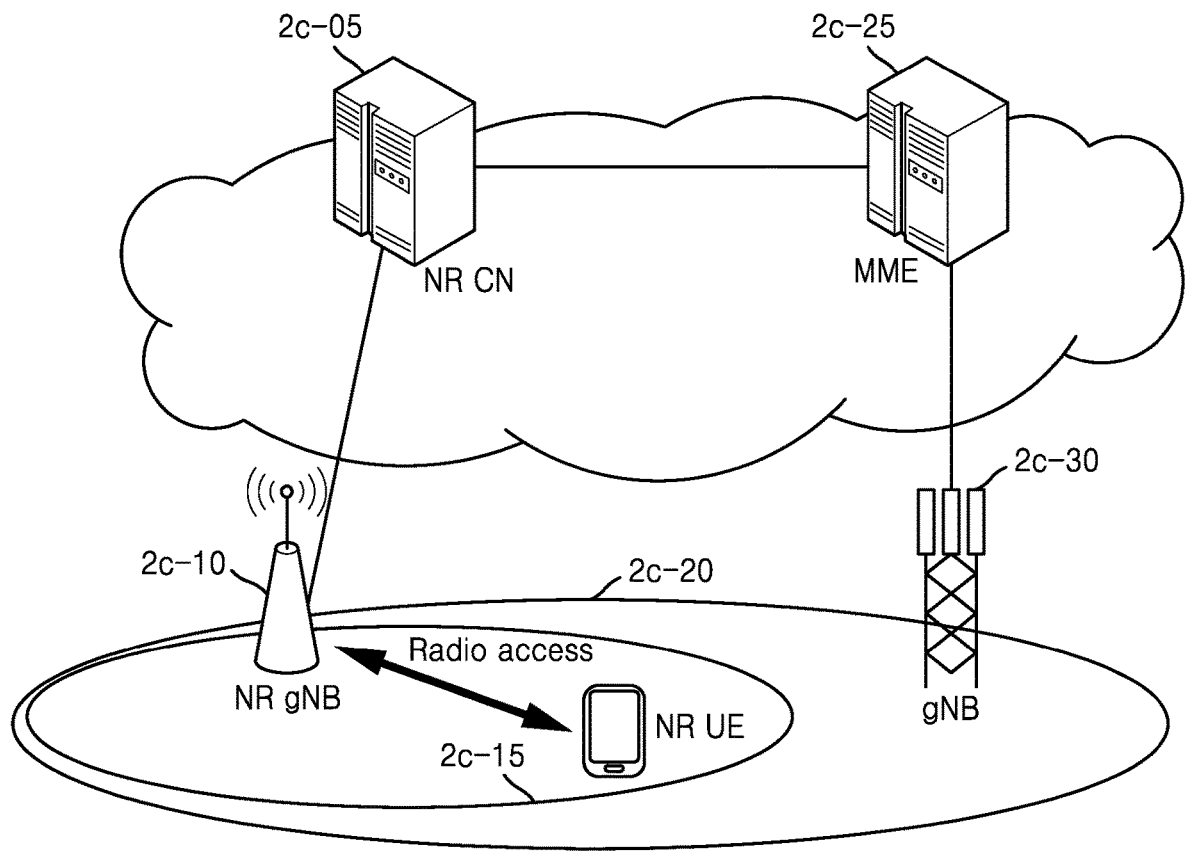
FIG. 2C is a diagram of a structure of a next-generation mobile communication system, according to an embodiment of the disclosure.

FIG. 2C is a diagram of a structure of a next-generation mobile communication system, according to an embodiment of the disclosure.

Referring to FIG. 2C, a radio access network of the next-generation mobile communication system (e.g., an NR or 5G system) may include an NR node B (NR NB) (hereinafter, referred to as an NR gNB or NR base station) 2c-10 and an NR core network (CN) 2c-05. An NR UE or terminal 2c-15 may access an external network via the NR gNB 2c-10 and the NR CN 2c-05.

In FIG. 2C, the NR gNB 2c-10 corresponds to an eNB of an existing LTE system. The NR gNB is connected to the NR UE 2c-15 through radio channels and may provide superior services compared to an existing NB. Because all user traffic data is serviced through shared channels in the next-generation mobile communication system, an entity for collating buffer status information of UEs, available transmission power status information, channel status information, etc. and performing scheduling may be required and such operations may be performed by the NR gNB 2c-10. A single NR gNB generally controls a plurality of cells. According to an embodiment of the disclosure, the next-generation mobile communication system may have a bandwidth equal to or greater than an existing maximum bandwidth of current LTE to achieve an ultrahigh data rate, and beamforming technology may be additionally used by using OFDM as RAT. Also, according to an embodiment of the disclosure, the NR gNB 2c-10 may use an AMC scheme to determine a modulation scheme and a channel coding rate in accordance with a channel status of the terminal. The NR CN 2c-05 may perform functions including mobility support, bearer configuration, and quality of service (QoS) configuration. The NR CN 2c-05 is an entity for performing a mobility management function and various control functions for the terminal and may be connected to a plurality of the base stations. The next-generation mobile communication system may cooperate with the existing LTE system, and the NR CN 2c-05 is connected to an MME 2c-25 through a network interface. The MME may be connected to an eNB 2c-30 that is an existing base station.

Figure 2D:
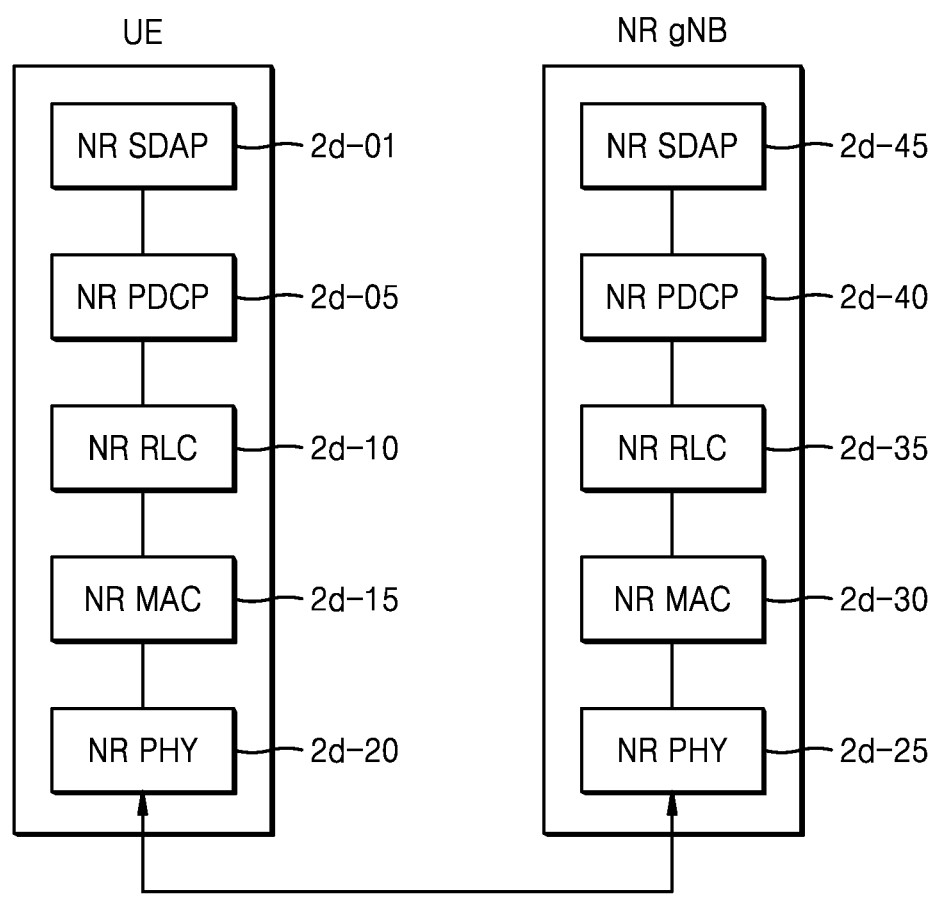
FIG. 2D is a diagram of a radio protocol architecture of a next-generation mobile communication system, according to an embodiment of the disclosure.

FIG. 2D is a diagram of a radio protocol architecture of a next-generation mobile communication system, according to an embodiment of the disclosure.

Referring to FIG. 2D, a radio protocol of the next-generation mobile communication system may include NR SDAP layers 2d-01 and 2d-45, NR PDCP layers 2d-05 and 2d-40, NR RLC layers 2d-10 and 2d-35, and NR MAC layers 2d-15 and 2d-30 respectively for a UE and an NR gNB.

According to an embodiment of the disclosure, main functions of the NR SDAP layers 2d-01 and 2d-45 may include some of the following functions. However, the main functions are not limited to following examples.

Transfer of user plane data

Mapping between QoS flow and a data radio bearer (DRB) for both downlink (DL) and uplink (UL)

Marking QoS flow ID in both DL and UL packets

Reflective QoS flow to DRB mapping for the UL SDAP PDUs

With respect to the NR SDAP layer, the UE may receive, via an RRC message, configurations on whether to use a header of the NR SDAP layer or use a function of the NR SDAP layer for each NR PDCP layer, each bearer, or each logical channel. When an SDAP header is configured, the UE may instruct, via an NAS reflective QoS configuration 1-bit indicator and AS reflective QoS configuration 1-bit indicator, updating or reconfiguration of mapping information of a data bearer and a QoS flow of UL and DL. The SDAP header may include QoS flow ID indicating QoS. Also, according to an embodiment of the disclosure, QoS information may be used as data processing priority information, scheduling information, etc. for supporting a smooth service.

According to an embodiment of the disclosure, main functions of the NR PDCP layer 2d-05 or 2d-40 may include some of the following functions. However, the main functions are not limited to following examples.

Header compression and decompression: Robust header compression (ROHC) only

Transfer of user data

In-sequence delivery of upper layer PDUs

Out-of-sequence delivery of upper layer PDUs

PDCP PDU reordering for reception

Duplicate detection of lower layer SDUs

Retransmission of PDCP SDUs

Ciphering and deciphering

Timer-based SDU discard in uplink

According to an embodiment of the disclosure, a reordering function of the NR PDCP layer may include a function of reordering PDCP PDUs received from a lower layer, based on a PDCP sequence number (SN). The reordering function of the NR PDCP layer may include at least one of a function of delivering data to an upper layer in a reordered order, a function of immediately delivering the data without considering an order, a function of recording missing PDCP PDUs by reordering the PDCP PDUs, a function of reporting status information of the missing PDCP PDUs to a transmitter, or a function of requesting to retransmit the missing PDCP PDUs.

According to an embodiment of the disclosure, main functions of the NR RLC layers 2d-10 and 2d-35 may include some of the following functions. However, the main functions are not limited to following examples.

Transfer of upper layer PDUs

In-sequence delivery of upper layer PDUs

Out-of-sequence delivery of upper layer PDUs

Error correction through ARQ

Concatenation, segmentation and reassembly of RLC SDUs

Re-segmentation of RLC data PDUs

Reordering of RLC data PDUs

Duplicate detection

Protocol error detection

RLC SDU discard

RLC re-establishment

According to an embodiment of the disclosure, the in-sequence delivery function of the NR RLC layer may denote a function of delivering RLC SDUs received from a lower layer, to an upper layer in order. The in-sequence delivery function may include at least one of a function of, when one RLC SDU is received by being segmented into a plurality of RLC SDUs, delivering the RLC SDUs after reassembling the same, reordering the received RLC PDUs based on an RLC SN or PDCP SN, a function of recording missing RLC PDUs by reordering an order, a function of reporting a status of the missing RLC PDUs to a transmitter, a function of requesting to retransmit the missing RLC PDUs, a function of, when there is a missing RLC SDU, delivering only RLC SDUs ahead of the missing RLC SDU to an upper layer in an order, a function of, when a certain timer is expired despite that there is a missing RLC SDU, delivering all RLC SDUs received before the timer starts to an upper layer in an order, or a function of, when a certain timer is expired despite that there is a missing RLC SDU, delivering all RLC SDUs received so far to an upper layer in an order.

Also, according to an embodiment of the disclosure, the NR RLC layer may process the RLC PDUs in a received order (arriving order regardless of an order of serial numbers or SNs) and deliver the RLC PDUs to a PDCP layer in an out-of-sequence delivery manner, or in case of segments, may receive segments stored in a buffer or to be received later to reconfigure one complete RLC PDU, process the RLC PDU, and transmit the RLC PDU to the PDCP layer.

According to an embodiment of the disclosure, the NR RLC layer may not have a concatenation function, and the concatenation function may be performed by the NR MAC layer or be replaced with a multiplexing function of the NR MAC layer.

According to an embodiment of the disclosure, the out-of-sequence delivery of the NR RLC layer denotes a function of delivering RLC SDUs received from a lower layer immediately to an upper layer regardless of order, and may include at least one of a function of reassembling and delivering segmented and received RLC SDUs when one RLC SDU is segmented into several RLC SDUs, or a function of recording missing RLC PDUs by storing RLC SN or PDCP SN and reordering received RLC PDUs.

According to an embodiment of the disclosure, the NR MAC layer 2d-15 or 2d-30 may be connected to multiple NR RLC layers configured for a single UE, and main functions of the NR MAC layer may include some of the following functions. However, the main functions are not limited to following examples.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS identification
Transport format selection
Padding According to an embodiment of the disclosure, NR PHY layer 2d-20 or 2d-25 may channel-code and modulate upper layer data into OFDM symbols and transmit the OFDM symbols through a radio channel. Also, the NR PHY layer 2d-20 or 2d-25 may demodulate OFDM symbols received through a radio channel and channel-decode and deliver the OFDM symbols to an upper layer. However, the disclosure is not limited to the above.

Figure 2E:
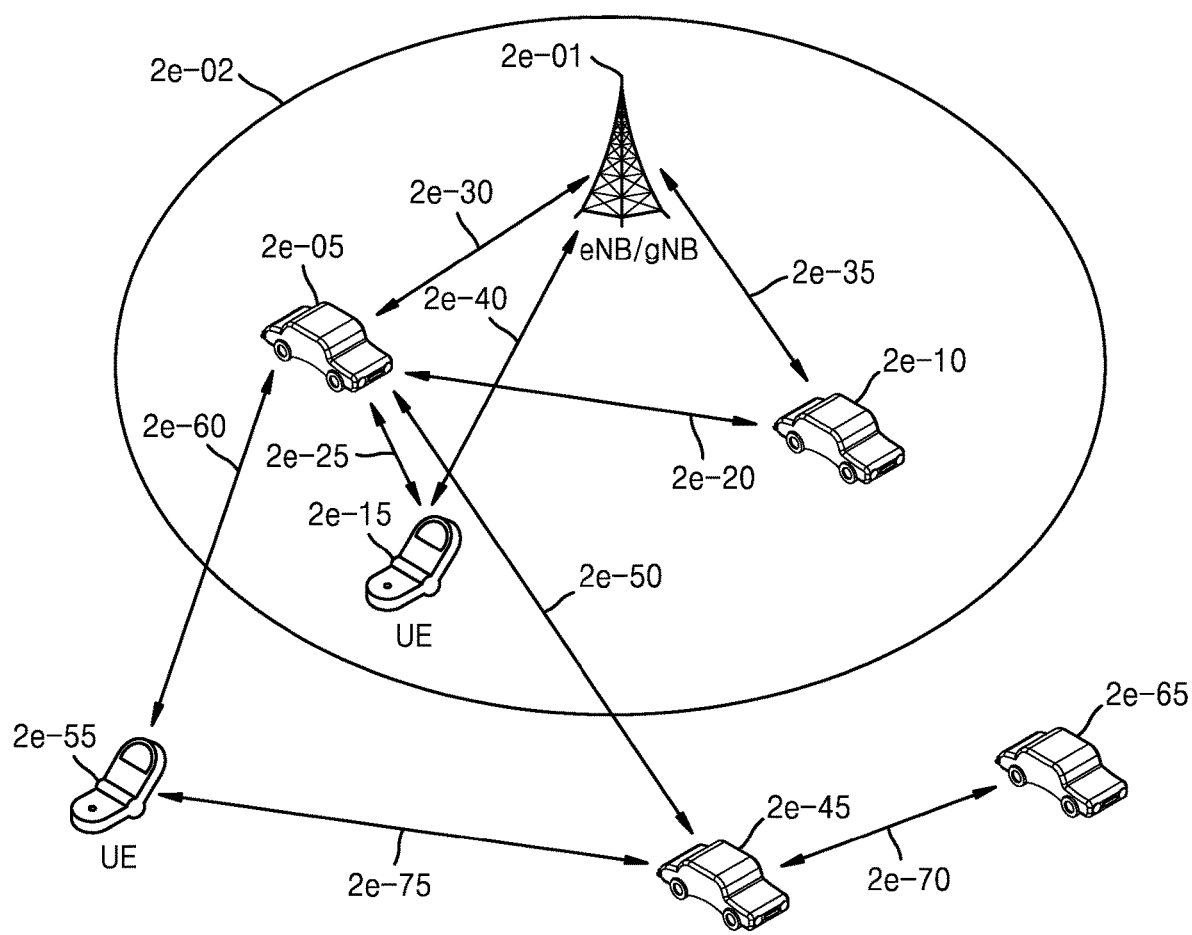
FIG. 2E is a diagram for describing V2X communication of a next-generation mobile communication system, according to an embodiment of the disclosure.

FIG. 2E is a diagram for describing V2X communication of a next-generation mobile communication system, according to an embodiment of the disclosure.

V2X according to an embodiment of the disclosure commonly refers to communication technology via a vehicle and all interfaces and includes vehicle-to-vehicle (V2V), vehicle-to-infrastructure (V2I), vehicle-to-pedestrian (V2P), or vehicle-to-network (V2N), depending on a shape thereof and components providing communication.

Referring to FIG. 2E, a base station 2e-01 may include at least one vehicle terminal 2e-05 or 2e-10 and a pedestrian mobile terminal 2e-15, which are located within a cell 2e-02 supporting V2X. The V2X is supportable via a Uu interface and/or a PC5 interface. When the V2X is supported via the Uu interface, for example, the vehicle terminal 2e-05 or 2e-10 may perform V2X cellular communication with the base station 2e-01 by using vehicle terminal-base station UL/DL 2e-30 or 2e-35, or the pedestrian mobile terminal 2e-15 may perform V2X cellular communication by using pedestrian terminal-base station UL/DL 2e-40.

When the V2X is supported via the PC5 interface, V2X sidelink (SL) communication may be performed by using terminal-terminal SL 2e-20 or 2e-25. For example, the vehicle terminal 2e-05 in coverage of a base station (E-TURA/NR) may transmit or receive a V2X packet to or from another vehicle terminal 2e-10 or 2e-45 and/or a pedestrian mobile terminal 2e-15 or 2e-55, via SL 2e-20, 2e-50, 2e-25, or 2e-60, i.e., a transmission channel. The V2X packet may be transmitted or received in a broadcast transmission type and/or a unicast and/or groupcast transmission type.

A terminal supporting V2X SL communication may transmit or receive the V2X packet via a resource assignment mode (scheduled resource allocation or UE autonomous resource selection). The scheduled resource allocation (mode 1 and/or mode 3) is a mode in which a base station allocates a resource used for SL transmission to an RRC connected mode terminal, via a dedicated scheduling method. The scheduled resource allocation mode may be effective in interference management and/or management of a resource pool (dynamic allocation or semi-persistence transmission) because the base station is able to manage resources of SL. When there is data to be transmitted to other terminal(s), the RRC connected mode terminal may notify the base station that there is the data to be transmitted to the other terminal(s) by using an RRC message or an MAC control element (CE). For example, the RRC message may use SidelinkUEInformation, an UEAssistanceInformation message, or the like, and the MAC CE may use a buffer status report MAC CE in a new format (including at least an indicator indicating a buffer status report for V2X communication and information about a data size buffered for SL communication), or the like.

The UE autonomous resource selection (mode 2 and/or mode 4) is a mode in which a base station provides system information and/or SL resource information/pool via an RRC message, to a terminal supporting V2X SL communication, and the terminal selects a resource according to a determined rule. When the base station provides information to the terminal by using the system information, for example, the base station may provide the SL resource information to the terminal by signaling SIB21, SIB26, or SIM or the like to be newly defined for an NR V2X terminal. When the base station provides information to the terminal by using the RRC message, for example, the base station may provide the SL resource information to the terminal by signaling, to the terminal, an RRC connection reconfiguration (RRCReconfiguration) message and/or a connection resume (RRCResume) message. Also, in the UE autonomous resource selection mode, the terminal may help other terminal(s) to select a resource used for SL, via a PC5-RRC message and/or MAC CE, or allocate a resource used for SL transmission via scheduling or directly/indirectly. In other words, the UE autonomous resource selection mode may include one or more modes below.

UE autonomously selects sidelink resource for transmission

UE assists sidelink resource selection for other UEs

UE is configured with NR configured grant for sidelink transmission

UE schedules sidelink transmission of other UEs

A resource selecting method of the terminal may include zone mapping, sensing-based resource selection, random selection, configured grant-based resource selection, or the like.

The terminal supporting the V2X SL communication may transmit or receive the V2X packet, based on a pre-configured resource pool (preconfiguration resource), by being included in SL-V2X-Preconfiguration that is an information element (IE). For example, when the terminal is unable to perform the V2X SL communication based on the scheduled resource allocation and/or UE autonomous resource selection mode due to certain reasons, despite that the terminal is in coverage of the base station, the terminal may perform the V2X SL communication via an SL transmission/reception resource pool preconfigured in the SL-V2X-Preconfiguration that is the IE. Also, the vehicle terminal 2e-45 out-of-coverage of the base station (E-UTRA/NR) may perform the V2X SL communication with the other vehicle terminal 2e-65 or the pedestrian mobile terminal 2e-55, based on the SL preconfiguration resource via SL 2e-70 or 2e-75.

LTE V2X SL communication is designed mainly for a basic safety service. In other words, the terminal supporting the LTE V2X SL communication is designed to provide the basic safety service to all adjacent terminals supporting the LTE V2X SL communication, via a broadcast transmission type. Accordingly, the terminal is not required to perform a process of separately establishing a session with another specific terminal or perform an SL connection establishment procedure.

However, the V2X SL communication may be designed to provide not only the basic safety service, but also various improved services (for example, an autonomous driving service, a platnooning service, a remote driving service, and in-vehicle infotainment) in a next-generation mobile communication (NR). Accordingly, NR V2X SL communication may be designed to support not only a broadcast transmission type, but also a unicast and/or groupcast transmission type.

Figure 2F:
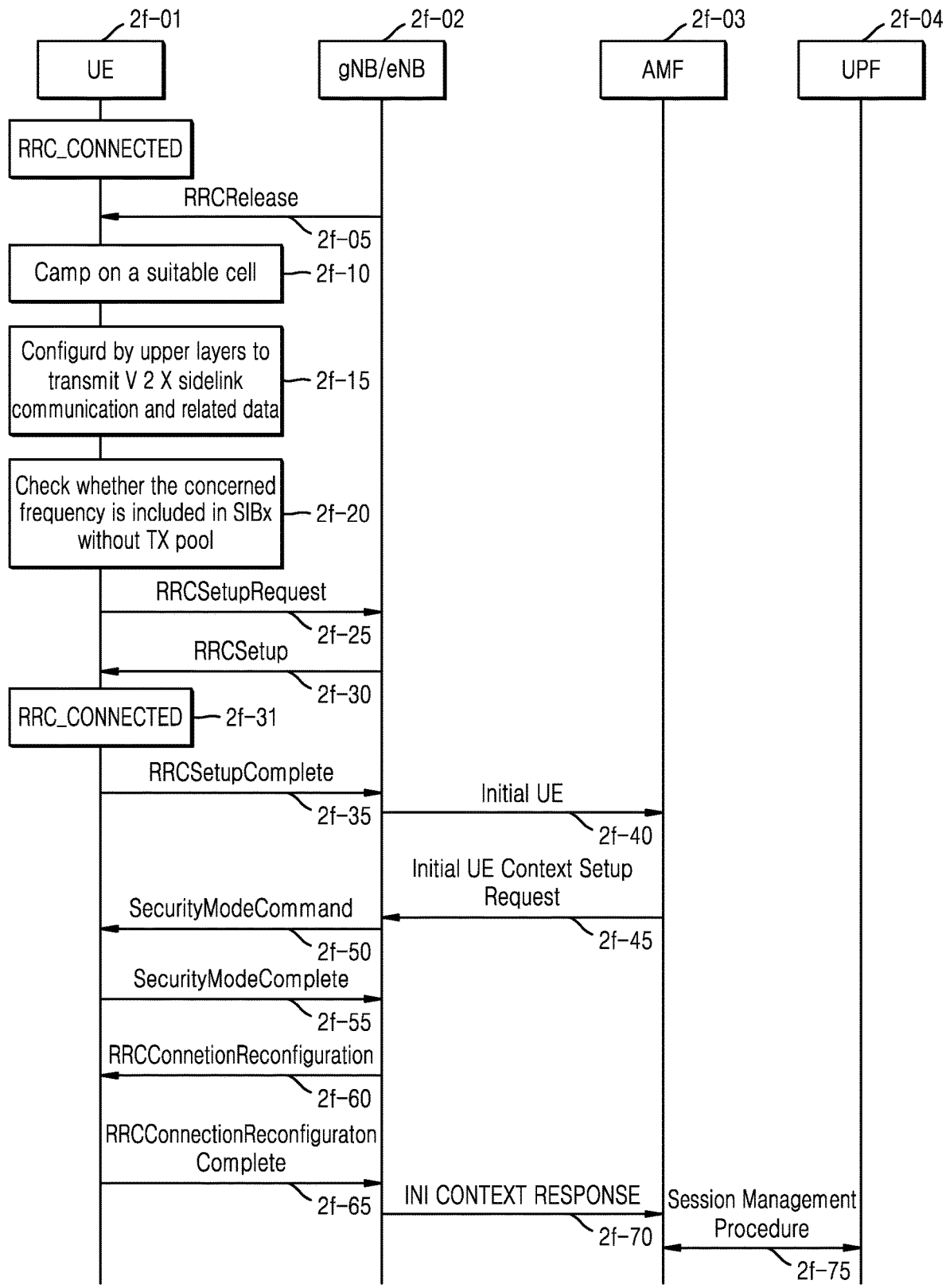
FIG. 2F is a diagram for describing a procedure in which a base station releases a connection of a UE such that the UE switches from an RRC connected mode to an RRC idle mode, and a procedure in which the UE establishes a connection with the base station to switch from the RRC idle mode to the RRC connected mode, according to an embodiment of the disclosure.

FIG. 2F is a diagram for describing procedures in which a base station releases a connection with a terminal and the terminal switches from an RRC connected mode (RRC_CONNECTED) to an RRC idle mode (RRC_IDLE) and procedures in which the terminal establishes a connection with the base station and switches from the RRC idle mode (RRC_IDLE) to the RRC connected mode (RRC_CONNECTED), according to an embodiment of the disclosure.

Referring to FIG. 2F, a UE 2f-01 may establish an RRC connection with a gNB/eNB 2f-02 and thus be in an RRC connected mode (RRC_CONNECTED). When the UE 2f-01 that transmits or receives data in the RRC connected mode does not transmit or receive data for a certain period of time or due to a certain reason, the gNB/eNB 2f-02 may transmit, to the UE 2f-01, an RRC connection release (RRCRelease) message not including suspended configuration information (suspendConfig or rrc-InactiveConfig) (operation 2f-05) to control the UE 2f-01 to transit to an RRC idle mode (RRC_IDLE).

The UE 2f-01 transited to the RRC idle mode performs a cell selection procedure or cell reselection procedure, and may camp-on to find a suitable cell (operation 2f-10). The UE 2f-01 may camp-on an LTE cell or camp-on an NR cell. To perform the cell selection procedure or cell reselection procedure, the UE 2f-01 may receive system information (for example, MIB and/or SIB1 and/or SIB1 and/or SIB3 and/or SIB4 and/or SIB5 and/or SIB24) broadcasted by the cell.

Alternatively, in operation 2f-10, when the UE 2f-01 in the RRC idle mode is able to perform the V2X sidelink communication, the UE 2f-01 may receive, from a serving cell, system information (in case of LTE, SIB21 and/or SIB26 and/or SIBx to be newly defined, and in case of NR, one or a plurality of new SIBx to be newly defined) including V2X sidelink communication configuration information. For example, the V2X sidelink communication configuration information may include at least one of a V2X sidelink communication reception resource pool (for example, v2x-CommRxPool), a V2X sidelink communication transmission resource pool (for example, v2x-CommTxPoolNormalCommon), a V2X sidelink communication transmission resource pool that may be used in an exceptional situation (for example, v2x-CommTxPoolExceptional), or an adjacent frequency resource information list for performing V2X sidelink communication (v2x-InterfreqInfoList). However, the disclosure is not limited to the above examples.

The system information may include an indicator indicating whether one or more frequencies included in v2x-InterFreqInfoList is a frequency for transmitting or receiving LTE V2X sidelink communication, a frequency for transmitting or receiving NR V2X sidelink communication, or a frequency for transmitting or receiving LTE V2X sidelink communication and a frequency for transmitting or receiving NR V2X sidelink communication. Alternatively, the system information may include a separate constant value to distinguish whether one or more frequencies included in v2x-InterFreqInfoList is a frequency for transmitting or receiving LTE V2X sidelink communication, a frequency for transmitting or receiving NR V2X sidelink communication, or a frequency for transmitting or receiving LTE V2X sidelink communication and a frequency for transmitting or receiving NR V2X sidelink communication. For example, when the system information includes 4, 1 to 3 may indicate transmission or reception frequency for NR V2X sidelink communication and values from 4 may indicate transmission or reception frequency for LTE V2X sidelink communication.

Also, the system information including the V2X sidelink communication configuration information may be broadcasted for each RAT. For example, system information including LTE V2X sidelink configuration information and system information including NR V2X sidelink configuration information may be separately broadcasted. When the system information including the V2X sidelink configuration information is separately broadcasted for each RAT, the gNB/eNB may configure an entry included in v2x-InterFreqInfoList according to the system information. For example, when v2x-InterFreqInfoList included in the system information including the NR V2X sidelink configuration information includes N entries, the gNB/eNB may configure v2x-InterFreqInfoList included in the system information including the LTE V2X sidelink configuration information in entries from N+1. The N entries may denote a frequency for the NR V2X sidelink communication and entries from N+1 may denote a frequency for the LTE V2X sidelink communication. Alternatively, the system information including V2X sidelink communication configuration information regarding a plurality of RATs may be broadcasted. For example, system information including both the LTE V2X sidelink configuration information and the NR V2X sidelink configuration information may be broadcasted. An ASN.1 structure for the SIB21 or SIB26 may refer to "36.331: Radio Resource Control (RRC)" that is the 3GPP standard document. The ASN.1 structure of the new system information (SIBx) may be as follows.
SystemInformationBlockTypex The IE SystemInformationBlockTypex contains NR V2X and/or LTE V2X sidelink communication configuration.
SystemInformationBlockTypex Information Element communication by upper layers (for example, a V2X layer) in the UE. Here, the UE 2f-01 may be configured to perform the V2X sidelink communication in at least one of following three cases.

First case: When configured by the upper layers to perform the LTE V2X sidelink communication at a specific frequency.

Second case: When configured by the upper layers to perform the NR V2X sidelink communication at a specific frequency.

Third case: When configured by the upper layers to simultaneously perform the LTE V2X sidelink communication and the NR V2X sidelink communication at a specific frequency or specific frequencies.

In other words, the UE 2f-01 may configure each configuration of UE to perform the V2X sidelink communication at a predetermined frequency (or each configuration of

```
-- ASN1START
SystemInformationBlockTypex ::= SEQUENCE {
    sl-V2X-ConfigCommon                    SL-V2X-ConfigCommon
        OPTIONAL,
    lateNonCriticalExtension               OCTET STRING
                        OPTIONAL,
    ...
}
SL-V2X-ConfigCommon ::=      SEQUENCE {
    v2x-CommRxPool                             SL-CommRxPoolListV2X
        OPTIONAL,
    v2x-CommTxPoolNormalCommon                 SL-CommTxPoolListV2X
        OPTIONAL,
    p2x-CommTxPoolNormalCommon                 SL-CommTxPoolListV2X
        OPTIONAL,
    v2x-CommTxPoolExceptional       SL-CommResourcePoolV2X
    OPTIONAL,
    v2x-SyncConfig                             SL-SyncConfigListV2X
    OPTIONAL,
    v2x-InterFreqInfoList          SL-InterFreqInfoListV2X
    OPTIONAL,
    v2x-ResourceSelectionConfig    SL-CommTxPoolSensingConfig
    OPTIONAL,
    zoneConfig                              SL-ZoneConfig
        OPTIONAL,
    typeTxSync                              SL-TypeTxSync
        OPTIONAL,
    thresSL-TxPrioritization        SL-Priority
    OPTIONAL,
    anchorCarrierFreqList           SL-AnchorCarrierFreqList-V2X OPTIONAL,
    offsetDFN                                  INTEGER (0..1000)
                        OPTIONAL,
    cbr-CommonTxConfigList                     SL-CBR-CommonTxConfigList
    OPTIONAL
    cbr-pssch-TxConfigList          SL-CBR-PPPP-TxConfigList
    OPTIONAL,
    v2x-PacketDuplicationConfig     SL-V2X-PacketDuplicationConfig
    OPTIONAL,             SyncFreqList            SL-V2X-
SyncFreqList           OPTIONAL,
    slss-TxMultiFreq                        ENUMERATED {true}
        OPTIONAL,
    v2x-FreqSelectionConfigList     SL-V2X-FreqSelectionConfigList
    OPTIONAL,
    threshS-RSSI-CBR                        INTEGER (0..45)
                        OPTIONAL,
}
-- ASN1STOP
```

A SIBy according to an embodiment of the disclosure may denote at least one of SIB21, SIB26, or SIBx to be newly defined. Also, SIBx may denote one or a plurality of pieces of system information to be newly defined by including the V2X sidelink configuration information.

In operation 2f-15, when the UE 2f-01 in the RRC idle mode is able to perform the V2X sidelink communication, the UE 2f-01 may be configured to perform the V2X sidelink a UE may be configured). Alternatively, in operation 2f-15, the UE in the RRC idle mode being configured to perform the V2X sidelink communication may include being configured to transmit non-pedestrian-to-everything (P2X) related V2X sidelink communication and related data or being configured to transmit P2X related V2X sidelink communication and related data.

In operation 2f-20, the UE 2f-01 in the RRC idle mode may perform following operations when configured to transmit non-P2X related V2X sidelink communication and related data at the specific frequency (frequencies) by at least one of the three cases above in operation 2f-15. When the SIBy received in operation 2f-10 includes the specific frequency but does not include a V2X sidelink communication transmission resource pool associated with the specific frequency (the concerned frequency is included in SIM without TX pool), the UE 2f-01 may perform an RRC connection establishment procedure with the gNB/eNB 2f-02. For example, the UE may determine that the V2X sidelink communication transmission resource pool is not included in the system information in a following case.

When frequency configured for performing the V2X sidelink communication in operation 2f-15 is a frequency (camped frequency) camped-on by the UE 2f-01, the UE 2f-01 broadcasts the SIBy by a cell camped-on by the UE 2f-01, and the SIBy of a valid version includes sl-V2X-ConfigCommon but the sl-V2X-ConfigCommon does not include the Tx pool (for example, v2x-CommTxPoolNormalCommon) (if the frequency on which the UE is configured to transmit non-P2X related V2X sidelink communication concerns the camped frequency; and if SystemInformationBlockTypey is(are) broadcast by the cell on which the UE camps; and if the valid version of SystemInformationBlockTypey include(s) sl-V2X-ConfigCommon; and sl-V2X-ConfigCommon does not include v2x-CommTxPoolNormalCommon)

Alternatively, when the frequency configured for performing the V2X sidelink communication in operation 2f-15 is included in the v2x-InterFreqInfoList signaled from the SIBy broadcasted by the cell camped-on by the UE 2f-01, and the SIBy of the valid version does not include the Tx pool (for example, v2x-CommTxPool-Normal) (if the frequency(ies) on which the UE is configured to transmit non-P2X related V2X sidelink communication is included in v2x-InterFreqInfoList within SystemInformationBlockTypey broadcast by the cell on which the UE camps; and if the valid version of SystemInformationBlockTypey do(es) not include v2x-CommTxPoolNormal for the concerned frequency)

Alternatively, in operation 2f-20, the UE 2f-01 in the RRC idle mode may perform the RRC connection establishment procedure with the gNB/eNB when configured to transmit P2X related V2X sidelink communication and related data at the specific frequency (frequencies) by at least one of the three cases above in operation 2f-15, and when the SIBy received in operation 2f-10 includes the specific frequency but does not include the V2X sidelink communication transmission resource pool associated with the specific frequency (the concerned frequency is included in SIBy without Tx Pool). For example, the UE 2f-01 may determine that the V2X sidelink communication transmission resource pool is not included in the system information in a following case.

When a frequency configured by the upper layers for performing the V2X sidelink communication in operation 2f-15 is a frequency (camped frequency) camped-on by the UE 2f-01, the UE 2f-01 broadcasts the SIBy by a cell camped-on by the UE 2f-01, and the SIBy of a valid version includes sl-V2X-ConfigCommon but the sl-V2X-ConfigCommon does not include the Tx pool (for example, p2x-CommTxPoolNormalCommon) (if the frequency on which the UE is configured to transmit P2X related V2X sidelink communication concerns the camped frequency; and if SystemInformationBlockTypey is(are) broadcast by the cell on which the UE camps; and if the valid version of SystemInformationBlockTypey include(s) sl-V2X-ConfigCommon; and sl-V2X-ConfigCommon does not include p2x-CommTxPoolNormalCommon)

Alternatively, when the frequency configured by the upper layers for performing the V2X sidelink communication in operation 2f-15 is included in the v2x-InterFreqInfoList signaled from the SIBy broadcasted by the cell camped-on by the UE 2f-01, and the SIBy of the valid version does not include the Tx pool (for example, p2x-CommTxPoolNormal) (if the frequency(ies) on which the UE is configured to transmit non-P2X related V2X sidelink communication is(are) included in v2x-InterFreqInfoList within SystemInformationBlockTypey broadcast by the cell on which the UE camps; and if the valid version of SystemInformationBlockTypey do(es) not include p2x-CommTxPoolNormal for the concerned frequency)

In operation 2f-25, the UE 2f-01 in the RRC idle mode may perform the RRC connection establishment procedure with the gNB/eNB 2f-02, when the SIBy includes the specific frequency (frequencies) configured to perform the V2X sidelink communication in operation 2f-20, but does not include the V2X sidelink communication transmission resource pool associated with the specific frequency (frequencies).

The UE 2f-01 may establish inverse direction transmission synchronization with the gNB/eNB 2f-02 via a random access process, and transmit an RRC connection request (RRCSetupRequest) message to the gNB/eNB 2f-02 (operation 2f-25). The RRC connection request message may include an identifier (ue-Identity) of the UE 2f-01 and a reason (establishmentCause) for establishing a connection.

The gNB/eNB 2f-02 may transmit, to the UE 2f-01, an RRC connection establishment (RRCSetup) message such that the UE 2f-01 establishes an RRC connection (operation 2f-30). The RRC connection establishment message may include RRC connection configuration information or the like. For example, the RRC connection configuration information may include at least one of radio bearer configuration information (radioBearerConfig), master cell group configuration information (masterCellGroup), or the like. In detail, the radio bearer configuration information and master cell group configuration information may include at least one of information involving a signaling radio bearer (SRB)1 connection, RLC bearer configuration information for SRB1, MAC cell group configuration information (mac-CellGroupConfig), or physical cell group configuration information (physicalCellGroupConfig). In other words, the RRC connection establishment may involve an SRB1 connection and may not involve another radio bearer connection excluding SRB1 (for example, the RRC connection establishment may not involve SRB2 for the UE 2f-01 and gNB/eNB 2f-02 to transmit or receive an NAS message or a data radio bearer (DRB) connection for transmitting or receiving data).

The UE 2f-01 that established the RRC connection (or received the RRC connection establishment message) may transit to the RRC connected mode (RRC_CONNECTED) (operation 2f-31), and transmit an RRC connection establishment complete (RRCSetupComplete) message to the gNB/eNB 2f-02 (operation 2f-35). The RRC connection establishment complete message may include a service request message requesting, by the UE 2f-01, an AMF 2f-03 for bearer configuration for a certain service. The gNB/eNB 2f-02 may transmit, to the AMF 2f-03, an initial UE message including the service request message included in the RRC connection establishment complete message (operation 2f-40), and the AMF 2f-03 may determine whether to provide a service requested by the UE.

When the service requested by the UE 2f-01 is providable as a result of the determination, the AMF 2f-03 may transmit, to the gNB/eNB 2f-02, an initial UE context setup request message (operation 2f-45). The initial UE context setup request message may include at least one piece of information from among QoS information to be applied during DRB configuration, security-related information to be applied to DRB (for example, a security key or a security algorithm), and the like.

When the RRC connection establishment procedure is successfully performed, the gNB/eNB 2f-02 may transmit, to the UE 2f-01, a security mode command (SecurityModeCommand) message so as to activate AS security with the UE 2f-01 in the RRC connected mode (operation 2f-50). Upon receiving the security mode command message, the UE 2f-01 may transmit a security mode complete (SecurityModeComplete) message to the gNB/eNB 2f-02 (operation 2f-55).

When transmitting a security command message, the gNB/eNB 2f-02 may perform an RRC connection reconfiguration (RRC reconfiguration) procedure with the UE 2f-01 after the security mode command message is transmitted or after the security mode complete message is received. First, the gNB/eNB 2f-02 may transmit an RRC connection reconfiguration (RRCReconfiguration) message to the UE 2f-01 (operation 2f-60). The RRC connection reconfiguration message may include configuration information of DRB for processing user data or configuration information of SRB2 for transmitting an NAS message. Alternatively, the RRC connection reconfiguration message may include the V2X sidelink configuration information (for example, sl-V2X-ConfigDedicated). The UE 2f-01 may apply the configuration information included in the RRC connection reconfiguration message, and transmit, to the gNB/eNB 2f-02, RRC connection reconfiguration complete (RRCReconfigurationComplete) message (operation 2f-65). The gNB/eNB 2f-02 that completed the DRB configuration with the UE 2f-01 may transmit, to the AMF 2f-03, an initial UE context setup response message (operation 2f-70), and the AMF 2f-03 that received the initial UE context setup response message may establish a PDU session by performing a session management procedure with a UPF 2f-04 (operation 2f-76). As such, general data transmission processes may largely include three steps of RRC connection establishment, security setting, and DRB configuration.

As described above, many signaling procedures are required for the UE 2f-01 to establish the RRC connection and switch from the RRC idle mode to the RRC connected mode. Accordingly, in the next-generation mobile communication system, the RRC inactive mode (RRC_INACTIVE) may be newly defined, the UE 2f-01 and the gNB/eNB 2f-02 store context of the UE 2f-01 in a new mode, such as the RRC inactive mode, and an Si bearer may be maintained when required, and thus when the UE 2f-01 in the RRC inactive mode is to access a network again, the network may be further quickly accessed and data may be transmitted and received via fewer signaling procedures, through an RRC connection resume procedure proposed below.

Figure 2G:
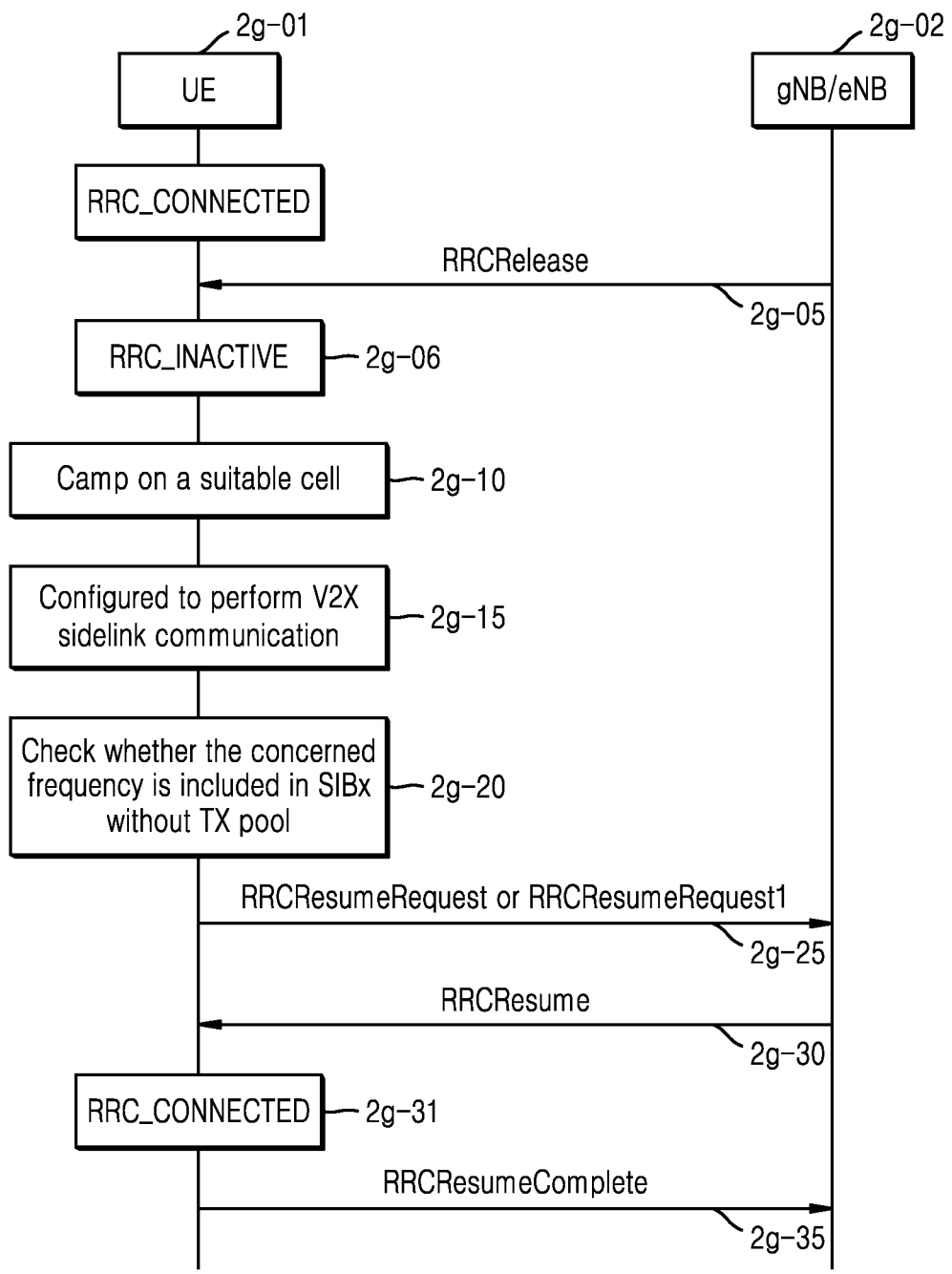
FIG. 2G is a diagram for describing a procedure in which a base station disconnects a UE such that the UE switches from an RRC connected mode to an RRC inactive mode, and a procedure in which the UE resumes connection with the base station to switch from the RRC inactive mode to the RRC connected mode, according to an embodiment of the disclosure.

FIG. 2G is a diagram for describing a procedure in which a base station disconnects a UE such that the UE switches from an RRC connected mode (RRC_CONNECTED) to an RRC inactive mode (RRC_INACTIVE), and a procedure in which the UE resumes connection with the base station to switch from the RRC inactive mode (RRC_INACTIVE) to the RRC connected mode (RRC_CONNECTED), according to an embodiment of the disclosure.

Referring to FIG. 2G, a UE 2g-01 may establish an RRC connection with a gNB/eNB 2g-02 and thus be in an RRC connected mode (RRC_CONNECTED). When the UE 2g-01 that transmits or receives data in the RRC connected mode does not transmit or receive data for a certain period of time or due to a certain reason, the gNB/eNB 2g-02 may transmit, to the UE 2g-01, an RRC connection release (RRCRelease) message including suspended configuration information (suspendConfig or rrc-InactiveConfig) (operation 2g-05) to control the UE 2g-01 to transit to an RRC inactive mode (RRC_INACTIVE).

A series of operations of the UE 2g-01 proposed when the UE 2g-01 receives the RRC connection release message including the suspended configuration information from the gNB/eNB are as follows.

The UE 2g-01 may apply the received suspended configuration information (apply the received suspendConfig). The suspended configuration information may include at least one of following parameters.

Full UE connection resume identifier (full-radio network temporary identifier (RNTI): When useFullResumeID is signaled to an SIB1 broadcasted by a cell of which a connection is to be resumed later, via a cell selection/reselection process, the UE 2g-01 may transmit an RRCResumeRequest1 message to the cell. In other words, the UE 2g-01 may transmit the RRCResumeRequest1 message to the cell by configuring resumeIdentity to be an I-RNTI value.

Short UE connection resume identifier (ShortI-RNTI): When the useFullResumeID is not signaled to the SIM broadcasted by the cell of which the connection is to be resumed later, via the cell selection/reselection process, the UE 2g-01 may transmit an RRCResumeRequest message to the cell. In other words, the UE 2g-01 may transmit the RRCResumeRequest message to the cell by configuring resumeIdentity to be an ShortI-RNTI value.

RAN paging cycle (ran-PagingCycle): The UE 2g-01 in the RRC inactive mode may monitor RAN-initiated paging by applying PagingCycle included in a ran-PagingCycle field. When RAN-initiated paging is received, the UE 2g-01 may perform an RRC connection resume procedure with the gNB/eNB 2g-02.

RAN-based notification area information (ran-NotificationAreaInfo): The UE 2g-01 in the RRC inactive mode may perform an RNAU procedure with the cell or gNB/eNB 2g-02 when deviating from an RNA after receiving the SIB1.

T380: PeridocRNAU-TimerValue for the UE 2g-01 in the RRC inactive mode to periodically perform the RNAU procedure may be included. When the above value is included, the UE 2g-01 may operate a T380 timer by setting the T380 timer to the above value. Also, when the timer expires, the UE 2g-01 may perform the RNAU procedure with the gNB/eNB 2g-02.

nextHopChaingCount: The UE 2g-01 in the RRC inactive mode may update a security key ($K_{gNB}$ key) and parameters related thereto, by using NextHopChainingCount.

The UE 2g-01 may reset an MAC layer. This is to, when a connection is resumed again, prevent data stored in an HARQ buffer from being unnecessarily retransmitted.

The UE 2g-01 may re-establish RLC layers for the SRB1. This is to, when a connection is resumed again, prevent data stored in an RLC buffer from being unnecessarily retransmitted and initiate variables to be used later.

The UE 2g-01 may store UE inactive AS context. The UE inactive AS context may include at least one of configured suspended configuration information, a current security key ($K_{gNB}$ key and/or $K_{RRCint}$ key), an ROHC state, a UE cell identifier (C-RNTI) that was used in a source cell (source PCell), a cell identity (cellIdentity) and physical cell identity) of the source cell, or all other parameters configured except ReconfigurationWithSync.

The UE 2g-01 may suspend all SRBs and data radio bearers (DRBs) excluding an SRB0.

The UE 2g-01 may indicate PDCP suspension to lower layers for all DRBs.

When t380 is included in the received suspended configuration information, the UE 2g-01 may operate the T380 timer by setting a timer value to t380.

When waitTime is included in the RRC connection release message, the UE 2g-01 may operate a T320 timer by setting a timer value to waitTime. Also, the UE 2g-01 may notify an upper layer that access barring is applicable to all access categories, excluding access categories of '0' and '2'.

The UE 2g-01 may transit to an RRC inactive mode (RRC_INACTIVE) (operation 2g-06) and perform a cell selection procedure.

The UE 2g-01 transited to the RRC inactive mode performs the cell selection procedure or cell reselection procedure, and may camp-on to find a suitable cell (operation 2g-10). When the UE 2g-01 has configured the RRC connection with the NR gNB/eNB 2g-02 before transiting to the RRC inactive mode, the UE 2g-01 may maintain the RRC inactive mode when camped-on an NR cell. However, when the UE 2g-01 camped-on an LTE cell, the UE 2g-01 may transit to the RRC idle mode. On the other hand, when the UE 2g-01 has configured the RRC connection with the LTE gNB/eNB 2g-02 before transiting to the RRC inactive mode, the UE 2g-01 may maintain the RRC inactive mode when camped-on an LTE cell. However, when the UE 2g-01 camped-on an NR cell, the UE 2g-01 may transit to the RRC idle mode. To perform the cell selection procedure or cell reselection procedure, the UE 2g-01 may receive system information (for example, MIB and/or SIB1 and/or SIB3 and/or SIB4 and/or SIB5 and/or SIB24) broadcasted by the cell.

Alternatively, in operation 2g-10, when the UE 2g-01 in the RRC inactive mode is able to perform the V2X sidelink communication, the UE 2g-01 may receive, from a serving cell, system information (in case of LTE, SIB21 and/or SIB26 and/or SIBx to be newly defined, and in case of NR, one or a plurality of new SIBx to be newly defined) including V2X sidelink communication configuration information. For example, the V2X sidelink communication configuration information may include at least one of a V2X sidelink communication reception resource pool (for example, v2x-CommRxPool), a V2X sidelink communication transmission resource pool (for example, v2x-CommTxPoolNormalCommon), a V2X sidelink communication transmission resource pool that may be used in an exceptional situation (for example, v2x-CommTxPoolExceptional), or an adjacent frequency resource information list for performing V2X sidelink communication (v2x-InterfreqInfoList). However, the disclosure is not limited to the above examples.

The system information may include an indicator indicating whether one or more frequencies included in v2x-InterFreqInfoList is a frequency for transmitting or receiving LTE V2X sidelink communication, a frequency for transmitting or receiving NR V2X sidelink communication, or a frequency for transmitting or receiving LTE V2X sidelink communication and a frequency for transmitting or receiving NR V2X sidelink communication. Alternatively, the system information may include a separate constant value to distinguish whether one or more frequencies included in v2x-InterFreqInfoList is a frequency for transmitting or receiving LTE V2X sidelink communication, a frequency for transmitting or receiving NR V2X sidelink communication, or a frequency for transmitting or receiving LTE V2X sidelink communication and a frequency for transmitting or receiving NR V2X sidelink communication. For example, when the system information includes 4, 1 to 3 may indicate transmission or reception frequency for NR V2X sidelink communication and values from 4 may indicate transmission or reception frequency for LTE V2X sidelink communication.

Also, the system information including the V2X sidelink communication configuration information may be broadcasted for each RAT. For example, system information including LTE V2X sidelink configuration information and system information including NR V2X sidelink configuration information may be separately broadcasted. When the system information including the V2X sidelink configuration information is separately broadcasted for each RAT, the gNB/eNB may configure an entry included in v2x-InterFreqInfoList according to the system information. For example, when v2x-InterFreqInfoList included in the system information including the NR V2X sidelink configuration information includes N entries, the gNB/eNB may configure v2x-InterFreqInfoList included in the system information including the LTE V2X sidelink configuration information in entries from N+1. The N entries may denote a frequency for the NR V2X sidelink communication and entries from N+1 may denote a frequency for the LTE V2X sidelink communication. Alternatively, the system information including V2X sidelink communication configuration information regarding a plurality of RATs may be broadcasted. For example, system information including both the LTE V2X sidelink configuration information and the NR V2X sidelink configuration information may be broadcasted. An ASN.1 structure for the SIB21 or SIB26 may refer to "36.331: Radio Resource Control (RRC)" that is the 3GPP standard document. The ASN.1 structure of the new system information (SIBx) may be as follows.

SystemInformationBlockTypex

The IE SystemInformationBlockTypex contains NR V2X and/or LTE V2X sidelink communication configuration.

SystemInformationBlockTypex Information Element

```
-- ASN1START
SystemInformationBlockTypex ::= SEQUENCE {
    sl-V2X-ConfigCommon                 SL-V2X-ConfigCommon
        OPTIONAL,
    lateNonCriticalExtension            OCTET STRING
                        OPTIONAL,
    ...
}
SL-V2X-ConfigCommon ::=    SEQUENCE {
    v2x-CommRxPool                          SL-CommRxPoolListV2X
        OPTIONAL,
    v2x-CommTxPoolNormalCommon              SL-CommTxPoolListV2X
        OPTIONAL,
    p2x-CommTxPoolNormalCommon              SL-CommTxPoolListV2X
        OPTIONAL,
    v2x-CommTxPoolExceptional       SL-CommResourcePoolV2X
        OPTIONAL,
    v2x-SyncConfig                          SL-SyncConfigListV2X
        OPTIONAL,
    v2x-InterFreqInfoList           SL-InterFreqInfoListV2X
        OPTIONAL,
    v2x-ResourceSelectionConfig     SL-CommTxPoolSensingConfig
        OPTIONAL,
    zoneConfig                              SL-ZoneConfig
        OPTIONAL,
    typeTxSync                              SL-TypeTxSync
        OPTIONAL,
    thresSL-TxPrioritization        SL-Priority
        OPTIONAL,
    anchorCarrierFreqList           SL-AnchorCarrierFreqList-V2X OPTIONAL,
    offsetDFN                               INTEGER (0..1000)
                        OPTIONAL,
    cbr-CommonTxConfigList                  SL-CBR-CommonTxConfigList
        OPTIONAL
    cbr-pssch-TxConfigList          SL-CBR-PPPP-TxConfigList
        OPTIONAL,
    v2x-PacketDuplicationConfig     SL-V2X-PacketDuplicationConfig
        OPTIONAL,            SyncFreqList            SL-V2X-
SyncFreqList               OPTIONAL,
    slss-TxMultiFreq                        ENUMERATED{true}
        OPTIONAL,
    v2x-FreqSelectionConfigList     SL-V2X-FreqSelectionConfigList
        OPTIONAL,
    threshS-RSSI-CBR                        INTEGER (0..45)
                        OPTIONAL,
}
-- ASN1STOP
```

A SIBy according to an embodiment of the disclosure may denote at least one of SIB21, SIB26, or SIBx to be newly defined. Also, SIBx may denote one or a plurality of pieces of system information to be newly defined by including the V2X sidelink configuration information.

In operation 2g-15, when the UE 2g-01 in the RRC inactive mode is able to perform the V2X sidelink communication, the UE 2g-01 may be configured to perform the V2X sidelink communication by upper layers (for example, a V2X layer) in the UE. Here, the UE 2g-01 may be configured to perform the V2X sidelink communication in at least one of following three cases.

First case: When configured by the upper layers to perform the LTE V2X sidelink communication at a specific frequency.

Second case: When configured by the upper layers to perform the NR V2X sidelink communication at a specific frequency.

Third case: When configured by the upper layers to simultaneously perform the LTE V2X sidelink communication and the NR V2X sidelink communication at a specific frequency or specific frequencies.

In other words, the UE 2g-01 may configure the UE 2g-01 to perform the V2X sidelink communication at a predetermined frequency (or the UE 2g-01 may be configured). Alternatively, in operation 2g-15, configuring the UE in the RRC inactive mode to perform the V2X sidelink communication may include configuring to transmit non-P2X related V2X sidelink communication and related data or configuring to transmit P2X related V2X sidelink communication and related data.

In operation 2g-20, the UE 2g-01 in the RRC inactive mode may perform following operations when configured to transmit non-P2X related V2X sidelink communication and related data at the specific frequency (frequencies) by at least one of the three cases above in operation 2g-15. When the SIBy received in operation 2g-10 includes the specific frequency but does not include a V2X sidelink communication transmission resource pool associated with the specific frequency (the concerned frequency is included in SIM without TX pool), the UE 2g-01 may perform an RRC connection resume procedure with the gNB/eNB 2g-02. For example, the UE 2g-01 may determine that the V2X sidelink communication transmission resource pool is not included in the system information in a following case.

When a frequency configured by the upper layers for performing the V2X sidelink communication in operation 2g-15 is a frequency (camped frequency) camped-on by the UE 2g-01, the UE 2g-01 broadcasts the SIBy by a cell camped-on by the UE 2g-01, and the SIBy of a valid version includes sl-V2X-ConfigCommon but the sl-V2X-ConfigCommon does not include the Tx pool (for example, v2x-CommTxPoolNormalCommon) (if the frequency on which the UE is configured to transmit non-P2X related V2X sidelink communication concerns the camped frequency; and if SystemInformationBlockTypey is(are) broadcast by the cell on which the UE camps; and if the valid version of SystemInformationBlockTypey include(s) sl-V2X-ConfigCommon; and sl-V2X-ConfigCommon does not include v2x-CommTxPoolNormalCommon)

Alternatively, when the frequency configured by the upper layers for performing the V2X sidelink communication in operation 2g-15 is included in the v2x-InterFreqInfoList signaled from the SIBy broadcasted by the cell camped-on by the UE 2g-01, and the SIBy of the valid version does not include the Tx pool (for example, v2x-CommTxPoolNormal) (if the frequency(ies) on which the UE is configured to transmit non-P2X related V2X sidelink communication is(are) included in v2x-InterFreqInfoList within SystemInformationBlockTypey broadcast by the cell on which the UE camps; and if the valid version of SystemInformationBlockTypey do(es) not include v2x-CommTxPoolNormal for the concerned frequency)

Alternatively, in operation 2g-20, the UE 2g-01 in the RRC inactive mode may perform the RRC connection resume procedure with the gNB/eNB when configured to transmit P2X related V2X sidelink communication and related data at the specific frequency (frequencies) by at least one of the three cases above in operation 2g-15, and when the SIBy received in operation 2g-10 includes the specific frequency but does not include the V2X sidelink communication transmission resource pool associated with the specific frequency (the concerned frequency is included in SIBx without Tx Pool). For example, the UE 2g-01 may determine that the V2X sidelink communication transmission resource pool is not included in the system information in a following case.

When a frequency configured by the upper layers for performing the V2X sidelink communication in operation 2g-15 is a frequency (camped frequency) camped-on by the UE 2g-01, the UE 2g-01 broadcasts the SIBx by a cell camped-on by the UE 2g-01, and the SIBy of a valid version includes sl-V2X-ConfigCommon but the sl-V2X-ConfigCommon does not include the Tx pool (if the frequency on which the UE is configured to transmit P2X related V2X sidelink communication concerns the camped frequency; and if SystemInformationBlockTypey is(are) broadcast by the cell on which the UE camps; and if the valid version of SystemInformationBlockTypey include(s) sl-V2X-ConfigCommon; and sl-V2X-ConfigCommon do(es) not include p2x-CommTxPoolNormalCommon)

Alternatively, when the frequency configured by the upper layers for performing the V2X sidelink communication in operation 2g-15 is included in the v2x-InterFreqInfoList signaled from the SIBy broadcasted by the cell camped-on by the UE 2g-01, and the SIBy of the valid version does not include the Tx pool (for example, p2x-CommTxPoolNormal) (if the frequency(ies) on which the UE is(are) configured to transmit non-P2X related V2X sidelink communication is(are) included in v2x-InterFreqInfoList within SystemInformationBlockTypey broadcast by the cell on which the UE camps; and if the valid version of SystemInformationBlockTypey do(es) not include p2x-CommTxPoolNormal for the concerned frequency)

In operation 2g-25, when it is determined that the system information does not include the V2X sidelink communication transmission resource pool in operation 2g-20, the UE 2g-01 in the RRC inactive mode may perform the RRC connection resume procedure with the gNB/eNB 2g-02 that is to resume the RRC connection. An embodiment of the disclosure proposes the UE 2g-01 performing the RRC connection resume procedure for transiting to the RRC connected mode. Operations of the UE 2g-01 proposed when the UE performs a random access procedure with the gNB/eNB and transmits an RRC message to the gNB/eNB are as follows (operation 2g-25).

1. When the useFullResumeID field is signaled from the system information (SIB1), the UE 2g-01 may select a message to be transmitted to the gNB/eNB 2g-02 to be RRCResumeRequest1. The UE 2g-01 may prepare transmission by adding resumeIdentity to the RRCResumeRequest1 message, as the full-RNTI value. When the useFullResumeID field is not signaled from the system information (SIB1), the UE 2g-01 may select the message to be transmitted to the gNB/eNB 2g-02 to be RRCResumeRequest. The UE 2g-01 may prepare the transmission by adding shortResumeIdentity to the RRCResumeRequest message, as the shortI-RNTI value.

2. The UE may select one of {emergency, highPriorityAccess, mt-Access, mo-Signalling, mo-Data, mo-VoiceCall, mo-VideoCall, mo-SMS, ma-Update, mps-PriorityAccess, mcs-PriorityAccess, spare1, spare2, spare3, spare4, spare5}, as a cause (resumeCause) for resuming a connection. When the resumeCause is configured to 'rna-Update', the UE 2g-01 may maintain the RRC inactive mode by receiving the RRC connection release message including the suspended configuration information from the gNB/eNB 2g-02. Thus, it is proposed that the UE 2g-01 configures the resumeCause to a value other than 'ma-Update'. When the resumeCause is configured to 'rna-Update', the UE 2g-01 is unable to transit to an RRC connected mode, and thus unable to request the gNB/eNB 2g-02 for the Tx pool or receive the Tx pool from the gNB/eNB 2g-02. When the resumeCause is configured to 'rna-Update', the UE needs to initiate the RRC connection resume procedure again to request the gNB/eNB for Tx pool, after the RNAU procedure is ended. This may increase signaling overhead between the UE and the gNB/eNB and cause latency, and thus it may be difficult to smoothly perform the V2X sidelink communication that require low latency communication. Accordingly, the UE 2g-01 may configure the resumeCause to be configured with another value to be configured with the V2X sidelink communication transmission resource pool from the gNB/eNB 2g-02. For example, the UE 2g-01 may configure the resumeCause to 'mo-Signalling'. When the system information does not include the V2X sidelink communication transmission resource pool and thus the Tx pool needs to be received from the gNB/eNB 2g-02 (for example, via an RRC connection with the gNB/eNB 2g-02), the UE 2g-01 may transit to the RRC connected mode instead of maintaining the RRC inactive mode, by configuring mo-Signalling in an RRC resume request message as resumeCause, even when the RNAU procedure is triggered.

ResumeCause
The IE ResumeCause is used to indicate the resume cause in RRCResumeRequest and RRCResumeRequest1.
ResumeCause Information Element

```
-- ASN1START
-- TAG-RESUME-CAUSE-START
ResumeCause ::=        ENUMERATED {emergency, highPriorityAccess, mt-Access,
mo-Signalling,
                   mo-Data, mo-VoiceCall, mo-VideoCall, mo-
SMS, rna-Update, mps-PriorityAccess, mcs-PriorityAccess,
spare1, spare2, spare3, spare4, spare5 }
-- TAG-RESUME-CAUSE-STOP
-- ASN1STOP
```

3. The UE 2g-01 may reconstruct RRC configuration information and security context information from UE inactive AS context that was stored excluding cell group configuration information (cellGroupConfig).

4. The UE 2g-01 may calculate MAC-I and prepare for transmission by adding last 16 bits to a resumeMAC-I field of the RRCResumeRequest1 message or RRCResumeRequest message that is a selected message.

5. The UE 2g-01 may update a new KgNB security key based on a current kgNB security key, a NextHop (NH) value, and a stored NCC value.

6. Also, the UE 2g-01 derives, by using the newly updated KgNB security key, new security keys (K_RRCenc, K_RRC_int, K_UPint, K_UPenc) to be used for an integrity protection and verification procedure and an encoding and decoding procedure.

7. Also, the UE 2g-01 resumes the integrity protection and verification procedure by applying, on all bearers excluding SRB0, updated security keys and a pre-configured algorithm, and applies integrity verification and protection on pieces of data transmitted and received thereafter. This is to increase the reliability and security of the pieces of data transmitted and received from the SRB1 or DRBs thereafter.

8. Also, the UE 2g-01 resumes the encoding and decoding procedure by applying, on all bearers excluding SRB0, the updated security keys and the pre-configured algorithm, and applies encoding and decoding on the pieces of data transmitted and received thereafter. This is to increase the reliability and security of the pieces of data transmitted and received from the SRB1 or DRBs thereafter.

9. The UE 2g-01 may reconstruct a PDCP state and re-establish PDCP entities for the SRB1.

10. The UE 2g-01 resumes the SRB1. This is because the RRCResume message is to be received via the SRB1, as a response to the RRCResumeRequest message or RRCResumeRequest1 message to be transmitted.

11. The UE 2g-01 configures a message selected for transmission to the gNB/eNB 2g-02, i.e., the RRCResumeRequest message or RRCResumeRequest1 message, and transmits the same to lower layers.

12. The UE 2g-01 transmits the RRCResumeRequest message or RRCResumeRequest1 message to the gNB/eNB and operates a T319 timer.

Operations of the UE 2g-01 proposed when the UE 2g-01 in the RRC inactive mode receives the RRC connection resume message (RRCResume message) in operation 2g-30 are as follows.

The UE 2g-01 stops the T319 timer being operated when the RRCResumeRequest message or RRCResumeRequest1 message is transmitted to the gNB/eNB 2g-02.

When the RRCResume message includes a full configuration information (fullConfig), the UE 2g-01 performs a full configuration procedure. When the RRCResume message does not include the fullConfig, the UE 2g-01 reconstructs the PDCP state upon receiving the RRCResume message and resets a count value for the SRB2 and all DRBs. Also, the UE 2g-01 reconstructs cell group configuration information (cellGroupConfig) from stored UE context. Also, the UE 2g-01 instructs details related to the above-described operations to lower layers.

The UE 2g-01 releases a full UE connection resume identity (Full-RNTI), a divided UE connection resume identity (ShortI-RNTI), and the stored UE context. Here, RNA information (ran-NotificatioAreaInfo) is not released.

When the RRCResume message includes master cell group (masterCellGroup) configuration information, the UE 2g-01 may perform a cell group configuration procedure according to the master cell group configuration information.

When the RRCResume message includes bearer configuration information (radioBearerConfig), the UE 2g-01 may configure a bearer according to the bearer configuration information.

The UE 2g-01 resumes the SRB2 and all DRBs.

The UE 2g-01 discards stored cell reselection priority information when there is one. The cell reselection priority information may be information stored based on CellReselectionPriorities that may be included in an RRCRelease message, or cell reselection priority information received from another RAT.

The UE 2g-01 may stop a T320 timer when the T320 timer is being operated.

When the RRCResume message includes frequency measurement configuration information (measConfig), the UE 2g-01 may perform frequency measurement according to the frequency measurement configuration information.

When the RRC connection is suspended, the UE 2g-01 may resume the frequency measurement.

When the RRCResume message includes the V2X sidelink configuration information (for example, sl-V2X-ConfigDedicated), the UE 2g-01 may apply the V2X sidelink configuration information.

The UE 2g-01 transits to the RRC connected mode (operation 2g-31).

The UE 2g-01 indicates the upper layers that the suspended RRC connection is resumed.

The UE 2g-01 may stop the cell reselection procedure.

The UE 2g-01 considers a currently accessed cell to be a primary cell (PCell).

Also, the UE 2g-01 configures an RRC connection resume complete (RRCResumeComplete) message as below for transmission to lower layers, and transmits the same to the gNB/eNB 2g-02 (operation 2g-35).

A. When upper layers provided NAS PDU, the NAS PDU may be included in dedicatedNAS-Message.

B. When the upper layers or NAS layer provided a PLMN, a PLMN selected by the upper layers or NAS layer from plmn-IdentityList included in the SIB1 may be configured as selectedPLMN-Identity.

Figure 2H:
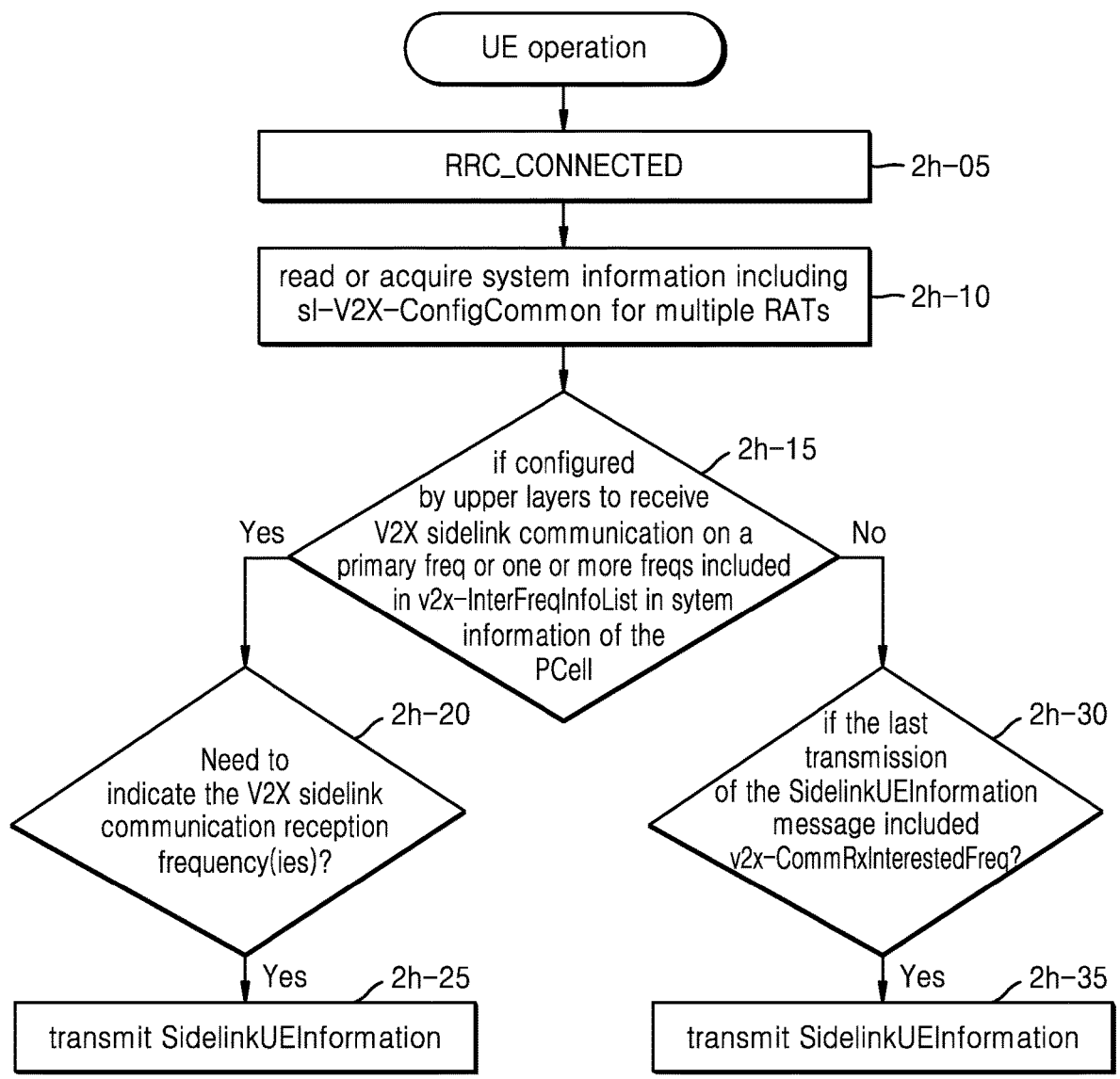
FIG. 2H is a diagram for describing operations of a UE in an RRC connected mode transmitting a SidelinkUEInformation message to a base station, according to an embodiment of the disclosure.

FIG. 2H is a diagram for describing operations of a UE in an RRC connected mode transmitting a SidelinkUEInformation message to a base station, according to an embodiment of the disclosure.

The UE in the RRC connected mode, according to an embodiment of the disclosure, may transmit, to the base station, the SidelinkUEInformation message when V2X sidelink communication is to be received or V2X sidelink communication is to be no longer received (The purpose of transmitting SidelinkUEInformation is to inform E-UTRAN or NR that the UE in RRC_CONNECTED is interested or no longer interested to receive V2X sidelink communication).

Referring to FIG. 2H, in operation 2h-05, the UE supporting vehicle communication may be in the RRC connected mode (RRC_CONNECTED) by establishing an RRC connection with an NR base station.

In operation 2h-10, the UE may verify whether system information broadcasted from a PCell (or a base station of the PCell) is valid, when the system information (for example, system information including LTE V2X sidelink communication configuration information and NR V2X sidelink communication configuration information) includes sl-V2X-ConfigCommon. Alternatively, in operation 2h-10, the UE may verify whether the system information broadcasted by the PCell is valid.

In operation 2h-15, the UE may determine whether a primary frequency or one or more frequencies configured to receive the V2X sidelink communication from an upper layer (for example, V2X layer) in the UE are included in v2x-InterFreqInfoList included in the system information.

When the primary frequency or one or more frequencies configured to receive the V2X sidelink communication from the upper layer are included in v2x-InterFreqInfoList included in the system information, the UE may determine whether one or more frequencies of interest need to be indicted to the base station for reception of the V2X sidelink communication, in operation 2h-20. For example, when the SidelinkUEInformation message previously transmitted to the base station does not include a frequency list for receiving the V2X sidelink communication, the UE may determine whether the one or more frequencies of interest need to be indicted to the base station for reception of the V2X sidelink communication (for example, determine to indicate).

In operation 2h-25, the UE may transmit the SidelinkUEInformation message to the base station. Here, it is proposed that the UE according to an embodiment of the disclosure transmits the SidelinkUEInformation message to the base station together with an information element (IE) or indicator indicating to which RAT the one or more frequencies of interest are applied. For example, The UE may add a value of '0' to v2x-CommRxInterestedFreqList. The value of '0' in v2x-CommRxInterestedFreqList may denote a frequency of the PCell. Here, the frequency of PCell may be used as a frequency for the LTE V2X sidelink communication, as a frequency for the NR V2X sidelink communication, or as a common frequency for the LTE V2X sidelink communication and NR V2X sidelink communication. Accordingly, the UE may add, to the SidelinkUEInformation message, an indicator indicating whether the frequency of the PCell is a frequency for receiving the LTE V2X sidelink communication, a frequency for receiving the NR V2X sidelink communication, or a frequency for receiving the LTE V2X sidelink communication and NR V2X sidelink communication. For example, 2 bits for distinguishing whether the frequency of PCell is for LTE, for NR, or for both LTE and NR may be used.

The UE may add a value of 'k (k>=1)' to v2x-CommRxInterestedFreqList. The value of 'k (k>=1)' in v2x-CommRxInterestedFreqList may denote a peripheral frequency that is not the PCell. Here, the value of k may denote a peripheral frequency included in kth among v2x-InterFreqInfoList included in the system information. Here, the peripheral frequency may be used as a frequency for the LTE V2X sidelink communication, as a frequency for the NR V2X sidelink communication, or as a common frequency for the LTE V2X sidelink communication and NR V2X sidelink communication. Accordingly, the UE may add, to the SidelinkUEInformation message, an indicator indicating whether the peripheral frequency is a frequency for receiving the LTE V2X sidelink communication, a frequency for receiving the NR V2X sidelink communication, or a frequency for receiving the LTE V2X sidelink communication and NR V2X sidelink communication.

When the primary frequency or one or more frequencies configured to receive the V2X sidelink communication from the upper layer is not included in v2x-InterFreqInfoList included in the system information, the UE may determine whether the UE has added v2x-CommRxInterestedFreqList to the SidelinkUEInformation message transmitted last or most recently, in operation 2h-30. When v2x-CommRxInterestedFreqList is included in the SidelinkUEInformation message transmitted last or most recently, the UE may transmit the SidelinkUEInformation message to the base station without adding information about one or more frequencies that are no longer interested in receiving the V2X sidelink communication to v2x-CommRxInterestedFreqList, in operation 2h-35. The UE may transmit, to the base station, the SidelinkUEInformation message according to the method described above in the disclosure. For example, the UE may transmit the SidelinkUEInformation to the base station according to the method described in operation 2h-25.

Figure 2I:
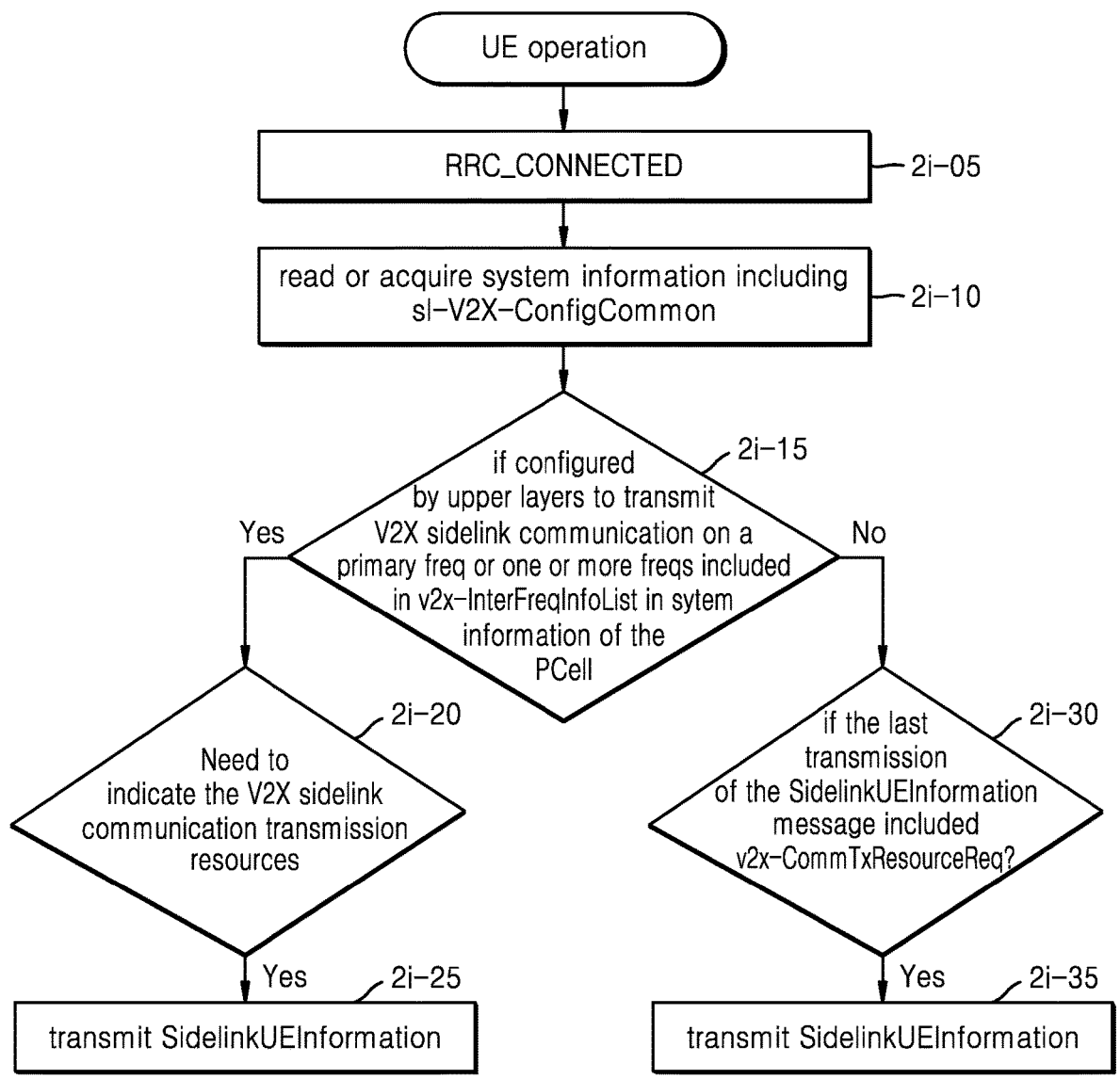
FIG. 2I is a diagram for describing operations of a UE in an RRC connected mode transmitting a SidelinkUEInformation message to a base station, according to an embodiment of the disclosure.

FIG. 2I is a diagram for describing operations of a UE in an RRC connected mode transmitting a SidelinkUEInformation message to a base station, according to an embodiment of the disclosure.

The UE in the RRC connected mode may transmit the SidelinkUEInformation message to the base station so as to request the base station for a transmission resource for V2X sidelink communication or to release the transmission resource (The purpose of transmitting SidelinkUEInformation is to inform E-UTRAN or NR that the UE in RRC_CONNECTED is to request assignment or release of transmission resources for V2X sidelink communication). The UE may declare or trigger sidelink radio link failure (RLF) to transmit the SidelinkUEInformation message to the base station, or may transmit the SidelinkUEInformation to the base station regardless of the sidelink RLF. An embodiment of the disclosure proposes a method of dividing operations of the UE depending on occurrence of the sidelink RLF.

Referring to FIG. 2I, in operation 2*i*-05, the UE supporting vehicle communication may be in the RRC connected mode (RRC_CONNECTED) by establishing an RRC connection with the base station.

In operation 2*i*-10, the UE may verify whether system information broadcasted from a PCell (or a base station of PCell) is valid, when the system information (for example, SIBx including V2X sidelink communication configuration information) includes sl-V2X-ConfigCommon. Alternatively, in operation 2*i*-10, the UE may verify whether the system information (for example, one or more SIBx including V2X sidelink communication configuration information) broadcasted by the PCell is valid.

In operation 2*i*-15, the UE may determine whether a primary frequency or one or more frequencies configured to transmit the V2X sidelink communication from an upper layer (for example, V2X layer) in the UE are included in v2x-InterFreqInfoList included in the system information.

When the primary frequency or one or more frequencies configured to transmit the V2X sidelink communication from the upper layer are included in v2x-InterFreqInfoList included in the system information, the UE may determine whether it is required to indicate, to the base station, a V2X sidelink communication transmission resource required by the UE for transmission of the V2X sidelink communication, in operation 2*i*-20. For example, when the SidelinkUEInformation message previously transmitted to the base station does not include a frequency list for receiving the V2X sidelink communication, the UE may determine whether the one or more frequencies of interest need to be indicted to the base station for reception of the V2X sidelink communication (for example, determine to indicate).

In operation 2*i*-25, the UE according to an embodiment of the disclosure may transmit, to the base station, the SidelinkUEInformation message regardless of occurrence of sidelink RLF. Here, the UE may transmit the SidelinkUEInformation message to the base station via a series of following processes.

When the upper layer configured to transmit P2X-related V2X sidelink communication, the UE may configure p2x-CommTxType to TRUE and add the same to the SidelinkUEInformation message.

The UE may add v2x-CommTxResourceReq to the SidelinkUEInformation message. Fields of v2x-CommTxResourceReq may be configured as a following method, for each frequency configured by the UE to transmit the V2X sidelink communication from the upper layer.

The UE may indicate a frequency for transmission of V2X sidelink communication via carrierFreqCommTx (set carrierFreqCommTx to indicate the frequency for V2X sidelink communication transmission). In detail, carrierFreqCommTx may be configured as follows.

A value of '0' may denote a frequency of PCell.

A value of 'k (k>=1)' may denote a frequency in a first entry of v2x-InterFreqInfoList included in SIBx.

The UE may set, in v2x-TypeTxSync, a current synchronization reference type associated with carrierFreqCommTx for transmission of the V2X sidelink communication (set v2x-TypeTxSync to the current synchronization reference type used on the associated carrierFreqCommTx for V2X sidelink communication transmission).

The UE may include V2X sidelink communication transmission destination information so as to be allocated with a dedicated resource from the base station. For example, the destination information may include a destination layer 2 ID or a transmission type (unicast, groupcast, or broadcast) used in the destination layer 2 ID.

The UE may add, to the SidelinkUEInformation message, an information element or indicator indicating whether a frequency indicated in carrierFreqCommTx is a frequency for receiving LTE V2X sidelink communication, a frequency for receiving NR V2X sidelink communication, or a frequency for receiving LTE V2X sidelink communication and also a frequency for receiving NR V2X sidelink communication (Here, the UE may not add the indicator when it is determined that the indicator is not essential). For example, 2 bits for distinguishing whether the frequency indicated in carrierFreqCommTx is for LTE, for NR, or for both LTE and NR may be used.

Alternatively, in operation 2*i*-25, the UE according to an embodiment of the disclosure may transmit the SidelinkUEInformation message to the base station, according to a method described below, when the sidelink RLF is declared/detected. Here, the UE may add destination identity and/or sl-Failure to the SidelinkUEInformation message, according to a method below.

When the V2X sidelink communication is configured to be transmitted by the upper layer, the SidelinkUEInformation message may include the destination identity configured by the upper layer for the transmission of V2X sidelink communication.

The SidelinkUEInformation message may include sl-Failure for a destination where SL-RLF is declare/detected for the transmission of V2X sidelink communication (set sl-Failure for the associated destination for the V2X sidelink communication transfer, if the sidelink RLF is detected).

An embodiment of the disclosure proposes to transmit the SidelinkUEInformation message to the base station without performing at least one of following procedures. Because the UE releases a sidelink radio bearer (SLRB) dedicatedly configured by the base station for the destination identity of which the SL-RLF is declared/detected, the UE may be able to reduce signaling overhead when the UE does not perform at least one of the following procedures with the base station. Also, the base station may store below information mapped to each destination identity. Accordingly, when SL-RLF is declared/detected and the UE transmits the below information to the base station, the base station may receive information that is already stored from the UE, thereby decoding redundant/unnecessary information. According to an embodiment of the disclosure, by not performing at least one of the following procedures, i.e., by reducing an amount of information transmitted by the UE to the base station when SL-RLF is declared/detected, the base station may not decode redundant/unnecessary information. The 'following procedures' denote first through third procedures below related to the UE adding certain information to the SidelinkUEInformation message.

(First procedure) The UE may set/add a cast type to sl-CastType for the destination identity of which SL-RLF is declared/detected (set sl-CastType to the cast type of the associated destination identity configured by the upper layer for V2X sidelink communication transmission).

(Second procedure) The UE may set/add an RLC mode to sl-RLC-ModeIndication for the destination identity of which SL-RLF is declared/detected, and when a certain condition is satisfied, set/add a QoS profile of sidelink QoS flow for the RLC mode. The certain condition may denote a case where the base station adds a bidirectional sidelink DRB to RRCReconfigurationSidelink transmitted to the UE (set sl-RLC-ModeIndication to include the RLC mode(s) and optionally QoS profile(s) of the sidelink QoS flow(s) of the associated RLC mode(s), if the associated bi-directional sidelink DRB addition is due to the configuration by RRCReconfigurationSidelink).

(Third procedure) The UE may set/add QoS profile(s) of sidelink QoS flow(s) for the destination of which SL-RLF is declared/detected, to sl-QoS-InfoList ((set sl-QoS-InfoList to include QoS profile(s) of the sidelink QoS flow(s) of the associated destination configured by the upper layer for the NR sidelink communication transmission).

According to an embodiment of the disclosure, the UE may transmit the SidelinkUEInformation message to the base station by omitting (i.e., not performing) the first through third procedures. Alternatively, the UE may transmit the SidelinkUEInformation message to the base station by omitting only the first and second procedures, omitting only the first and third procedures, or omitting the third and first procedures. Alternatively, the UE may transmit the SidelinkUEInformation message to the base station by omitting only the first procedure, omitting only the second procedure, or omitting only the third procedure. Signaling overhead of the SidelinkUEInformation message transmitted by the UE and a decoding burden at the base station may vary depending on which procedure the UE omits and how may procedures the UE omits. Thus, for example, the UE may determine a range or value of signaling load of the SidelinkUEInformation message processible by the UE in consideration of an available resource status or the like, and determine which one of the first through third procedures is to be omitted according to the determined range or value.

According to an embodiment of the disclosure, the UE may set/add information about a frequency for transmission of the V2X sidelink communication to sl-InterestedFreqList. Here, the UE may only include a frequency of interest for the actual transmission of V2X sidelink communication. In other words, when there is no other transmission of V2X sidelink communication regarding the frequency for the destination of which SL-RLF is declared/detected, the UE may not add the frequency for the destination of which SL-RLF is declared/detected to sl-InterestedFreqList. Also, the UE may add sl-TpyeSyncList to the SidelinkUEInformation message with respect to a synchronization reference type used in association with s-InterestedFreqList.

Also, in operation 2i-25, the UE may transmit the SidelinkUEInformation message to the base station, even when sidelink RLF is not declared/detected. Here, the UE may transmit the SidelinkUEInformation message to the base station via a series of following processes. The UE performs the series of following processes unlike a case where SL-RLF is declared/detected, so as to add or change information required for each destination identity. The UE may add following information to the SidelinkUEInformation message.

When the V2X sidelink communication is configured to be transmitted from the upper layer, a destination identity configured by the upper layer for transmission of V2X sidelink communication may be included.

A cast type may be set/added to sl-CastType for the destination identity (set sl-CastType to the cast type of the associated destination identity configured by the upper layer for V2X sidelink communication transmission)

An RLC mode is set/added to sl-RLC-ModeIndication for the destination identity, and when a certain condition is satisfied, a QoS profile of sidelink QoS flow may be set/added for the RLC mode. The certain condition may denote a case where the base station adds a bidirectional sidelink DRB to RRCReconfigurationSidelink transmitted to the UE (set sl-RLC-ModeIndication to include the RLC mode(s) and optionally QoS profile(s) of the sidelink QoS flow(s) of the associated RLC mode(s), if the associated bi-directional sidelink DRB addition is due to the configuration by RRCReconfigurationSidelink).

QoS profile(s) of sidelink QoS flow(s) for the destination may be set/added to sl-QoS-InfoList ((set sl-QoS-InfoList to include QoS profile(s) of the sidelink QoS flow(s) of the associated destination configured by the upper layer for the NR sidelink communication transmission).

sl-InterestedFreqList may be set/added for a frequency for the transmission of V2X sidelink communication. Here, the UE may only include a frequency of interest for the actual transmission of V2X sidelink communication.

sl-TpyeSyncList may be added for a synchronization reference type used in association with s-InterestedFreqList.

When the primary frequency or one or more frequencies configured to transmit the V2X sidelink communication from the upper layer is not included in v2x-InterFreqInfoList included in the system information, the UE may determine whether the UE has added v2x-CommTxResourceReq to the SidelinkUEInformation message transmitted last or most recently, in operation 2i-30. When v2x-CommTxResourceReq is included in the SidelinkUEInformation message transmitted last or most recently, the UE may transmit the SidelinkUEInformation message to the base station without adding information about one or more frequencies that are no longer interested in transmitting the V2X sidelink communication to v2x-CommTxResourceReq, in operation 2i-35. The UE may transmit, to the base station, the SidelinkUEInformation message according to the method described above in the disclosure. For example, the UE may transmit the SidelinkUEInformation to the base station according to the method described in operation 2i-25.

FIG. 2j is a flowchart for describing operations of a UE supporting vehicle communication, according to an embodiment of the disclosure.

In operation 2j-05, the UE may receive system information from a base station, while in an RRC connected state.

In operation 2j-10, the UE may determine whether an adjacent frequency resource information list (v2x-InterFreqInfoList) included in the system information includes a frequency configured for V2X sidelink communication by an upper layer in the UE.

Also, according to an embodiment of the disclosure, the UE may identify whether sidelink RLF has occurred regarding a destination configured for the V2X sidelink communication.

In operation 2j-15, the UE may transmit, to the base station, sidelink UE information (SidelinkUEInformation) including information about the frequency configured for the V2X sidelink communication, based on a result of the determining.

Also, according to an embodiment of the disclosure, the UE may transmit, to the base station, the sidelink UE information based on a result of identifying whether the RLF has occurred.

Also, according to an embodiment of the disclosure, when it is identified that the RLF has occurred, the sidelink UE information may not include at least one piece of information from among cast type information regarding the destination, RLC mode information regarding the destination, or QoS profile information regarding the destination.

Also, according to an embodiment of the disclosure, the sidelink UE information may include an indicator indicating which RAT the frequency configured for the V2X sidelink communication is for.

According to an embodiment of the disclosure, when the adjacent frequency resource information list includes the frequency configured for the V2X sidelink communication by the upper layer in the UE and another sidelink UE information transmitted last to the base station before transmitting the sidelink UE information does not include the frequency configured for the V2X sidelink communication, the UE transmits the sidelink UE information to the base station by adding the information about the frequency configured for the V2X sidelink communication to the sidelink UE information, and when the adjacent frequency resource information list includes the frequency configured for the V2X sidelink communication by the upper layer in the UE and the other sidelink UE information transmitted last does not include information about a V2X common resource, the UE may transmit the sidelink UE information to the base station without adding information about a frequency other than the frequency configured for the V2X sidelink communication to the sidelink UE information.

Figure 2K:
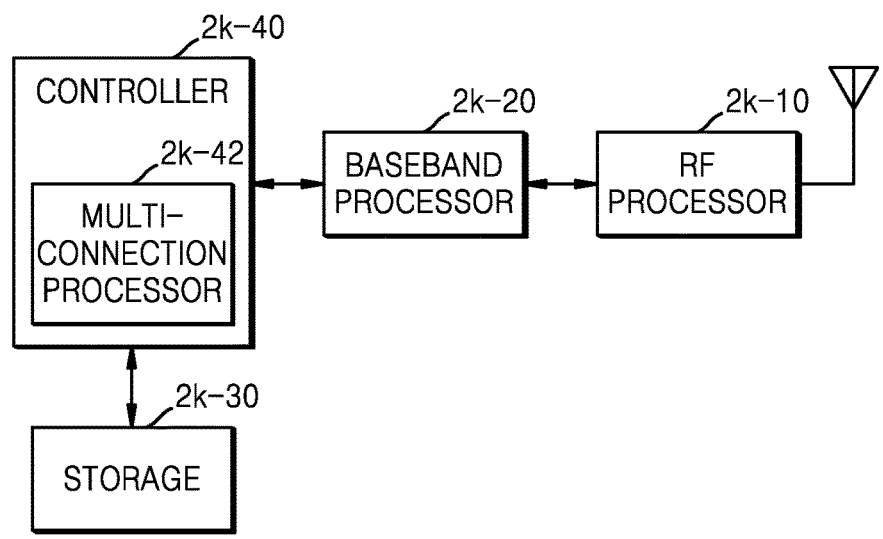
FIG. 2K is a block diagram showing a structure of a terminal, according to an embodiment of the disclosure.

FIG. 2K is a block diagram showing a structure of a terminal, according to an embodiment of the disclosure.

Referring to FIG. 2K, the terminal includes an RF processor 2k-10, a baseband processor 2k-20, a storage 2k-30, and a controller 2k-40. However, the internal structure of the terminal is not limited thereto and may include more or fewer components than those shown in FIG. 2K.

According to an embodiment of the disclosure, the RF processor 2k-10 may perform functions for transmitting and receiving a signal via a radio channel, such as a band conversion, amplification, and the like of the signal. That is, the RF processor 2k-10 may up-convert a baseband signal provided from the baseband processor 2k-20, to an RF band signal and transmit the RF band signal through an antenna, and down-convert an RF band signal received through an antenna, to a baseband signal. For example, the RF processor 2k-10 may include a transmit filter, a receive filter, an amplifier, a mixer, an oscillator, a digital-to-analog converter (DAC), and an analog-to-digital converter (ADC). Although only a single antenna is illustrated in FIG. 2K, the terminal may include a plurality of antennas.

The RF processor 2k-10 may include a plurality of RF chains. In addition, the RF processor 2k-10 may perform beamforming. For beamforming, the RF processor 2k-10 may adjust phases and amplitudes of signals transmitted or received through the plurality of antennas or antenna elements. Also, the RF processor 2k-10 may perform multiple input multiple output (MIMO) and may receive several layers during the MIMO operation. The RF processor 2k-10 may perform received beam sweeping by appropriately configuring the plurality of antennas or antenna elements, or adjust a direction and beam width of a received beam to coordinate with a transmit beam, under control by the controller 2k-40.

The baseband processor 2k-20 may perform a conversion function between a baseband signal and a bitstream, according to physical layer specifications of a system. For example, for data transmission, the baseband processor 2k-20 may generate complex symbols by encoding and modulating a transmit bitstream. Also, for data reception, the baseband processor 2k-20 may reconstruct a received bitstream by demodulating and decoding a baseband signal provided from the RF processor 2k-10. For example, according to an orthogonal frequency division multiplexing (OFDM) scheme, for data transmission, the baseband processor 2k-20 may generate complex symbols by encoding and modulating a transmit bitstream, map the complex symbols to subcarriers, and then configure OFDM symbols via inverse fast Fourier transform (IFFT) operation and cyclic prefix (CP) insertion. Also, for data reception, the baseband processor 2k-20 may split a baseband signal provided from the RF processor 2k-10, into OFDM symbol units, reconstruct signals mapped to subcarriers via a fast Fourier transform (FFT) operation, and then reconstruct a received bitstream via demodulation and decoding.

The baseband processor 2k-20 and the RF processor 2k-10 may transmit and receive signals as described above. In this regard, each of the baseband processor 2k-20 and the RF processor 2k-10 may also be called a transmitter, a receiver, a transceiver, or a communicator. In addition, at least one of the baseband processor 2k-20 or the RF processor 2k-10 may include a plurality of communication modules to support a plurality of different RATs. Also, at least one of the baseband processor 2k-20 or the RF processor 2k-10 may include different communication modules to process signals of different frequency bands. For example, the different RATs may include an LTE network, NR network, etc. The different frequency bands may include a super high frequency (SHF) (e.g., 2.2 GHz or 2 GHz) band and a mmWave (e.g., 60 GHz) band. The terminal may transmit or receive a signal to or from a base station by using the baseband processor 2k-20 and the RF processor 2k-10, and the signal may include control information and data.

The storage 2k-30 may store data for operations of the terminal, e.g., basic programs, application programs, and configuration information. The storage 2k-30 may provide the stored data upon a request by the controller 2k-40. The storage 2k-30 may be configured in a storage medium, such as read-only memory (ROM), random-access memory (RAM), a hard disk, CD-ROM, or DVD, or a combination thereof. Also, the storage 2k-30 may be configured in a plurality of memories.

The controller 2k-40 may control overall operations of the terminal. For example, the controller 2k-40 may transmit and receive signals through the baseband processor 2k-20 and the RF processor 2k-10. The controller 2k-40 may record and read data on and from the storage 2k-30. In this regard, the controller 2k-40 may include at least one processor. For example, the controller 2k-40 may include a communication processor (CP) performing control for communication, and an application processor (AP) controlling an upper layer, such as an application program. Also, the controller 2k-40 may control the terminal to perform a method of transmitting the sidelink UE information (SidelinkUEInformation) described above. Also, at least one component in the terminal may be embodied in one chip.

Figure 2L:
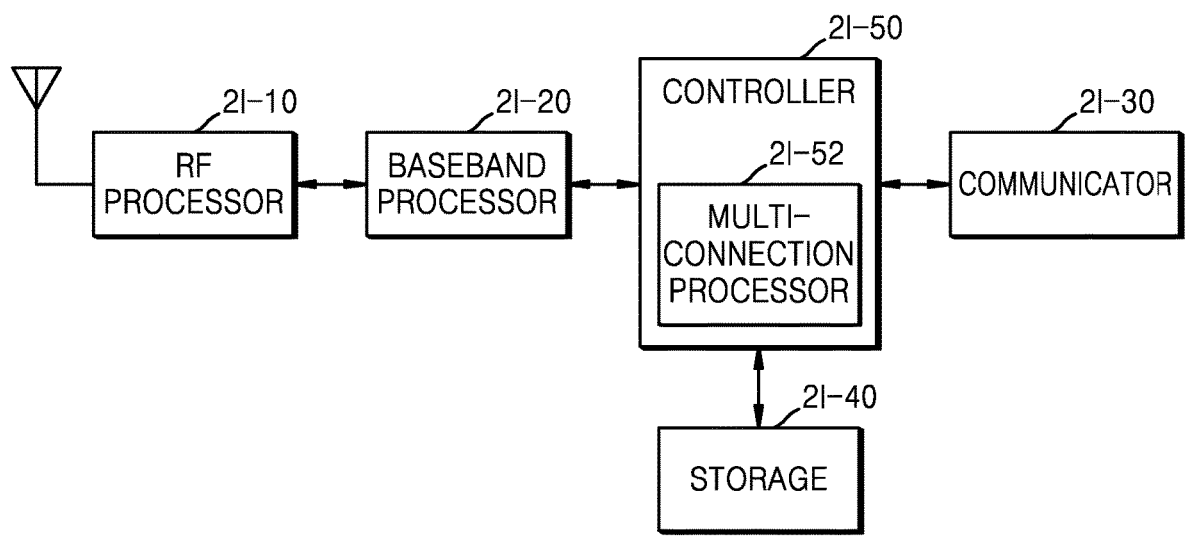
FIG. 2L is a block diagram showing a structure of a base station, according to an embodiment of the disclosure.

FIG. 2L is a block diagram showing a structure of a base station, according to an embodiment of the disclosure.

The base station according to an embodiment of the disclosure may include at least one transmission reception point (TRP). Referring to FIG. 2L, the base station may include an RF processor 2*l*-10, a baseband processor 2*l*-20, a communicator 2*l*-30, a storage 2*l*-40, and a controller 2*l*-50. However, the configuration of the base station is not limited thereto and may include more or fewer components than those shown in FIG. 2L.

The RF processor 2*l*-10 may perform functions for transmitting and receiving signals through radio channels, e.g., signal band conversion and amplification. That is, the RF processor 2*l*-10 may up-convert a baseband signal provided from the baseband processor 2*l*-20, to an RF band signal and transmit the RF band signal through an antenna, and down-convert an RF band signal received through an antenna, to a baseband signal. For example, the RF processor 2*l*-10 may include a transmit filter, a receive filter, an amplifier, a mixer, an oscillator, a DAC, and an ADC. Although only a single antenna is illustrated in FIG. 2L, the base station may include a plurality of antennas. The RF processor 2*l*-10 may include a plurality of RF chains. In addition, the RF processor 2*l*-10 may perform beamforming. For the beamforming, the RF processor 2*l*-10 may adjust phases and amplitudes of signals transmitted or received through the plurality of antennas or antenna elements. The RF processor 2*l*-10 may perform a DL MIMO operation by transmitting at least one layer.

The baseband processor 2*l*-20 may perform a conversion function between a baseband signal and a bitstream, according to physical layer specifications of an RAT. For example, for data transmission, the baseband processor 2*l*-20 may generate complex symbols by encoding and modulating a transmit bitstream. Also, for data reception, the baseband processor 2*l*-20 may reconstruct a received bitstream by demodulating and decoding a baseband signal provided from the RF processor 2*l*-10. For example, according to an OFDM scheme, for data transmission, the baseband processor 2*l*-20 may generate complex symbols by encoding and modulating a transmit bitstream, map the complex symbols to subcarriers, and then configure OFDM symbols via IFFT operation and CP insertion. Also, for data reception, the baseband processor 2*l*-20 may split a baseband signal provided from the RF processor 2*l*-10, into OFDM symbol units, reconstruct signals mapped to subcarriers via FFT operation, and then reconstruct a received bitstream via demodulation and decoding. The baseband processor 2*l*-20 and the RF processor 2*l*-10 may transmit and receive signals as described above. In this regard, each of the baseband processor 2*l*-20 and the RF processor 2*l*-10 may also be called a transmitter, a receiver, a transceiver, or a wireless communicator. The base station may transmit or receive a signal to or from a terminal by using the baseband processor 2*l*-20 and the RF processor 2*l*-10, and the signal may include control information and data.

The communicator 2*l*-30 may provide an interface for communicating with other nodes in a network. The communicator 2*l*-30 may be a backhaul communicator. The communicator 2*l*-30 may convert a bitstream transmitted from a main base station to another node, for example, an auxiliary base station or a core network, into a physical signal, and convert a physical signal received from another node into a bitstream.

The storage 2*l*-40 may store data for operations of the base station, e.g., basic programs, application programs, and configuration information. In particular, the storage 2*l*-40 may store information about bearers allocated for a connected terminal, a measurement report transmitted from the connected terminal, etc. Also, the storage 2*l*-40 may store criteria information used to determine whether to provide or release multi-connection to or from the terminal. Also, the storage 2*l*-40 may provide the stored data upon a request by the controller 2*l*-50. The storage 2*l*-40 may be configured in a storage medium, such as ROM, RAM, a hard disk, CD-ROM, or DVD, or a combination thereof. Also, the storage 2*l*-40 may be configured in a plurality of memories.

The controller 2*l*-50 may control overall operations of the main base station. For example, the controller 2*l*-50 may transmit and receive signals through the baseband processor 2*l*-20 and the RF processor 2*l*-10 or through the communicator 2*l*-30. Also, the controller 2*l*-50 may record and read data on and from the storage 2*l*-40. In this regard, the controller 2*l*-50 may include at least one processor. Also, the controller 2*l*-50 may control the base station to perform a method of transmitting the sidelink UE information (SidelinkUEInformation) described above. Also, at least one component in the base station may be embodied in one chip.

The methods according to the embodiments described in the claims or the detailed description of the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory including a combination of some or all of the above-mentioned memories. In addition, each memory may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

In the specific embodiments of the disclosure described above, elements included in the disclosure are expressed in a singular or plural form according to the specific embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments may be combined with each other as required. For example, a portion of one embodiment of the disclosure and a portion of another embodiment may be combined with each other to enable a base station and a terminal to operate. Further, the embodiments of the disclosure are also applicable to another communication system, and other modifications based on technical ideas of the embodiments are also feasible.

The invention claimed is:

1. A method performed by a user equipment (UE) in a wireless communication system, the method comprising:
   identifying that system information including sidelink common configuration is provided by a primary cell;
   generating a message for indicating sidelink UE information; and
   transmitting, to a base station, the message for indicating the sidelink UE information,
   wherein generating the message comprises:
   in case that a transmission resource for a sidelink communication is needed, including first information in the message for indicating the sidelink UE information, wherein the first information is associated with a first destination for which the transmission resource for the sidelink communication is requested; and
   in case that a sidelink radio link failure (RLF) is declared, including second information in the message for indicating the sidelink UE information, wherein the second information is associated with a second destination for which a sidelink communication failure is reported,
   wherein the first information includes a first destination identity configured by an upper layer for the first destination and a cast type of the first destination identity, and
   wherein the second information includes a second destination identity configured by the upper layer for the second destination and a sidelink failure cause for the second destination.

2. The method of claim 1, wherein the first information further includes:
   a field indicating a radio link control (RLC) mode and a quality of service (QOS) profile of a sidelink QoS flow of the RLC mode;
   a field indicating a QoS profile of a sidelink QOS flow of the first destination;
   a field indicating a frequency of the first destination; and
   a field indicating a synchronization reference type used on the field indicating the frequency of the first destination.

3. The method of claim 1, further comprising identifying that transmission of the sidelink communication is configured by the upper layer.

4. A user equipment (UE) in a wireless communication system, the UE comprising:
   a transceiver; and
   at least one processor coupled with the transceiver and configured to:
   identify that system information including sidelink common configuration is provided by a primary cell;
   generate a message for indicating sidelink UE information; and
   transmit, to a base station via the transceiver, the message for indicating the sidelink UE information,
   wherein the at least one processor is further configured to:
   in case that a transmission resource for a sidelink communication is needed, include first information in the message for indicating the sidelink UE information, wherein the first information is associated with a first destination for which the transmission resource for the sidelink communication is requested; and
   in case that a sidelink radio link failure (RLF) is declared, include second information in the message for indicating the sidelink UE information, wherein the second information is associated with a second destination for which a sidelink communication failure is reported,
   wherein the first information includes a first destination identity configured by an upper layer for the first destination and a cast type of the first destination identity, and
   wherein the second information includes a second destination identity configured by the upper layer for the second destination and a sidelink failure cause for the second destination.

5. The UE of claim 4, wherein the first information further includes:
   a field indicating a radio link control (RLC) mode and a quality of service (QOS) profile of a sidelink QoS flow of the RLC mode;
   a field indicating a QoS profile of a sidelink QoS flow of the first destination;
   a field indicating a frequency of the first destination; and
   a field indicating a synchronization reference type used on the field indicating the frequency of the first destination.

6. The UE of claim 4, wherein the at least one processor is further configured to identify that transmission of the sidelink communication is configured by the upper layer.

7. A method performed by a base station in a wireless communication system, the method comprising:
   receiving, from a user equipment (UE), a message for indicating sidelink UE information,
   wherein the message for indicating the sidelink UE information is associated with system information including sidelink common configuration provided by a primary cell,
   wherein the message for indicating the sidelink UE information includes first information associated with a first destination for which a transmission resource for a sidelink communication is requested, in case that the transmission resource for the sidelink communication is needed,
   wherein the message for indicating the sidelink UE information includes second information associated with a second destination for which a sidelink communication failure is reported, in case that a sidelink radio link failure (RLF) is declared,
   wherein the first information includes a first destination identity configured by an upper layer for the first destination and a cast type of the first destination identity, and
   wherein the second information includes a second destination identity configured by the upper layer for the second destination and a sidelink failure cause for the second destination.

* * * * *